United States Patent
Swaminathan et al.

(10) Patent No.: US 11,580,213 B2
(45) Date of Patent: Feb. 14, 2023

(54) PASSWORD-BASED AUTHORIZATION FOR AUDIO RENDERING

(71) Applicant: QUALCOMM Incorporated, San Diego, CA (US)

(72) Inventors: Siddhartha Goutham Swaminathan, San Diego, CA (US); Isaac Garcia Munoz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 293 days.

(21) Appl. No.: 16/918,338

(22) Filed: Jul. 1, 2020

(65) Prior Publication Data

US 2021/0004452 A1  Jan. 7, 2021

Related U.S. Application Data

(60) Provisional application No. 62/870,479, filed on Jul. 3, 2019.

(51) Int. Cl.
| | | |
|---|---|---|
| *G06F 21/43* | (2013.01) | |
| *G06F 21/33* | (2013.01) | |
| *G06F 21/30* | (2013.01) | |
| *G06F 3/16* | (2006.01) | |

(52) U.S. Cl.
CPC .............. *G06F 21/43* (2013.01); *G06F 3/165* (2013.01); *G06F 21/305* (2013.01); *G06F 21/33* (2013.01)

(58) Field of Classification Search
CPC ........ G06F 21/43; G06F 3/165; G06F 21/305; G06F 21/33
See application file for complete search history.

(56) References Cited

U.S. PATENT DOCUMENTS

| | | |
|---|---|---|
| 9,053,302 B2 | 6/2015 | Sastry et al. |
| 9,615,173 B2 | 4/2017 | Sako et al. |
| 10,242,486 B2 | 3/2019 | Sakthivel et al. |
| 10,657,974 B2 | 5/2020 | Kim et al. |

(Continued)

FOREIGN PATENT DOCUMENTS

| | | |
|---|---|---|
| KR | 101977897 B1 | 8/2019 |
| WO | 2013006338 A2 | 1/2013 |

(Continued)

OTHER PUBLICATIONS

International Preliminary Report on Patentability—PCT/US2020/040709, The International Bureau of WIPO—Geneva, Switzerland, dated Jan. 13, 2022 9 Pages.

(Continued)

*Primary Examiner* — Fan S Tsang
*Assistant Examiner* — David Siegel
(74) *Attorney, Agent, or Firm* — Shumaker & Sieffert, P.A.

(57) ABSTRACT

A method and device for processing one or more audio streams based on password-based privacy restrictions is described. A device may be configured to receive unrestricted audio streams of the one or more audio streams based on privacy restrictions associated with a password, wherein the one or more audio streams are from audio elements represented in an acoustic environment that comprises one or more sub-acoustic spaces, each of the one or more audio streams representative of a respective soundfield, and generate the respective soundfields of the unrestricted audio streams.

30 Claims, 23 Drawing Sheets

(56) References Cited

U.S. PATENT DOCUMENTS

| | | |
|---|---|---|
| 2011/0249821 A1 | 10/2011 | Jaillet et al. |
| 2012/0331066 A1 | 12/2012 | Fitzgerald |
| 2017/0017460 A1 | 1/2017 | Tull |
| 2019/0007781 A1 | 1/2019 | Peters et al. |
| 2020/0081682 A1* | 3/2020 | Vestal ............... H04L 65/611 |
| 2020/0107147 A1 | 4/2020 | Munoz et al. |
| 2020/0260199 A1* | 8/2020 | Burwinkel ............ G06F 21/62 |

FOREIGN PATENT DOCUMENTS

| | | | |
|---|---|---|---|
| WO | 2016209607 A1 | 12/2016 | |
| WO | WO-2017102713 A1 * | 6/2017 | ......... H04L 47/2475 |
| WO | 2020072369 A1 | 4/2020 | |

OTHER PUBLICATIONS

Audio: "Call for Proposals for 3D Audio", International Organisation for Standardisation Organisation Internationale De Normalisation ISO/IEC JTC1/SC29/WG11 Coding of Moving Pictures and Audio, ISO/IEC JTC1/SC29/WG11/M13411, Geneva, Jan. 2013, pp. 1-20.

ETSI TS 103 589 V1.1.1, "Higher Order Ambisonics (HOA) Transport Format", Jun. 2018, 33 pages.

Herre J., et al., "Mpeg-H 3D Audio—The New Standard for Coding of Immersive Spatial Audio", IEEE Journal of Selected Topics In Signal Processing, vol. 9, No. 5, Aug. 1, 2015 (Aug. 1, 2015), pp. 770-779, XP055243182, US ISSN: 1932-4553, DOI: 10.1109/JSTSP.2015.2411578.

Hollerweger F., "An Introduction to Higher Order Ambisonic", Oct. 2008, pp. 1-13, Accessed online [Jul. 8, 2013].

"Information Technology—High Efficiency Coding and Media Delivery in Heterogeneous Environments—Part 3: 3D Audio", ISO/IEC JTC 1/SC 29, ISO/IEC DIS 23008-3, Jul. 25, 2014, 433 Pages.

"Information Technology—High Efficiency Coding and Media Delivery in Heterogeneous Environments—Part 3: 3D Audio", ISO/IEC JTC 1/SC 29/WG11, ISO/IEC 23008-3, 201x(E), Oct. 12, 2016, 797 Pages.

"Information Technology—High Efficiency Coding and Media Delivery in Heterogeneous Environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 Pages.

International Search Report and Written Opinion—PCT/US2020/040709—ISA/EPO—dated Oct. 13, 2020.

ISO/IEC/JTC: "ISO/IEC JTC 1/SC 29 N ISO/IEC CD 23008-3 Information Technology—High Efficiency Coding and Media Delivery in Heterogeneous Environments—Part 3: 3D Audio", Apr. 4, 2014 (Apr. 4, 2014), 337 Pages, XP055206371, Retrieved from the Internet: URL:http://www.iso.org/iso/iso_catalogue/catalogue_tc/catalogue_tc_browse.htm?commid=45316 [retrieved on Aug. 5, 2015].

Peterson J., et al., "Virtual Reality, Augmented Reality, and Mixed Reality Definitions", EMA, version 1.0, Jul. 7, 2017, 4 Pages.

Poletti M.A., "Three-Dimensional Surround Sound Systems Based on Spherical Harmonics", The Journal of the Audio Engineering Society, vol. 53, No. 11, Nov. 2005, pp. 1004-1025.

Schonefeld V., "Spherical Harmonics", Jul. 1, 2005, XP002599101, 25 Pages, Accessed online [Jul. 9, 2013] at URL:http://heim.c-otto.de/~volker/prosem_paper.pdf.

Sen D., et al., "RM1-HOA Working Draft Text", 107. MPEG Meeting, Jan. 13, 2014-Jan. 17, 2014, San Jose, (Motion Picture Expert Group or ISO/IEC JTC1/SC29/WG11), No. M31827, Jan. 11, 2014 (Jan. 11, 2014), 83 Pages, XP030060280.

Sen D., et al., "Technical Description of the Qualcomm's HoA Coding Technology for Phase II", 109. MPEG Meeting, Jul. 7, 2014-Jul. 11, 2014; Sapporo, (Motion Picture Expert Group or ISO/IEC JTC1/SC29/WG11), No. M34104, Jul. 2, 2014 (Jul. 2, 2014), 4 Pages, XP030062477.

U.S. Appl. No. 16/918,372, filed Jul. 1, 2020.
U.S. Appl. No. 16/918,441, filed Jul. 1, 2020.
U.S. Appl. No. 16/918,492, filed Jul. 1, 2020.
U.S. Appl. No. 16/918,754, filed Jul. 1, 2020.

* cited by examiner

PASSWORD-BASED AUTHORIZATION FOR AUDIO RENDERING

This application claims the benefit of U.S. Provisional Application No. 62/870,479, filed Jul. 3, 2019, the entire content of which is incorporated by reference herein.

TECHNICAL FIELD

This disclosure relates to processing of media data, such as audio data.

BACKGROUND

Computer-mediated reality systems are being developed to allow computing devices to augment or add to, remove or subtract from, or generally modify existing reality experienced by a user. Computer-mediated reality systems (which may also be referred to as "extended reality systems," or "XR systems") may include, as examples, virtual reality (VR) systems, augmented reality (AR) systems, and mixed reality (MR) systems. The perceived success of computer-mediated reality systems is generally related to the ability of such computer-mediated reality systems to provide a realistically immersive experience in terms of both the video and audio experience where the video and audio experience align in ways expected by the user. Although the human visual system is more sensitive than the human auditory systems (e.g., in terms of perceived localization of various objects within the scene), ensuring an adequate auditory experience is an increasingly important factor in ensuring a realistically immersive experience, particularly as the video experience improves to permit better localization of video objects that enable the user to better identify sources of audio content.

SUMMARY

This disclosure relates generally to auditory aspects of the user experience of computer-mediated reality systems, including virtual reality (VR), mixed reality (MR), augmented reality (AR), computer vision, and graphics systems. Various aspects of the techniques may provide for user control of audio rendering of an acoustical space for extended reality systems. As used herein, an acoustic environment is represented as either an indoor environment or an outdoor environment, or both an indoor environment and an outdoor environment. The acoustic environment may include one or more sub-acoustic spaces that may include various acoustic elements. A sub-acoustic space may, for example, be a room, or an area within a room or building, the cabin of a vehicle, a classroom, an area within a classroom, or any subset of any type of acoustic space. An example of an outdoor environment could include a car, buildings, walls, a forest, etc. An acoustic space may be an example of an acoustic environment and may be an indoor space or an outdoor space. As used herein, an audio element may be a sound captured by a microphone (e.g., directly captured from near-filed sources or reflections from far-field sources whether real or synthetic), a sound captured by an array of microphones, a soundfield previously synthesized, a mono sound synthesized from text to speech, and/or a reflection of a virtual sound from an object in the acoustic environment.

When rendering an XR scene (e.g., a six degrees of freedom (6DOF) XR scene) with many audio sources which may be obtained from audio elements of a live scene, certain audio elements or clusters of audio elements may contain sensitive information and/or may be meant for restricted or exclusive access. In accordance with the techniques of this disclosure, an audio playback device (e.g., a VR or XR device) may be configured to receive and/or determine restricted and unrestricted audio streams from privacy restrictions associated with a password. In the context of this disclosure, the password may be any information (e.g., key, encryption key, access code, etc.) that is used to associate a particular holder of the password with a set of privacy restrictions (e.g., restrictions that indicate whether or not particular audio streams may be played back and/or rendered).

In some examples, the audio playback device may obtain the password from a host that transmits the one or more audio streams. In one example, the audio playback device may request audio streams and provide the password back to host. In this example, the host may transmit only the audio streams that are unrestricted based on the password. In other examples, the audio playback device may request audio streams and provide the password back to host, and the host may transmit all the audio streams. However, the host may further include data (e.g., audio metadata) that indicates if particular streams are restricted based on the password. The audio playback device would then restrict playback based on the data (e.g., audio metadata). In still other examples, the audio playback device does not provide the password to the host. Rather, the host may transmit all audio streams, as well as a plurality of data (e.g., audio metadata) that indicates if particular streams are restricted based on particular types of passwords. The audio playback device may then associate the password stored at the audio playback device with the audio metadata corresponding to the same type of password, and then restrict playback based on the streams that are restricted based on the association.

The passwords may be generated for one or more zones/clusters or audio streams associated with the zones/cluster, and authentication may be performed based on the listener or user associated with the password. The techniques of this disclosure may provide rendering side (e.g., the audio playback device) privacy access for situations where audio streams cannot be restricted from the capture side. Such techniques provide privacy flexibility when serving dynamic sources of audio data and may add additional layers of security.

In one example, this disclosure describes a device configured to process one or more audio streams, the device comprising a memory configured to store the one or more audio streams, and one or more processors coupled to the memory, and configured to receive unrestricted audio streams of the one or more audio streams based on privacy restrictions associated with a password, wherein the one or more audio streams are from audio elements represented in an acoustic environment that comprises one or more sub-acoustic spaces, each of the one or more audio streams representative of a respective soundfield, and generate the respective soundfields of the unrestricted audio streams.

In another example, this disclosure describes a method for processing one or more audio streams, the method comprising receiving unrestricted audio streams of the one or more audio streams based on privacy restrictions associated with a password, wherein the one or more audio streams are from audio elements represented in an acoustic environment that comprises one or more sub-acoustic spaces, each of the one or more audio streams representative of a respective soundfield, and generating the respective soundfields of the unrestricted audio streams.

In another example, this disclosure describes a non-transitory computer-readable storage medium storing instructions that, when executed, cause one or more processors of a device configured to process one or more audio streams to receive unrestricted audio streams of the one or more audio streams based on privacy restrictions associated with a password, wherein the one or more audio streams are from audio elements represented in an acoustic environment that comprises one or more sub-acoustic spaces, each of the one or more audio streams representative of a respective soundfield, and generate the respective soundfields of the unrestricted audio streams.

In another example, this disclosure describes a device configured to process one or more audio streams, the device comprising means for receiving unrestricted audio streams of the one or more audio streams based on privacy restrictions associated with a password, wherein the one or more audio streams are from audio elements represented in an acoustic environment that comprises one or more sub-acoustic spaces, each of the one or more audio streams representative of a respective soundfield, and means for generating the respective soundfields of the unrestricted audio streams.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1A:
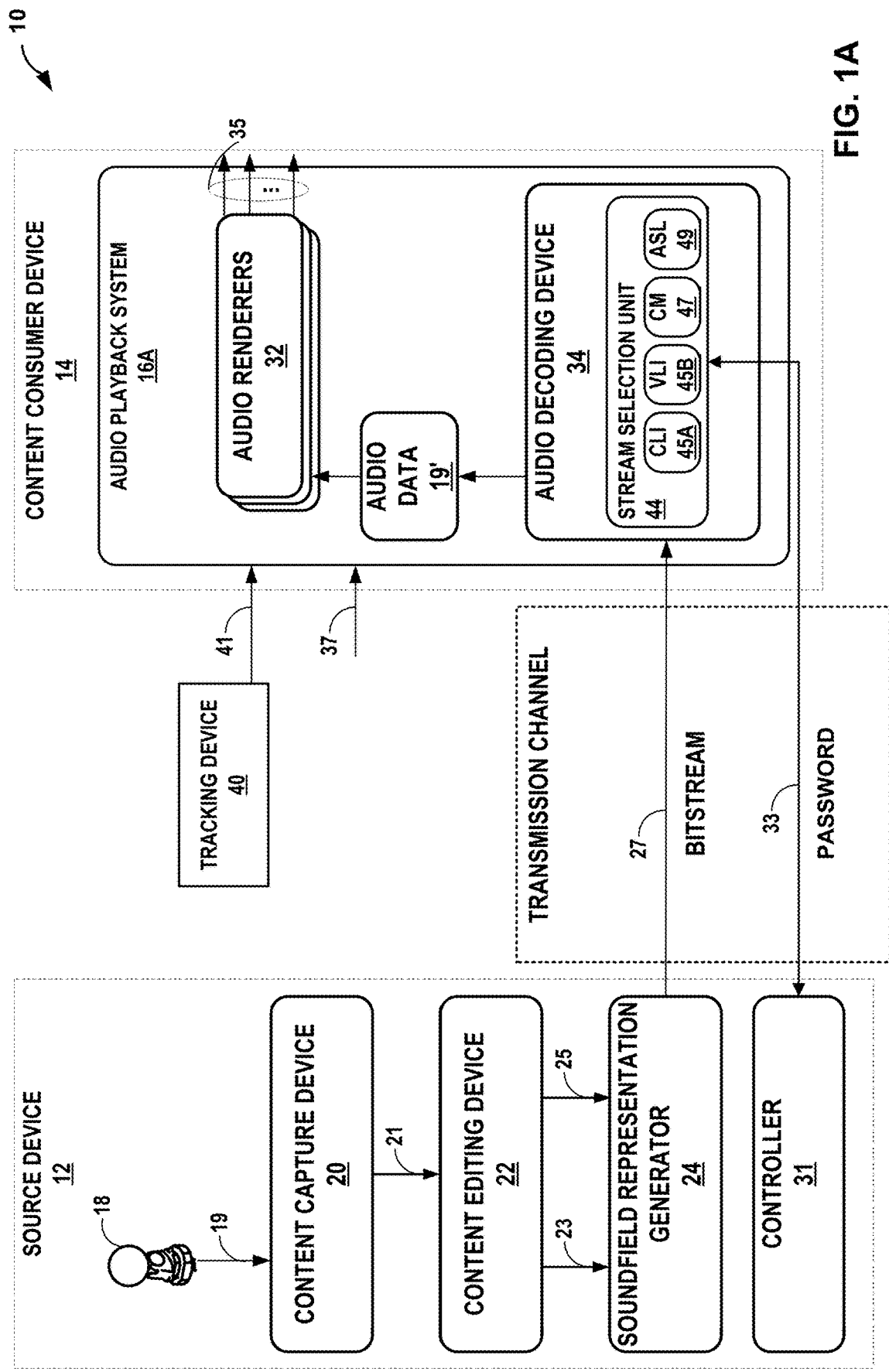
FIGS. 1A and 1B are diagrams illustrating systems that may perform various aspects of the techniques described in this disclosure.

There are a number of different ways to represent a soundfield. Example formats include channel-based audio formats, object-based audio formats, and scene-based audio formats. Channel-based audio formats refer to the 5.1 surround sound format, 7.1 surround sound formats, 22.2 surround sound formats, or any other channel-based format that localizes audio channels to particular locations around the listener in order to recreate a soundfield.

Object-based audio formats may refer to formats in which audio objects, often encoded using pulse-code modulation (PCM) and referred to as PCM audio objects, are specified in order to represent the soundfield. Such audio objects may include metadata identifying a location of the audio object relative to a listener or other point of reference in the soundfield, such that the audio object may be rendered to one or more speaker channels for playback in an effort to recreate the soundfield. The techniques described in this disclosure may apply to any of the foregoing formats, including scene-based audio formats, channel-based audio formats, object-based audio formats, or any combination thereof.

Scene-based audio formats may include a hierarchical set of elements that define the soundfield in three dimensions. One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions of the soundfield. The SHC (which also may be referred to as ambisonic coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be physically acquired from microphone arrays are described in Poletti, M., "Three- Dimensional Surround Sound Systems Based on Spherical Harmonics," J. Audio Eng. Soc., Vol. 53, No. 11, 2005 November, pp. 1004-1025.

The following equation may illustrate how the SHCs may be derived from an object-based description. The coefficients $A_n^m(k)$ for the soundfield corresponding to an individual audio object may be expressed as:

$$A_n^m(k) = g(\omega)(-4\pi i k) h_n^{(2)}(kr_s) Y_n^{m*}(\theta_s, \varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the pulse code modulated—PCM—stream) may enable conversion of each PCM object and the corresponding location into the SHC $A_n^m(k)$. Further, it can be shown (since the above is a linear and orthogonal decomposition) that the $A_n^m(k)$ coefficients for each object are additive. In this manner, a number of PCM objects can be represented by the $A_n^m(k)$ coefficients (e.g., as a sum of the coefficient vectors for the individual objects). The coefficients may contain information about the soundfield (the pressure as a function of 3D coordinates), and the above represents the transformation from individual objects to a representation of the overall soundfield, in the vicinity of the observation point $\{r_r, \theta_r, \varphi_r\}$.

Computer-mediated reality systems (which may also be referred to as "extended reality systems," or "XR systems") are being developed to take advantage of many of the potential benefits provided by ambisonic coefficients. For example, ambisonic coefficients may represent a soundfield in three dimensions in a manner that potentially enables accurate three-dimensional (3D) localization of sound sources within the soundfield. As such, XR devices may render the ambisonic coefficients to speaker feeds that, when played via one or more speakers, accurately reproduce the soundfield.

As another example, the ambisonic coefficients may be translated (e.g., rotated) to account for user movement without overly complex mathematical operations, thereby potentially accommodating the low latency requirements of XR. In addition, the ambisonic coefficients are hierarchical and thereby naturally accommodate scalability through order reduction (which may eliminate ambisonic coefficients associated with higher orders), and thereby potentially enable dynamic adaptation of the soundfield to accommodate latency and/or battery requirements of XR devices.

The use of ambisonic coefficients for XR may enable development of a number of use cases that rely on the more immersive soundfields provided by the ambisonic coefficients, particularly for computer gaming applications and live video streaming applications. In these highly dynamic use cases that rely on low latency reproduction of the soundfield, the XR devices may prefer ambisonic coefficients over other representations that are more difficult to manipulate or involve complex rendering. More information regarding these use cases is provided below with respect to FIGS. 1A and 1B.

While described in this disclosure with respect to the VR device, various aspects of the techniques may be performed in the context of other devices, such as a mobile device. In this instance, the mobile device (such as a so-called smartphone) may present the displayed world via a screen, which may be mounted to the head of the user 1102 or viewed as would be done when normally using the mobile device. As such, any information on the screen can be part of the mobile device. The mobile device may be able to provide tracking information 41 and thereby allow for both a VR experience (when head mounted) and a normal experience to view the displayed world, where the normal experience may still allow the user to view the displayed world proving a VR-lite-type experience (e.g., holding up the device and rotating or translating the device to view different portions of the displayed world).

This disclosure relates generally to auditory aspects of the user experience of computer-mediated reality systems, including virtual reality (VR), mixed reality (MR), augmented reality (AR), computer vision, and graphics systems. Various aspects of the techniques may provide for user control of audio rendering of an acoustical space for extended reality systems. As used herein, an acoustic environment is represented as either an indoor environment or an outdoor environment, or both an indoor environment and an outdoor environment. The acoustic environment may include one or more sub-acoustic spaces that may include various acoustic elements. A sub-acoustic space may, for example, be a room, or an area within a room or building, the cabin of a vehicle, a classroom, an area within a classroom, or any subset of any type of acoustic space. An example of an outdoor environment could include a car, buildings, walls, a forest, etc. An acoustic space may be an example of an acoustic environment and may be an indoor space or an outdoor space. As used herein, an audio element may be a sound captured by a microphone (e.g., directly captured from near-filed sources or reflections from far-field sources whether real or synthetic), a sound captured by an array of microphones, a soundfield previously synthesized, a mono sound synthesized from text to speech, and/or a reflection of a virtual sound from an object in the acoustic environment.

When rendering an XR scene (e.g., a six degrees of freedom (6DOF) XR scene) with many audio sources which may be obtained from audio elements of a live scene, certain audio elements or clusters of audio elements may contain sensitive information and/or may be meant for restricted or exclusive access. In accordance with the techniques of this disclosure, an audio playback device (e.g., a VR or XR device) may be configured to receive and/or determine restricted and unrestricted audio streams from privacy restrictions associated with a password.

In some examples, the audio playback device may obtain the password from a host that transmits the one or more audio streams. In one example, the audio playback device may request audio streams and provide the password back to host. In this example, the host may transmit only the audio streams that are unrestricted based on the password. In other examples, the audio playback device may request audio streams and provide the password back to host, and the host may transmit all the audio streams. However, the host may further include data (e.g., audio metadata) that indicates if particular streams are restricted based on the password. The audio playback device would then restrict playback based on the data (e.g., audio metadata). In still other examples, the audio playback device does not provide the password to the host. Rather, the host may transmit all audio streams, as well as a plurality of data (e.g., audio metadata) that indicates if particular streams are restricted based on particular types of passwords. The audio playback device may then associate the password stored at the audio playback device with the audio metadata corresponding to the same type of password, and then restrict playback based on the streams that are restricted based on the association.

The passwords may be generated for one or more zones/clusters or audio streams associated with the zones/cluster, and authentication may be performed based on the listener or user associated with the password. The techniques of this disclosure may provide rendering side (e.g., the audio playback device) privacy access for situations where audio streams cannot be restricted from the capture side. Such techniques provide privacy flexibility when serving dynamic sources of audio data and may add additional layers of security.

Figure 1B:
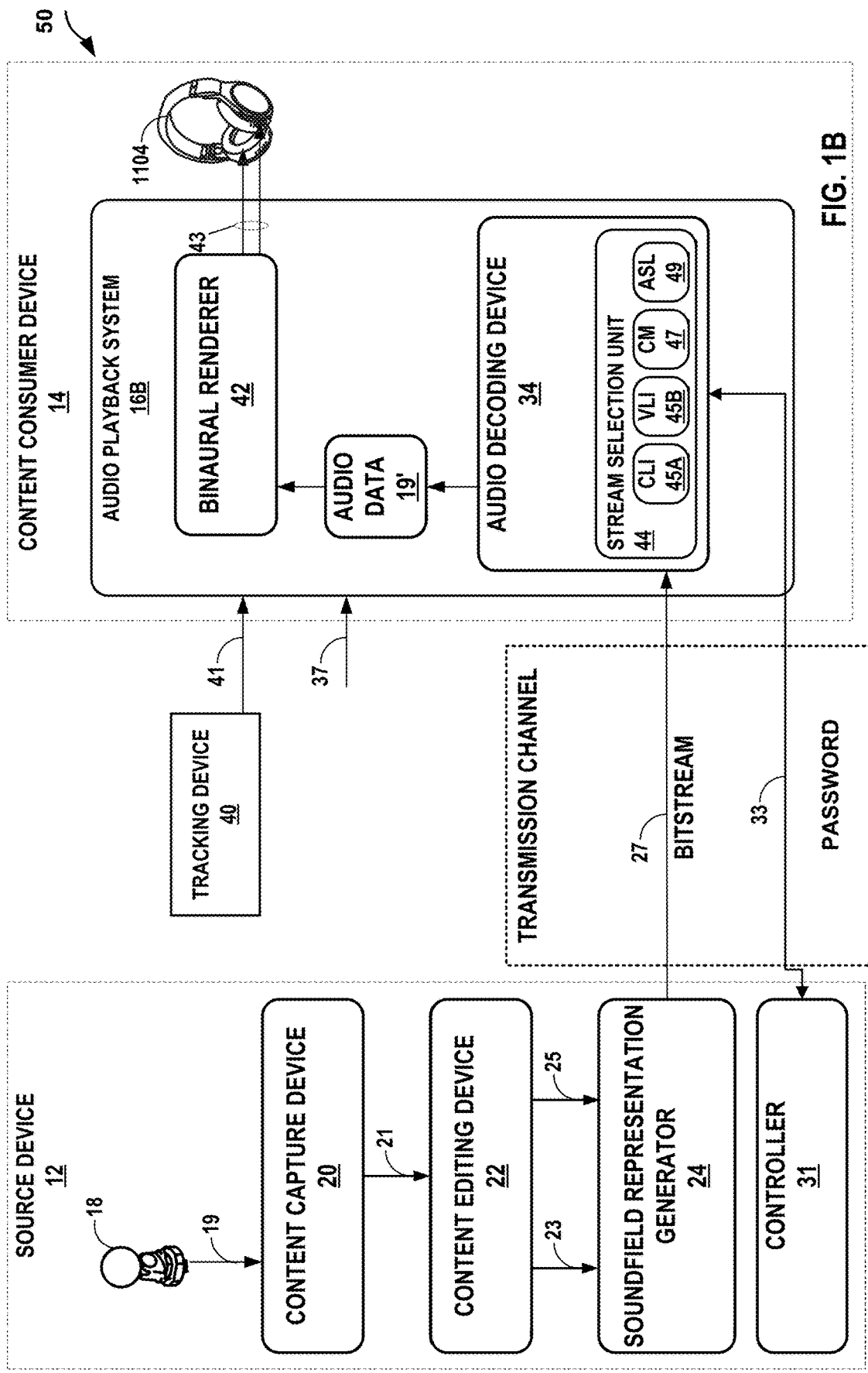

FIGS. 1A and 1B are diagrams illustrating systems that may perform various aspects of the techniques described in this disclosure. As shown in the example of FIG. 1A, system 10 includes a source device 12 and a content consumer device 14. While described in the context of the source device 12 and the content consumer device 14, the techniques may be implemented in any context in which any representation of a soundfield is encoded to form a bitstream representative of the audio data. Moreover, the source device 12 may represent any form of computing device capable of generating the representation of a soundfield, and is generally described herein in the context of being a VR content creator device. Likewise, the content consumer device 14 may represent any form of computing device capable of implementing rendering metadata techniques described in this disclosure as well as audio playback, and is generally described herein in the context of being a VR client device.

The source device 12 may be operated by an entertainment company or other entity that may generate multichannel audio content for consumption by operators of content consumer devices, such as the content consumer device 14. In some VR scenarios, the source device 12 generates audio content in conjunction with video content. The source device 12 includes a content capture device 20, a content editing device 22, and a soundfield representation generator 24. The content capture device 20 may be configured to interface or otherwise communicate with a microphone 18.

The microphone 18 may represent an Eigenmike® or other type of 3D audio microphone capable of capturing and representing the soundfield as audio data 19, which may refer to one or more of the above noted scene-based audio data (such as ambisonic coefficients), object-based audio data, and channel-based audio data. Although described as being 3D audio microphones, the microphone 18 may also represent other types of microphones (such as omni-directional microphones, spot microphones, unidirectional microphones, etc.) configured to capture the audio data 19.

The content capture device 20 may, in some examples, include an integrated microphone 18 that is integrated into the housing of the content capture device 20. The content capture device 20 may interface wirelessly or via a wired connection with the microphone 18. Rather than capture, or in conjunction with capturing, the audio data 19 via microphone 18, the content capture device 20 may process the audio data 19 after the audio data 19 is input via some type of removable storage, wirelessly and/or via wired input processes. As such, various combinations of the content capture device 20 and the microphone 18 are possible in accordance with this disclosure.

The content capture device 20 may also be configured to interface or otherwise communicate with the content editing device 22. In some instances, the content capture device 20 may include the content editing device 22 (which in some instances may represent software or a combination of software and hardware, including the software executed by the content capture device 20 to configure the content capture device 20 to perform a specific form of content editing). The content editing device 22 may represent a unit configured to edit or otherwise alter content 21 received from content capture device 20, including the audio data 19. The content editing device 22 may output edited content 23 and associated metadata 25 to the soundfield representation generator 24.

The soundfield representation generator 24 may include any type of hardware device capable of interfacing with the content editing device 22 (or the content capture device 20). Although not shown in the example of FIG. 1A, the soundfield representation generator 24 may use the edited content 23, including the audio data 19 and metadata 25, provided by the content editing device 22 to generate one or more bitstreams 27. In the example of FIG. 1A, which focuses on the audio data 19, the soundfield representation generator 24 may generate one or more representations of the same soundfield represented by the audio data 19 to obtain a bitstream 27 that includes the representations of the soundfield and the audio metadata 25.

For instance, to generate the different representations of the soundfield using ambisonic coefficients (which again is one example of the audio data 19), soundfield representation generator 24 may use a coding scheme for ambisonic representations of a soundfield, referred to as Mixed Order Ambisonics (MOA) as discussed in more detail in U.S. application Ser. No. 15/672,058, entitled "MIXED-ORDER AMBISONICS (MOA) AUDIO DATA OF COMPUTER-MEDIATED REALITY SYSTEMS," filed Aug. 8, 2017, and published as U.S. patent publication no. 20190007781 on Jan. 3, 2019.

To generate a particular MOA representation of the soundfield, the soundfield representation generator 24 may generate a partial subset of the full set of ambisonic coefficients. For instance, each MOA representation generated by the soundfield representation generator 24 may provide precision with respect to some areas of the soundfield, but less precision in other areas. In one example, an MOA representation of the soundfield may include eight (8) uncompressed ambisonic coefficients, while the third order ambisonic representation of the same soundfield may include sixteen (16) uncompressed ambisonic coefficients. As such, each MOA representation of the soundfield that is generated as a partial subset of the ambisonic coefficients may be less storage-intensive and less bandwidth intensive (if and when transmitted as part of the bitstream 27 over the illustrated transmission channel) than the corresponding third order ambisonic representation of the same soundfield generated from the ambisonic coefficients.

Although described with respect to MOA representations, the techniques of this disclosure may also be performed with respect to first-order ambisonic (FOA) representations in which all of the ambisonic coefficients associated with a first order spherical basis function and a zero order spherical basis function are used to represent the soundfield. In other words, rather than represent the soundfield using a partial, non-zero subset of the ambisonic coefficients, the soundfield representation generator 24 may represent the soundfield using all of the ambisonic coefficients for a given order N, resulting in a total of ambisonic coefficients equaling $(N+1)^2$.

In this respect, the ambisonic audio data (which is another way to refer to the ambisonic coefficients in either MOA representations or full order representation, such as the first-order representation noted above) may include ambisonic coefficients associated with spherical basis functions having an order of one or less (which may be referred to as "1$^{st}$ order ambisonic audio data"), ambisonic coefficients associated with spherical basis functions having a mixed order and suborder (which may be referred to as the "MOA representation" discussed above), or ambisonic coefficients associated with spherical basis functions having an order greater than one (which is referred to above as the "full order representation").

The content capture device 20 or the content editing device 22 may, in some examples, be configured to wirelessly communicate with the soundfield representation generator 24. In some examples, the content capture device 20 or the content editing device 22 may communicate, via one or both of a wireless connection or a wired connection, with the soundfield representation generator 24. Via the connection between the content capture device 20 and the soundfield representation generator 24, the content capture device 20 may provide content in various forms of content, which, for purposes of discussion, are described herein as being portions of the audio data 19.

In some examples, the content capture device 20 may leverage various aspects of the soundfield representation generator 24 (in terms of hardware or software capabilities of the soundfield representation generator 24). For example, the soundfield representation generator 24 may include dedicated hardware configured to (or specialized software that when executed causes one or more processors to) perform psychoacoustic audio encoding (such as a unified speech and audio coder denoted as "USAC" set forth by the Moving Picture Experts Group (MPEG), the MPEG-H 3D audio coding standard, the MPEG-I Immersive Audio standard, or proprietary standards, such as AptX™ (including various versions of AptX such as enhanced AptX—E-AptX, AptX live, AptX stereo, and AptX high definition—AptX-HD), advanced audio coding (AAC), Audio Codec 3 (AC-3), Apple Lossless Audio Codec (ALAC), MPEG-4 Audio Lossless Streaming (ALS), enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA).

The content capture device 20 may not include the psychoacoustic audio encoder dedicated hardware or specialized software and instead may provide audio aspects of the content 21 in a non-psychoacoustic-audio-coded form. The soundfield representation generator 24 may assist in the capture of content 21 by, at least in part, performing psychoacoustic audio encoding with respect to the audio aspects of the content 21.

The soundfield representation generator 24 may also assist in content capture and transmission by generating one or more bitstreams 27 based, at least in part, on the audio content (e.g., MOA representations and/or third order ambisonic representations) generated from the audio data 19 (in the case where the audio data 19 includes scene-based audio data). The bitstream 27 may represent a compressed version of the audio data 19 and any other different types of the content 21 (such as a compressed version of spherical video data, image data, or text data).

The soundfield representation generator 24 may generate the bitstream 27 for transmission, as one example, across a transmission channel, which may be a wired or wireless channel, a data storage device, or the like. The bitstream 27 may represent an encoded version of the audio data 19, and may include a primary bitstream and another side bitstream, which may be referred to as side channel information or metadata. In some instances, the bitstream 27 representing the compressed version of the audio data 19 (which again may represent scene-based audio data, object-based audio data, channel-based audio data, or combinations thereof) may conform to bitstreams produced in accordance with the MPEG-H 3D audio coding standard and/or the MPEG-I Immersive Audio standard.

In some examples of the disclosure, the source device 12 may be configured to generate a plurality of audio streams for transmission to the content consumer device 14. The source device 12 may be configured to generate each of the plurality of audio streams a single content capture device 20 and/or a cluster (e.g., multiple) content capture devices 20. In some use cases, it may be desirable to be able to control which of the plurality of audio streams generated by the source device 12 are available for playback by the content consumer device 14.

For example, audio from certain capture devices of the content capture devices 20 may contain sensitive information and/or the audio from certain capture devices of the content capture devices 20 may not be meant for exclusive access (e.g., unrestricted access by all users). In some examples, it may be desirable to restrict access to audio from certain capture devices of the content capture devices 20 based on the type of information captured by the content capture device 20 and/or based on the location of physical zone in which the content capture device 20 resides.

In accordance with example techniques of the disclosure, the source device 12 may further include a controller 31 configured to generate a password associated with privacy settings in a side channel 33 for one or more of the plurality of audio streams generated by the source device 12. In the context of this disclosure, the password may be any information (e.g., key, encryption key, access code, etc.) that is used to associate a particular holder of the password with a set of privacy restrictions (e.g., restrictions that indicate whether or not particular audio streams may be played back and/or rendered). The controller 31 may send the password to the content consumer device 14 directly or the password may be obtained by the content consumer device 14 out of band through other means. In some examples, the controller 31 need not be a separate physical unit. Rather, the controller 31 may be integrated into the content editing device 22 or the soundfield representation generator 24.

In one example, the password indicates if one or more of the plurality of audio streams are restricted or unrestricted. In other examples, the controller 31 may only generate a password associated with audio streams that are unrestricted. In this example, the content consumer device 14 may infer that audio streams not associated with a password are restricted, or vice versa.

The content consumer device 14 may provide the password back to the controller 31 when requesting audio streams for playback. In some examples, the controller 31 will only transmit the audio streams that are unrestricted for that particular password. In other examples, the controller 31 will send all audio streams to the content consumer device 14, where the audio streams are marked with metadata that indicates which streams are unrestricted or restricted based on the password. The content consumer device 14 may than restrict playback of restricted streams based on the password stored at the content consumer device 14. In one example of FIG. 1A, the controller 31 transmits the password in side channel 33. In other examples, the controller 31 may transmit the password in the bitstream 27. In other examples, the content consumer device 14 may obtain the password out of band through other means. Additional examples of privacy restrictions, including password-based privacy restrictions, will be described in more detail below with reference to FIGS. 4A-4D.

The content consumer device 14 may be operated by an individual, and may represent a VR client device. Although described with respect to a VR client device, content consumer device 14 may represent other types of devices, such as an augmented reality (AR) client device, a mixed reality (MR) client device (or other XR client device), a standard computer, a headset, headphones, a mobile device (including a so-called smartphone), or any other device capable of tracking head movements and/or general translational movements of the individual operating the client consumer device 14. As shown in the example of FIG. 1A, the content consumer device 14 includes an audio playback system 16A, which may refer to any form of audio playback system capable of rendering the audio data for playback as multi-channel audio content.

While shown in FIG. 1A as being directly transmitted to the content consumer device 14, the source device 12 may output the bitstream 27 to an intermediate device positioned between the source device 12 and the content consumer device 14. The intermediate device may store the bitstream 27 for later delivery to the content consumer device 14, which may request the bitstream 27. The intermediate device may comprise a file server, a web server, a desktop computer, a laptop computer, a tablet computer, a mobile phone, a smart phone, or any other device capable of storing the bitstream 27 for later retrieval by an audio decoder. The intermediate device may reside in a content delivery network capable of streaming the bitstream 27 (and possibly in conjunction with transmitting a corresponding video data bitstream) to subscribers, such as the content consumer device 14, requesting the bitstream 27.

Alternatively, the source device 12 may store the bitstream 27 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content (e.g., in the form of one or more bitstreams 27) stored to the mediums are transmitted (and may include retail stores and other store-based delivery mechanism). In any event, the techniques of this disclosure should not therefore be limited in this respect to the example of FIG. 1A.

As noted above, the content consumer device 14 includes the audio playback system 16A. The audio playback system 16A may represent any system capable of playing back multi-channel audio data. The audio playback system 16A may include a number of different renderers 32. The renderers 32 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16A may further include an audio decoding device 34. The audio decoding device 34 may represent a device configured to decode bitstream 27 to output audio data 19' (where the prime notation may denote that the audio data 19' differs from the audio data 19 due to lossy compression, such as quantization, of the audio data 19). Again, the audio data 19' may include scene-based audio data that in some examples, may form the full first (or higher) order ambisonic representation or a subset thereof that forms an MOA representation of the same soundfield, decompositions thereof, such as a predominant audio signal, ambient ambisonic coefficients, and the vector based signal described in the MPEG-H 3D Audio Coding Standard, or other forms of scene-based audio data.

Other forms of scene-based audio data include audio data defined in accordance with an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018-06), and also in U.S. Patent Publication No. 2019/0918028, entitled "PRIORITY INFORMATION FOR HIGHER ORDER AMBISONIC AUDIO DATA," filed Dec. 20, 2018. In any event, the audio data 19' may be similar to a full set or a partial subset of the audio data 19', but may differ due to lossy operations (e.g., quantization) and/or transmission via the transmission channel.

The audio data 19' may include, as an alternative to, or in conjunction with the scene-based audio data, channel-based audio data. The audio data 19' may include, as an alternative to, or in conjunction with the scene-based audio data, object-based audio data. As such, the audio data 19' may include any combination of scene-based audio data, object-based audio data, and channel-based audio data.

The audio renderers 32 of audio playback system 16A may, after audio decoding device 34 has decoded the bitstream 27 to obtain the audio data 19', render the audio data 19' to output speaker feeds 35. The speaker feeds 35 may drive one or more speakers (which are not shown in the example of FIG. 1A for ease of illustration purposes). Various audio representations, including scene-based audio data (and possibly channel-based audio data and/or object-based audio data) of a soundfield may be normalized in a number of ways, including N3D, SN3D, FuMa, N2D, or SN2D.

To select the appropriate renderer or, in some instances, generate an appropriate renderer, the audio playback system 16A may obtain speaker information 37 indicative of a number of speakers (e.g., loudspeakers or headphone speakers) and/or a spatial geometry of the speakers. In some instances, the audio playback system 16A may obtain the speaker information 37 using a reference microphone and may drive the speakers (which may refer to the output of electrical signals to cause the transducer to vibrate) in such a manner as to dynamically determine the speaker information 37. In other instances, or in conjunction with the dynamic determination of the speaker information 37, the audio playback system 16A may prompt a user to interface with the audio playback system 16A and input the speaker information 37.

The audio playback system 16A may select one of the audio renderers 32 based on the speaker information 37. In some instances, the audio playback system 16A may, when none of the audio renderers 32 are within some threshold similarity measure (in terms of the speaker geometry) to the speaker geometry specified in the speaker information 37, generate the one of audio renderers 32 based on the speaker information 37. The audio playback system 16A may, in some instances, generate one of the audio renderers 32 based on the speaker information 37 without first attempting to select an existing one of the audio renderers 32.

When outputting the speaker feeds 35 to headphones, the audio playback system 16A may utilize one of the renderers 32 that provides for binaural rendering using head-related transfer functions (HRTF) or other functions capable of rendering to left and right speaker feeds 35 for headphone speaker playback, such as binaural room impulse response renderers. The terms "speakers" or "transducer" may generally refer to any speaker, including loudspeakers, headphone speakers, bone-conducting speakers, earbud speakers, wireless headphone speakers, etc. One or more speakers may then playback the rendered speaker feeds 35 to reproduce a soundfield.

Although described as rendering the speaker feeds 35 from the audio data 19', reference to rendering of the speaker feeds of audio data 19' may refer to other types of rendering, such as rendering incorporated directly into the decoding of the speaker feeds 35 from the bitstream 27. An example of the alternative rendering can be found in Annex G of the MPEG-H 3D Audio standard, where rendering occurs during the predominant signal formulation and the background signal formation prior to composition of the soundfield. As such, reference to rendering of the audio data 19' should be understood to refer to both rendering of the actual audio data 19' or decompositions or representations thereof of the audio data 19' (such as the above noted predominant audio signal, the ambient ambisonic coefficients, and/or the vector-based signal—which may also be referred to as a V-vector or as a multi-dimensional ambisonic spatial vector).

The audio playback system 16A may also adapt the audio renderers 32 based on tracking information 41. That is, the audio playback system 16A may interface with a tracking device 40 configured to track head movements and possibly translational movements of a user of the VR device. The tracking device 40 may represent one or more sensors (e.g., a camera—including a depth camera, a gyroscope, a magnetometer, an accelerometer, light emitting diodes—LEDs, etc.) configured to track the head movements and possibly translation movements of a user of the VR device. The audio playback system 16A may adapt, based on the tracking information 41, the audio renderers 32 such that the speaker feeds 35 reflect changes in the head and possibly translational movements of the user to correct reproduce the soundfield that is responsive to such movements.

Figure 2:
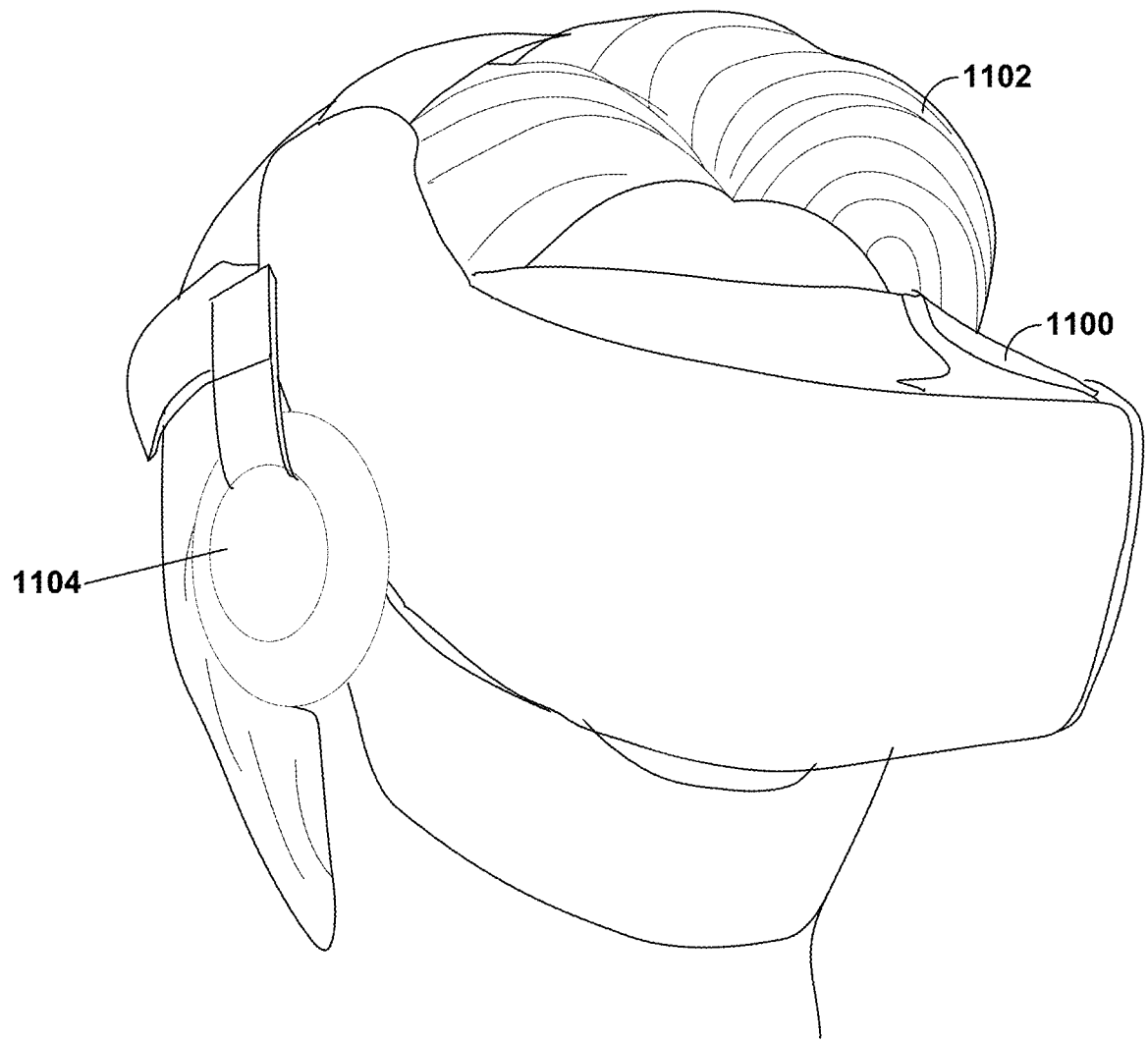
FIG. 2 is a diagram illustrating an example of a VR device worn by a user.

As described above, the content consumer device 14 may represent a VR device in which a human wearable display (which may also be referred to a "head mounted display") is mounted in front of the eyes of the user operating the VR device. FIG. 2 is a diagram illustrating an example of a VR device 1100 worn by a user 1102. The VR device 1100 is coupled to, or otherwise includes, headphones 1104, which may reproduce a soundfield represented by the audio data 19' through playback of the speaker feeds 35. The speaker feeds 35 may represent an analog or digital signal capable of causing a membrane within the transducers of headphones 1104 to vibrate at various frequencies, where such process is commonly referred to as driving the headphones 1104.

Video, audio, and other sensory data may play important roles in the VR experience. To participate in a VR experience, the user 1102 may wear the VR device 1100 (which may also be referred to as a VR headset 1100) or other wearable electronic device. The VR client device (such as the VR headset 1100) may include a tracking device (e.g., the tracking device 40) that is configured to track head movement of the user 1102, and adapt the video data shown via the VR headset 1100 to account for the head movements, providing an immersive experience in which the user 1102 may experience a displayed world shown in the video data in visual three dimensions. The displayed world may refer to a virtual world (in which all of the world is simulated), an augmented world (in which portions of the world are augmented by virtual objects), or a physical world (in which a real world image is virtually navigated).

While VR (and other forms of XR, AR and/or MR) may allow the user 1102 to reside in the virtual world visually, often the VR headset 1100 may lack the capability to place the user in the displayed world audibly. In other words, the VR system (which may include a computer responsible for rendering the video data and audio data—that is not shown in the example of FIG. 2 for ease of illustration purposes, and the VR headset 1100) may be unable to support full three-dimension immersion audibly (and in some instances realistically in a manner that reflects the displayed scene presented to the user via the VR headset 1100).

While described in this disclosure with respect to the VR device, various aspects of the techniques may be performed in the context of other devices, such as a mobile device. In this instance, the mobile device (such as a so-called smartphone) may present the displayed world via a screen, which may be mounted to the head of the user 1102 or viewed as would be done when normally using the mobile device. As such, any information on the screen can be part of the mobile device. The mobile device may be able to provide tracking information 41 and thereby allow for both a VR experience (when head mounted) and a normal experience to view the displayed world, where the normal experience may still allow the user to view the displayed world proving a VR-lite-type experience (e.g., holding up the device and rotating or translating the device to view different portions of the displayed world).

In any event, returning to the VR device context, the audio aspects of VR have been classified into three separate categories of immersion. The first category provides the lowest level of immersion, and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational head movements in which the head is not centered on the optical and acoustical center of the soundfield.

The second category, referred to 3DOF plus (3DOF+), provides for the three degrees of freedom (yaw, pitch, and roll) in addition to limited spatial translational movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of the user in space (x, y, and z translations). The spatial translations may be induced by sensors tracking the location of the user in the physical world or by way of an input controller.

3DOF rendering is the current state of the art for the audio aspects of VR. As such, the audio aspects of VR are less immersive than the video aspects, thereby potentially reducing the overall immersion experienced by the user. However, VR is rapidly transitioning and may develop quickly to supporting both 3DOF+ and 6DOF that may expose opportunities for additional use cases.

For example, interactive gaming application may utilize 6DOF to facilitate fully immersive gaming in which the users themselves move within the VR world and may interact with virtual objects by walking over to the virtual objects. Furthermore, an interactive live streaming application may utilize 6DOF to allow VR client devices to experience a live stream of a concert or sporting event as if present at the concert themselves, allowing the users to move within the concert or sporting event.

There are a number of difficulties associated with these use cases. In the instance of fully immersive gaming, latency may need to remain low to enable gameplay that does not result in nausea or motion sickness. Moreover, from an audio perspective, latency in audio playback that results in loss of synchronization with video data may reduce the immersion. Furthermore, for certain types of gaming applications, spatial accuracy may be important to allow for accurate responses, including with respect to how sound is perceived by the users as that allows users to anticipate actions that are not currently in view.

In the context of live streaming applications, a large number of source devices 12 may stream content 21, where the source devices 12 may have widely different capabilities. For example, one source device may be a smartphone with a digital fixed-lens camera and one or more microphones, while another source device may be production level television equipment capable of obtaining video of a much higher resolution and quality than the smartphone. However, all of the source devices, in the context of the live streaming applications, may offer streams of varying quality from which the VR device may attempt to select an appropriate one to provide an intended experience.

Moreover, similar to the gaming applications, latency in audio data such that loss of synchronization occurs with the video data may result in less immersion. Moreover, spatial accuracy may also be important such that the users may better understand the context or location of different audio sources. Further, when users are live streaming using cameras and microphones, privacy may become an issue, as users may not want to live streams fully available to the public.

In the context of streaming application (live or recorded), there may be a large number of audio streams associated with varying levels of quality and/or content. The audio streams may represent any type of audio data, including scene-based audio data (e.g., ambisonic audio data, including FOA audio data, MOA audio data and/or HOA audio data), channel-based audio data, and object-based audio data. Selecting only one of a potentially large number of audio streams from which to recreate a soundfield may not provide an experience that ensures an adequate level of immersion. However, selecting multiple audio streams may create distractions due to different spatial localization between the multiple audio streams, thereby potentially reducing immersion.

In accordance with example techniques described in this disclosure, the audio decoding device 34 may adaptively select between audio streams available via the bitstream 27 (which are represented by the bitstream 27 and hence the bitstream 27 may be referred to as "audio streams 27"). The audio decoding device 34 may select between different audio streams of the audio streams 27 based on capture location information (CLI) 45A included as metadata accompanying the audio streams 27, where the capture location information may define capture coordinates in the displayed world for the microphones that capture the respective audio streams 27. The CLI 45A may be representative of a capture location in a displayed world at which the corresponding one of the audio streams 27 was captured. The audio decoding device 34 may select, based on the CLI 45A, a subset of the audio streams 27, where the subset of the audio streams 27 excludes at least one of the audio streams 27. The audio decoding device 34 may output the subset of audio streams 27 as audio data 19' (which may also be referred to as "audio streams 19'"). The adaptive audio stream selection techniques of this disclosure may be used together with any of the password-based techniques described below.

In addition, the audio decoding device 34 may obtain the tracking information 41, which the content consumer device 14 may translate into virtual location information (VLI) 45B. The VLI 45B may represent a virtual location of the content consumer device 14 in the displayed world, which may be defined as one or more device coordinates in the displayed world. The content consumer device 15 may provide the VLI 45B to the audio decoding device 34. The audio decoding device 34 may then select, based on the CLI 45A and the VLI 45B, the audio streams 19' from the audio streams 27. The audio playback system 16A may then reproduce, based on the audio streams 19', the corresponding soundfields.

In this respect, the audio decoding device 34 may adaptively select a subset of the audio streams 27 to obtain the audio streams 19' that may result in a more immersive experience (compared to selecting a single audio stream or all of the audio streams 19'). As such, various aspects of the techniques described in this disclosure may improve operation of the audio decoding device 34 (and the audio playback system 16A and the content consumer device 14) itself by possibly enabling the audio decoding device 34 to better spatialize sound sources within the soundfield and thereby improve immersion.

In operation, the audio decoding device 34 may interface with one or more source devices 12 to determine the CLI 45A for each of the audio streams 27. As shown in the example of FIG. 1A, the audio decoding device 34 may include a stream selection unit 44, which may represent a unit configured to perform various aspects of the audio stream selection techniques described in this disclosure.

The stream selection unit 44 may generate, based on the CLI 45A, a constellation map (CM) 47. The CM 47 may define the CLI 45A for each of the audio streams 27. The stream selection unit 44 may also perform an energy analysis with respect to each of the audio streams 27 to determine an energy map for each of the audio streams 27, storing the energy map along with the CLI 45A in the CM 47. The energy maps may jointly define an energy of a common soundfield represented by the audio streams 27.

The stream selection unit 44 may next determine a distance between the virtual location represented by the VLI 45B and the capture location represented by the CLI 45A associated with at least one and possible each of the audio streams 27. The stream selection unit 44 may then select, based on the at least one and possibly each of the distance(s), the audio streams 19' from the audio streams 27 as discussed in more detail below with respect to FIGS. 3A-3D.

Further, in some examples, the stream selection unit 44 may also select, based on the energy maps stored to the CM 47, the CLI 45A, and the VLI 45B (jointly where the CLI 45A and the VLI 45B are presented in the form of the above noted distances, which may also be referred to as "relative distances"), the audio streams 19' from the audio streams 27. For example, the stream selection unit 44 may analyze the energy maps presented in the CM 47 to determine an audio source location (ASL) 49 of an audio source in the common soundfield emitting sound that is captured by microphones (such as the microphone 18) and represented by the audio streams 27. The stream selection unit 44 may then determine, based on CLI 45A, the VLI 45B, and the ASL 49, the audio streams 19' from the audio streams 27. More information regarding how the stream selection unit 44 may select the streams is discussed below with respect to FIGS. 3A-3D.

As will be explained in more detail below, in one example of the disclosure, the content consumer device 14 may be configured to receive unrestricted audio streams of the one or more audio streams based on privacy restrictions associated with a password, wherein the one or more audio streams are from audio elements represented in an acoustic environment that comprises one or more sub-acoustic spaces, each of the one or more audio streams representative of a respective soundfield, and generate the respective soundfields of the unrestricted audio streams.

In one example, when requesting audio streams from the source device 12, the content consumer device 14 may send the password to a host device (e.g., the source device 12), and receive and/or obtain, from the host device, only the unrestricted audio streams of the one or more audio streams based on privacy restrictions associated with the password. Content consumer device may be configured to communicate with the source device 12 via a modem and/or transceiver, e.g., over a wireless link (e.g., Bluetooth, WiFi, 5G, LTE, etc.). In some examples, the modem/transceiver may be a separate chip within content consumer device 14. In other examples, the modem/transceiver may be integrated with one or more processors on the same integrated circuit, ASIC, and/or SoC (system on chip).

In another example, when requesting audio streams from the source device 12, the content consumer device 14 may send the password to a host device (e.g., the source device 12), receive, from the host device, unrestricted audio streams of the one or more audio streams, and restricted audio streams of the one or more audio streams, receive data indicating restricted playback of the restricted audio streams based on privacy restrictions associated with the password, and restrict playback of the respective soundfields of the restricted audio streams based on the data indicating the restricted playback.

In another example, when requesting audio streams from the source device 12, the content consumer device 14 may not send the password to a host device (e.g., the source device 12). Rather, the content consumer device 14 may receive, from the host device, unrestricted audio streams of the one or more audio streams, and restricted audio streams of the one or more audio streams, receive data indicating restricted playback of the restricted audio streams, associate the password with the data indicating the restricted playback, and restrict playback of the respective soundfields of the restricted audio streams based on the data indicating the restricted playback associated with the password.

FIG. 1B is a block diagram illustrating another example system 50 configured to perform various aspects of the techniques described in this disclosure. The system 50 is similar to the system 10 shown in FIG. 1A, except that the audio renderers 32 shown in FIG. 1A are replaced with a binaural renderer 42 capable of performing binaural rendering using one or more head-related transfer functions HRTFs or the other functions capable of rendering to left and right speaker feeds 43.

The audio playback system 16B may output the left and right speaker feeds 43 to headphones 1104, which may represent another example of a wearable device and which may be coupled to additional wearable devices to facilitate reproduction of the soundfield, such as a watch, the VR headset noted above, smart glasses, smart clothing, smart rings, smart bracelets or any other types of smart jewelry (including smart necklaces), and the like. The headphones 1104 may couple wirelessly or via wired connection to the additional wearable devices.

Additionally, the headphones 1104 may couple to the audio playback system 16B via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 1104 may recreate, based on the left and right speaker feeds 43, the soundfield represented by the audio data 19'. The headphones 1104 may include a left headphone speaker and a right headphone speaker which are powered (or, in other words, driven) by the corresponding left and right speaker feeds 43.

Figure 3A:
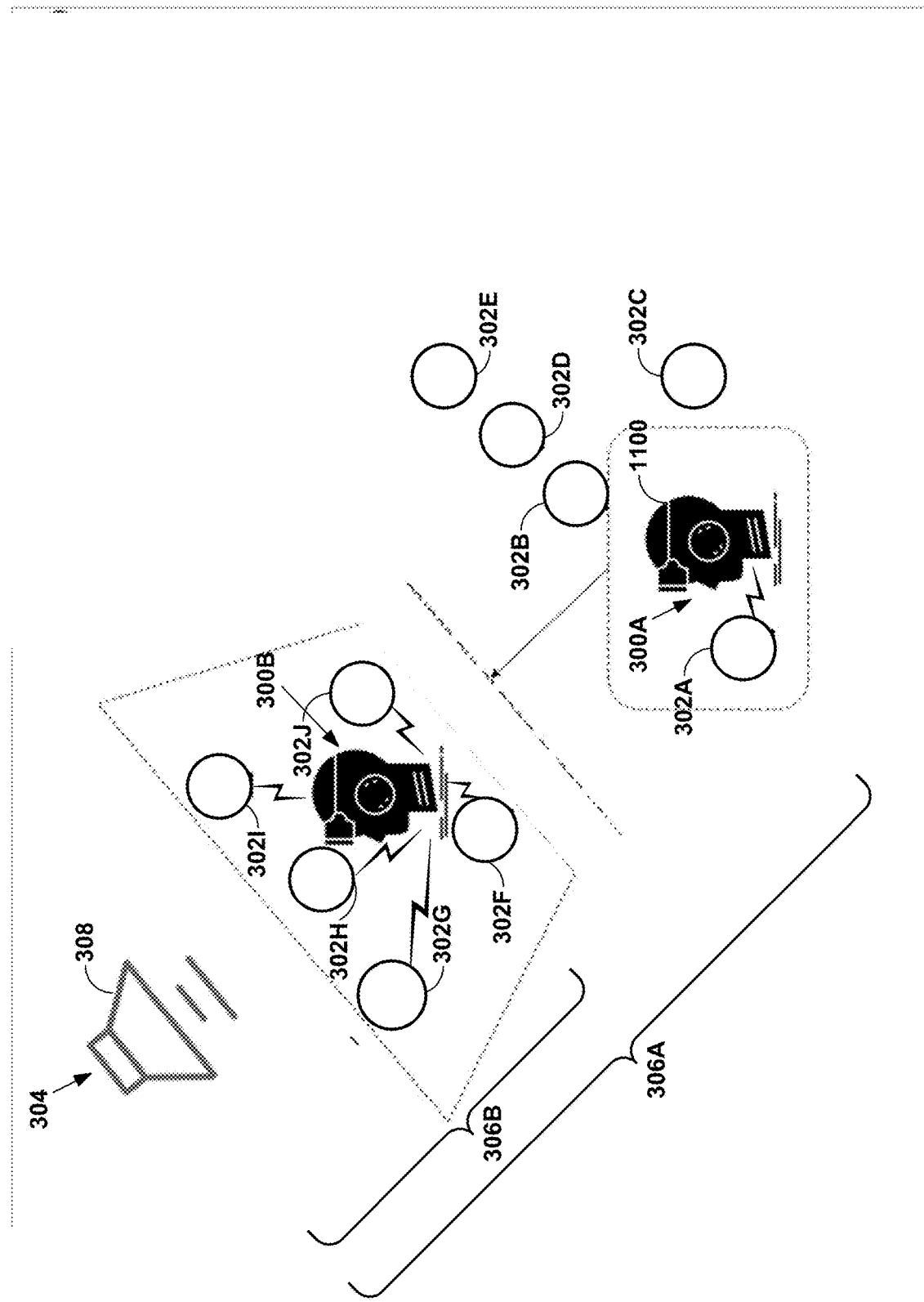
FIGS. 3A-3D are diagrams illustrating, in more detail, example operation of the stream selection unit shown in the example of FIG. 1A.

FIGS. 3A-3D are diagrams illustrating, in more detail, example operation of the stream selection unit shown in the example of FIG. 1A. As shown in the example of FIG. 3A, the stream selection unit 44 may determine that the VLI 45B indicates that the content consumer device 14 (shown as the VR device 1100) is at virtual location 300A. The stream selection unit 44 may next determine the CLI 45A for one or more of audio elements 302A-302J (which may represent not just microphones, such as the microphone 18 shown in FIG. 1A, but other types of capture devices, including arrays of microphones, other XR devices, synthetic audio sources, mobile phones—including so-called smartphones—and the like).

As described above, the stream selection unit 44 may obtain the audio streams 27. The stream selection unit 44 may interface with audio elements 302A-302J to obtain the audio streams 27. In some examples, the stream selection unit 44 may interact with an interface (such as a modem, receiver, a transmitter and/or a transceiver) to obtain the audio streams 27 in accordance with a fifth generation (5G) cellular standard, a personal area network (PAN), such as Bluetooth™, or some other open-source, proprietary or standardized communication protocol. Wireless communication of the audio streams is denoted as a lightning bolt in the examples of FIGS. 3A-3D, where the selected audio stream 19' is shown as being communication from the selected one or more of the audio elements 302 to the VR device 1100.

In any event, the stream selection unit 44 may next obtain energy maps in the manner described above, analyzing the energy maps to determine the audio source location 304, which may represent one example of the ASL 49 shown in the example of FIG. 1A. The energy maps may denote audio source location 304 as the energy at the audio source location 304 may be higher than the surrounding area. Given that each of the energy maps may denote this higher energy, the stream selection unit 44 may triangulate, based on the higher energy in the energy maps, the audio source location 304.

Next, the stream selection unit 44 may determine an audio source distance 306A as a distance between the audio source location 304 and the virtual location 300A of the VR device 1100. The stream selection unit 44 may compare the audio source distance 306A to an audio source distance threshold. The stream selection unit 44 may, in some examples, derive the audio source distance threshold based on the energy of the audio source 308. That is, when the audio source 308 has a higher energy (or, in other words, when the audio source 308 is louder), the stream selection unit 44 may increase the audio source distance threshold. When the audio source 308 has a lower energy (or, in other words, when the audio source 308 is quieter), the stream selection unit 44 may decrease the audio source distance threshold. In other examples, the stream selection unit 44 may obtain a statically defined audio source distance threshold, which may be statically defined or specified by the user 1102.

In any event, the stream selection unit 44 may select, when the audio source distance 306A is greater than the audio source distance threshold (which is assumed in this example for purposes of illustration), a single audio stream of the audio streams 27 captured by the audio elements 302A-302J ("audio elements 302") (i.e., the audio stream captured by the audio element 302A in the example of FIG. 3A). The stream selection unit 44 may output the corresponding one of the audio streams 27, which the audio decoding device 34 may decode and output as the audio stream 19'.

Assuming that the user moves from the virtual location 300A to the virtual location 300B, the stream selection unit 44 may determine an audio source distance 306B as a distance between the audio source location 304 and the virtual location 300B. In some examples, the stream selection unit 44 may only update after some configurable release time, which may refer to a time until the receiver region increases after the listener stops moving.

In any event, the stream selection unit 44 may again compare the audio source distance 306B to the audio source distance threshold. The stream selection unit 44 may select, when the audio source distance 306 is less than or equal than the audio source distance threshold (which is assumed in this example for purposes of illustration), multiple audio streams of the audio streams 27 captured by the audio elements 302A-302J ("audio elements 302") (i.e., the audio stream captured by the audio elements 302F-302J in the example of FIG. 3A). The stream selection unit 44 may output the corresponding one of the audio streams 27, which the audio decoding device 34 may decode and output as the audio stream 19'.

The stream selection unit 44 may also determine a proximity distance between the virtual location 300A and one or more (and possibly each) of the capture locations represented by the CLI 45A to obtain one or more proximity distances. The stream selection unit 44 may then compare the one or more proximity distances to a threshold proximity distance. The stream selection unit 44 may select, when the one or more proximity distances are greater than the threshold proximity distance, a smaller number of the audio streams 27 compared to when the proximity distance is less than or equal to the threshold proximity distance to obtain the audio streams 19'. However, the stream selection unit 44 may select, when the one or more of the proximity distances are less than or equal to the threshold proximity distance, a larger number of the audio streams 27 compared to when the proximity distance is less than or equal to the threshold proximity distance to obtain the audio streams 19'.

In other words, the stream selection unit 44 may attempt to select those of the audio streams 27 such that the audio streams 19' are most closely aligned to the virtual location 300B and surround the virtual location 300B. The proximity distance threshold may define such a threshold, which the wearable device 1100 may set or the stream selection unit 44 may again determine dynamically based on a quality of the audio elements 302F-302J, the gain or loudness of the audio source 308, tracking information 41 (e.g., to determine whether the user is facing the audio source 308), or any other factors.

In this respect, the stream selection unit 44 may increase audio spatialization accuracy when at the listener is at the location 300B. Furthermore, when at the location 300A, the stream selection unit 44 may reduce a bitrate, as only the audio stream captured by audio element 302A is used to reproduce the soundfield rather than multiple audio streams captured by audio elements 302B-302J.

Figure 3B:
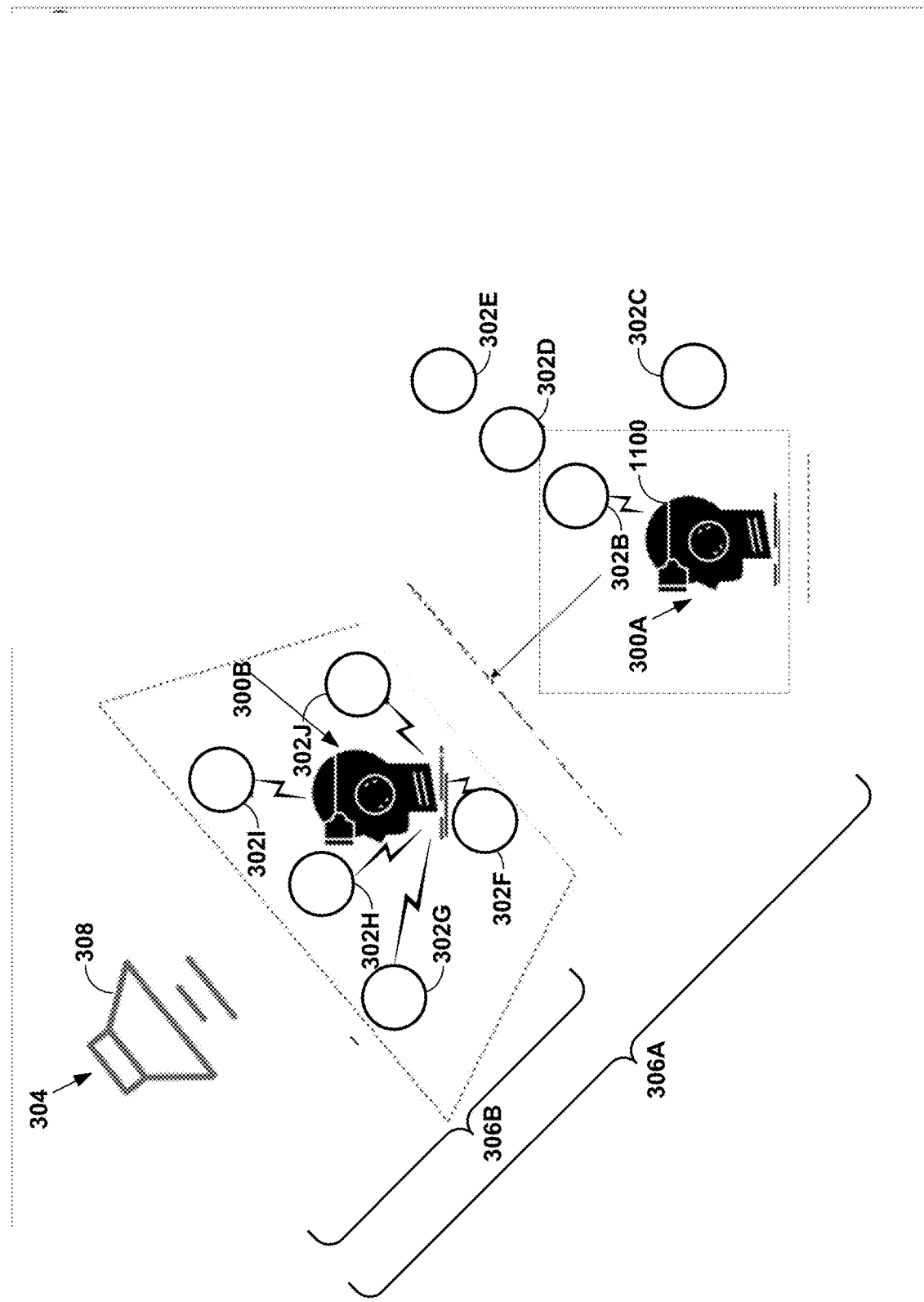

Referring next to the example of FIG. 3B, the stream selection unit 44 may determine that the audio stream captured by the audio element 302A is corrupted, noisy, or unavailable. The stream selection unit 44 may remove the audio stream from the CM 47 and reiterate through the audio streams 27 in accordance with the techniques described in more detail above to select a single one of the audio streams 27 (i.e., the audio stream captured by the audio element 302B in the example of FIG. 3B) given that the audio source distance 306A is greater than the audio source distance threshold.

Figure 3C:
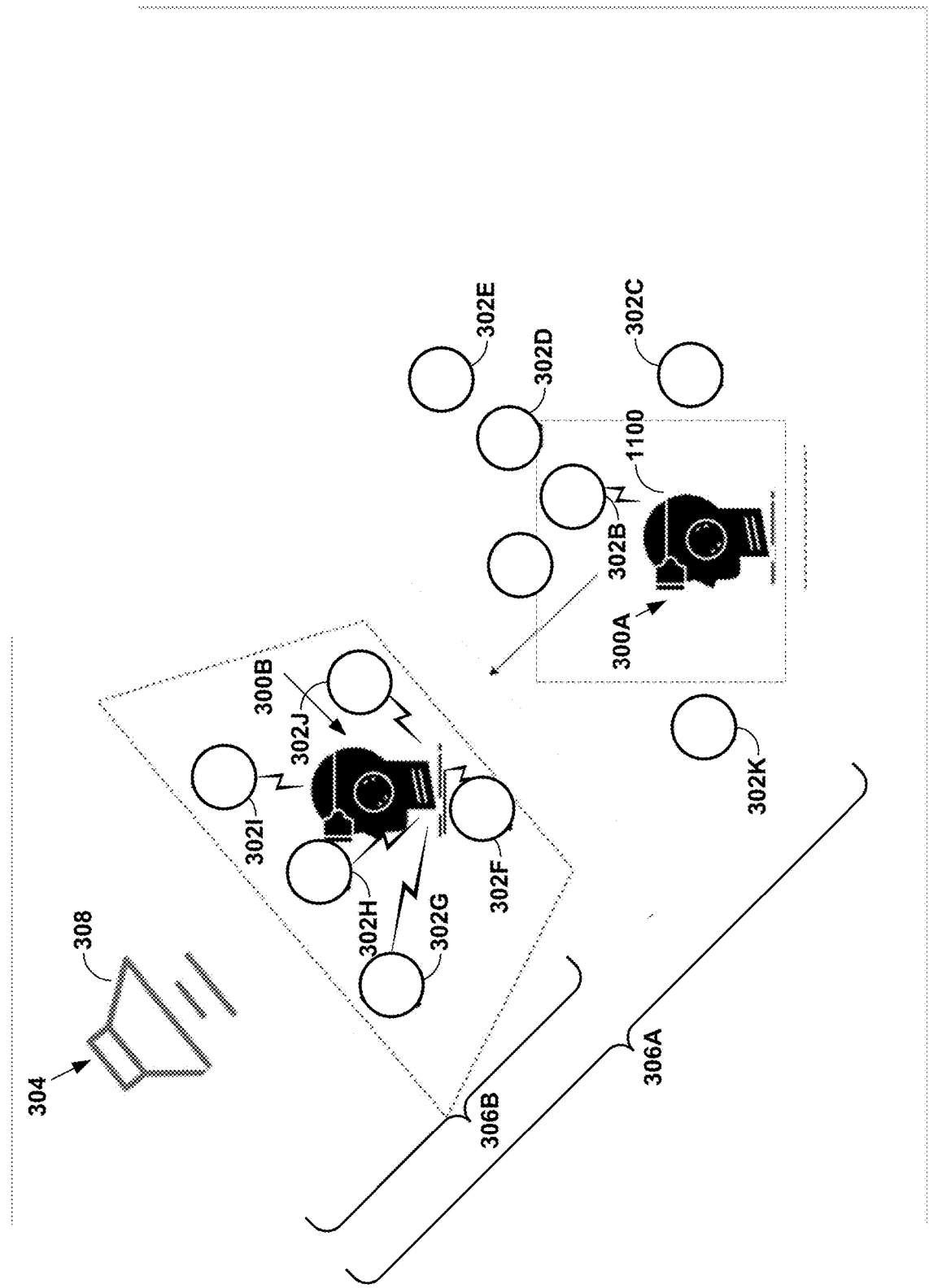

Referring next to the example of FIG. 3C, the stream selection unit 44 may obtain a new audio stream (generated by the audio element 302K) and corresponding new audio metadata that includes CLI 45A. The stream selection unit 44 may add the new audio streams to the CM 47 representative of the audio streams 27. The stream selection unit 44 may then reiterate through the audio streams 27 in accordance with the techniques described in more detail above to select a single one of the audio streams 27 (i.e., the audio stream captured by the audio element 302B in the example of FIG. 3C) given that the audio source distance 306A is greater than the audio source distance threshold.

Figure 3D:
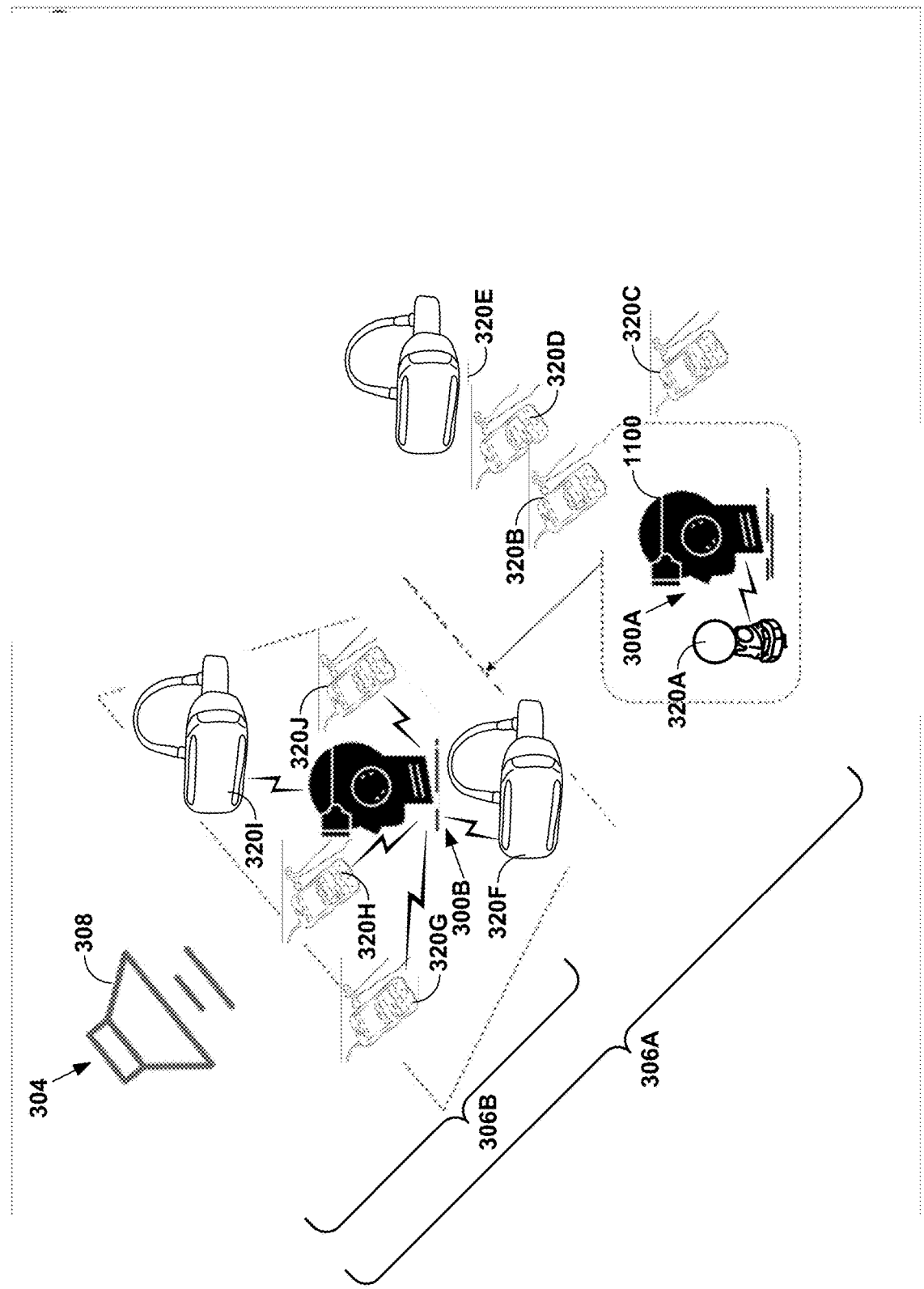

In the example of FIG. 3D, the audio elements 302 are replaced with specific devices 320A-320J ("devices 320"), where device 320A represents a dedicated microphone of device 320A, while devices 320B, 320C, 320D, 320G, 320H, and 320J represent smartphones 320. The devices 320E, 320F, and 320I may represent VR devices 320. Each of devices 320 may include the audio elements 302, which capture audio streams 27 that are selected in accordance with various aspects of the stream selection techniques described in this disclosure.

FIGS. 4A-4D are diagrams illustrating example operations password-based privacy restrictions performed by the source device and/or content consumer device shown in the examples of FIGS. 1A and 1B. As described above, in some use cases, it may be desirable to be able to control which of the plurality of audio streams generated by the source device 12 are available for playback by the content consumer device 14.

For example, audio from certain capture devices of the content capture devices 20 may contain sensitive information and/or the audio from certain capture devices of the content capture devices 20 may not be meant for exclusive access (e.g., unrestricted access by all users). It may be desirable to restrict access to audio from certain capture devices of the content capture devices 20 based on the type of information captured by the content capture device 20 and/or based on the location of physical zone in which the content capture device 20 resides.

Figure 4A:
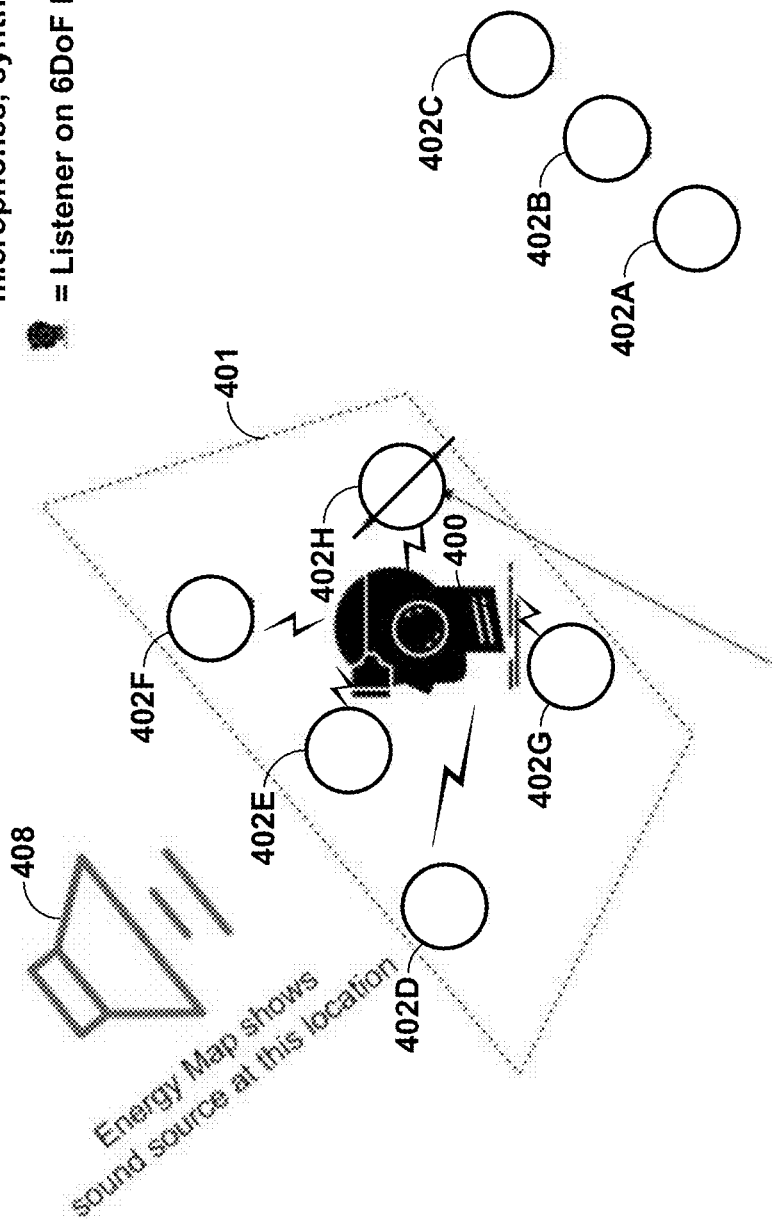
FIGS. 4A-4D are diagrams illustrating example operations of password-based privacy restrictions performed by the source device and/or content consumer device shown in the examples of FIGS. 1A and 1B.

As shown in the example of FIG. 4A, the stream selection unit 44 may determine that the VLI 45B indicates that the content consumer device 14 (shown as the VR device 400) is at virtual location 401. The VR device 400 may be a listener on a 6DoF playback system. The stream selection unit 44 may next determine the CLI 45A for one or more of audio elements 402A-402H (which may represent not just microphones, such as the microphone 18 shown in FIG. 1A, but other types of capture devices and sound generation devices, including microphone arrays, clusters of microphones, other XR devices, synthetic sound sources, mobile phones—including so-called smartphones—and the like).

As described above, the stream selection unit 44 may obtain the audio streams 27. The stream selection unit 44 may interface with audio elements 402A-402H and/or with source device 12 to obtain the audio streams 27. In some examples, the stream selection unit 44 may interact with an interface (such as a modem, receiver, a transmitter and/or a transceiver) to obtain the audio streams 27 in accordance with a fifth generation (5G) cellular standard, a personal area network (PAN), such as Bluetooth™, or some other open-source, proprietary or standardized communication protocol. Wireless communication of the audio streams is denoted as a lightning bolt in the examples of FIG. 4A, where the selected audio stream 19' is shown as being communication from the selected one or more of the audio elements 402 and/or source device 12 to the VR device 400.

In the example of FIG. 4A, the VR device 400 is at location 401, which is in the vicinity of an audio source 408. Using the techniques described above, and in greater detail below, the VR device 400 may use energy maps to determine that audio source 408 is at the location 401. FIG. 4A shows the audio elements 402D-402H at the location 401. The audio elements 402A-402C are not in the vicinity of the VR device 400.

In general, this disclosure includes techniques for receiving one or more audio streams based on conditional privacy restrictions for a zone of audio streams, cluster of audio streams, and/or individual audio streams associated with a password. A conditional privacy restriction may include a restriction indicating the rendering side device (e.g., VR device 400) should mute, and/or not decode, and/or not playback the audio stream(s). The source device 12 may generate password for one or more clusters of audio streams and/or audio streams associated with the cluster, and authentication may be performed based on the listener or user associated with the password. Rendering side privacy access for situations where audio streams cannot be restricted from the capture side provides privacy flexibility and added layers of security.

In examples of this disclosure, the one or more audio streams from audio elements 402 are from audio elements represented in an acoustic environment that comprises one or more sub-acoustic spaces. Each of the one or more audio streams representative of a respective soundfield. As used herein, an acoustic environment is represented as either an indoor environment or an outdoor environment, or both an indoor environment and an outdoor environment. The acoustic environment may include one or more sub-acoustic spaces that may include various acoustic elements. In this context, a cluster of audio elements may correspond to a sub-acoustic space. A sub-acoustic space may, for example, be a room, or an area within a room or building, the cabin of a vehicle, a classroom, an area within a classroom, or any subset of any type of acoustic space. An example of an outdoor environment could include a car, buildings, walls, a forest, etc. An acoustic space (sub-acoustic space) may be an example of an acoustic environment and may be an indoor space, an outdoor space, and/or a virtual space. As used herein, an audio element may be a sound captured by a microphone (e.g., directly captured from near-filed sources or reflections from far-field sources whether real or synthetic), a sound captured by an array of microphones, a soundfield previously synthesized (e.g., a special effect and/or immersion effect), a mono sound synthesized from text to speech, and/or a reflection of a virtual sound from an object in the acoustic environment.

In some examples, a content creator may be configured to set privacy settings at each audio source or clusters/zones of audio sources. In other examples, the controller 31 at the source device 12 may be configured to determine if privacy settings are desired by the set for the plurality of audio streams, such as through explicit instructions received by the controller 31. Based on the privacy settings for the zones, the controller 31 may cause a password generator to generate a password for particular privacy settings of the zones/clusters (e.g., sub-acoustic spaces). The privacy settings may include one or more of masking a zone, nulling a zone, toggling a zone, and/or applying an acoustic occluder as restricted or unrestricted. In one example, toggling the zones indicates if one or more of the plurality of audio streams are restricted or unrestricted. In other examples, toggling the privacy restrictions only indicates audio streams that are restricted.

The controller 31 may be configured to embed the password into either a bitstream and/or a side channel and transmit the password to VR device 400. The VR device 400 may be configured to receive the password from the controller (or from another source) and send the password back to the controller when requesting audio streams.

Figure 4B:
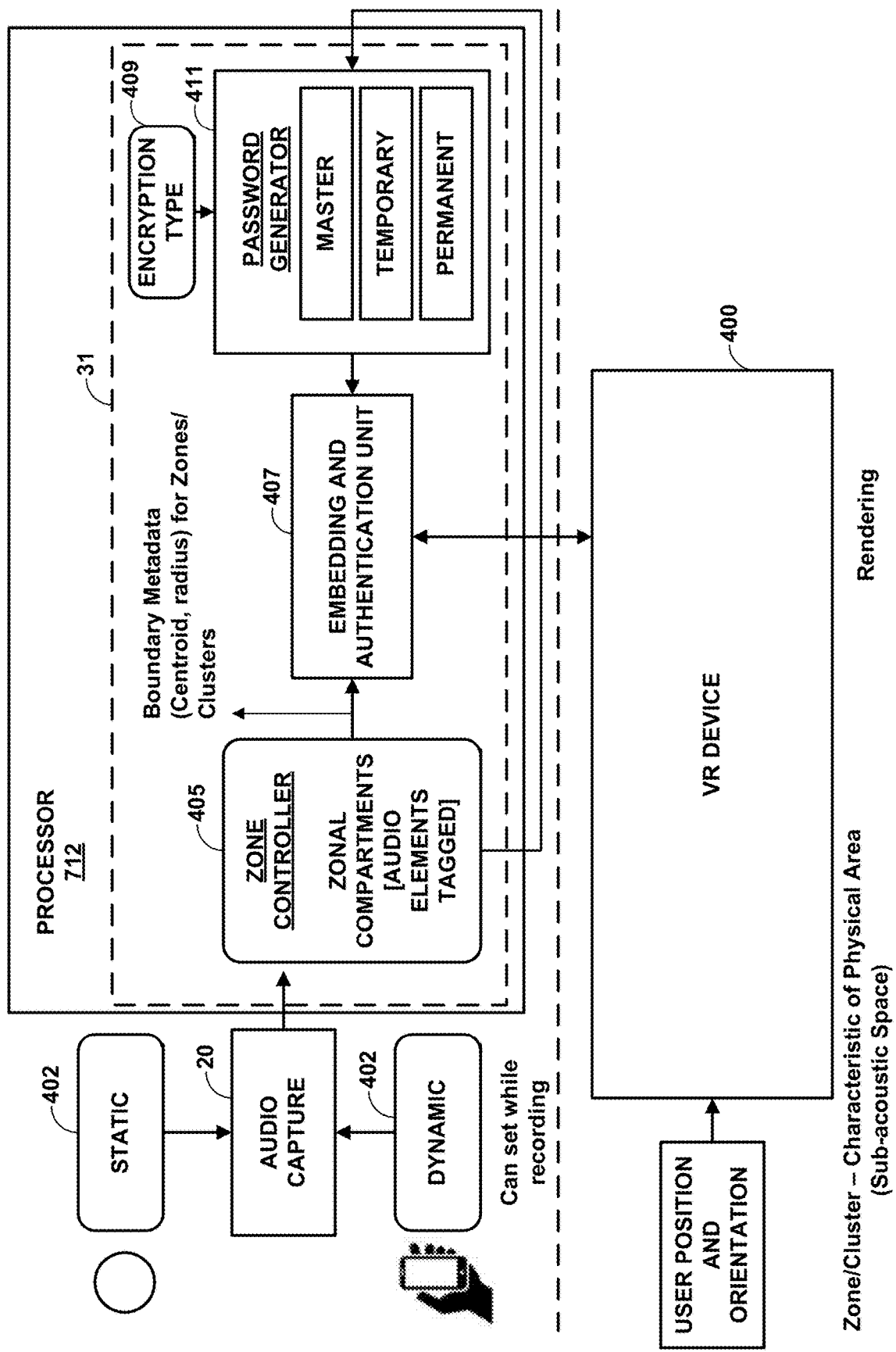

FIG. 4B is a block diagram illustrating the operation of the controller 31 of the source device 12 in one example of the disclosure. In one example, the controller 31 may be implemented as a processor 712. The processor 712 is described in more detail below with reference to FIG. 7. As described above with reference to FIG. 1A, the source device 12 may capture and/or generate audio data using the content capture device 20. The content capture device 20 may capture and/or generate audio data from the audio elements 402. The audio elements 402 may include static sources, such as static single microphones or clusters of microphones. The audio elements 402 may be live sources. Alternatively or in addition, the audio elements 402 may include dynamic audio sources (e.g., dynamic in terms of use and/or position), such as mobile phones. In some examples, dynamic audio sources may be synthetic audio sources. The audio streams may come from single, physically spaced audio sources, or from clusters of audio sources in a single physical location.

In accordance with the techniques of this disclosure, the controller 31 may be configured to control the playback of audio streams from various audio elements at the rendering side (e.g., the VR device 400) without the audio elements themselves controlling privacy restrictions. In this way, audio streams from various audio elements may be gathered and disseminated in a dynamic setting with privacy restrictions without requiring individual audio elements to set and/or manage such privacy settings. The techniques of this disclosure provide privacy flexibility when serving dynamic sources of audio data and may add additional layers of security.

In some examples, it may be beneficial to group audio sources that are located physically close to each other into a cluster or zone (e.g., a sub-acoustic space), as each individual audio source in a physically co-located cluster may sense some or all of the audio as each of the other audio sources in the same physical zone. As such, in some examples of the disclosure, the controller 31 may be configured to mask, null, and/or toggle audio streams from a zone of audio sources. In this context, masking a zone may refer to adjusting the audio gain of the zone down. Nulling a zone may refer to silencing audio coming from the zone (e.g., using beamforming). Toggling a zone may refer to marking an audio stream or groups of audio streams as unrestricted (e.g., able to be decoded and/or played) or restricted (e.g., not able to be decoded and/or played). A privacy toggle of on (e.g., restricted) indicates the VR device should mute and/or generally not decode or playback the audio stream. A privacy toggle of off (e.g., unrestricted or common access) indicates that any user may decode and playback the audio stream. In this way, the audio engineer or the content creator may grant exclusive access to certain audio sources for non-restricted users or based on hierarchical privacy setting ranks.

As shown in FIG. 4B, the zone controller 405 of the controller 31 may be configured to receive and/or access the plurality of audio streams captured by the content capture device 20. The zone controller 405 may be configured to compartmentalize the audio streams into certain zones by the physical locations of the audio sources. In some examples, the zone controller 405 may tag (e.g., generate metadata) that indicates to which zone a particular audio source belongs. The controller 31 may further generate boundary metadata for the zone, including a centroid location and a radius.

In some examples, a content creator may be configured to set privacy settings at each audio source or cluster/zones of audio sources. In other examples, the controller 31 may be configured to determine if privacy settings are desired by the set for the plurality of audio streams, such as through explicit instructions received by the controller 31. Based on the privacy settings for the zones, the controller 31 may cause a password generator 411 to generate a password for particular privacy settings of the zones. In some examples, the controller 31 may encrypt the password according to an encryption type 409 (e.g., Advanced Encryption Standard, Rivest-Shamir-Adleman (RSA) encryption, etc.).

An embedding and authentication unit 407 of the controller 31 may be configured to embed the password into either the bitstream 27 and/or the side channel 33 (see FIG. 1A) and transmit the password to the VR device 400 or any other content consumer device, including the content consumer device 14 of FIG. 1A and FIG. 1B. In other examples, the VR device 400 may obtain the password through other means (e.g., offline through another communication or from another source). The VR device 400 may be configured to receive the password from the controller 31 (or from another source) and send the password back to the controller 31 when requesting audio streams.

The embedding and authentication unit 407 of the controller 31 embeds individual passwords generated for clusters of audio elements and/or individual audio elements with the audio streams and metadata retrieved by the controller 31. The embedding and authentication unit 407 of the controller 31 also performs authentication based on the password provided by the VR device 400. The embedding and authentication unit 407 may send the passwords to VR device 400 in data packets (e.g., via a modem or transceiver). In some examples, the embedding and authentication unit 407 may be encoded in a binary representation and may be included in an audio packet.

In one example, the controller 31 may be configured to only send unrestricted audio streams to the VR device 400 based on the authenticated password. That is, in general, the VR device 400 may be configured to receive unrestricted audio streams of one or more audio streams based on privacy restrictions associated with a password. As described above, the one or more audio streams are from audio elements represented in an acoustic environment that comprises one or more sub-acoustic spaces, each of the one or more audio streams representative of a respective soundfield. The VR device 400 may then be configured to generate the respective soundfields of the unrestricted audio streams. As such, in this example, the VR device 400 may obtain the password from the controller 31 that transmits the one or more audio streams, or may obtain the password through other means. The VR device 400 may request audio streams from the controller 31 and may provide the password back to the controller 31. In this example, the controller 31 may transmit only the audio streams that are unrestricted based on the password.

In other example, the controller device 31 may be configured to send one or more of audio streams to VR device 400 along with instructions (e.g., data or audio metadata) on how the audio streams should be masked, silenced, nulled, and/or toggled (e.g., generally, how playback should be restricted). For example, the VR device 400 may request audio streams and provide the password back to the controller 31. The controller 31 may transmit all the audio streams to the VR device 400. However, the controller 31 may further include data (e.g., audio metadata) that indicates if particular streams of the transmitted streams are to be restricted based on the password authenticated by embedding and authentication unit 407. The VR device 400 would then restrict playback of the restricted audio streams based on the data (e.g., audio metadata).

Accordingly, in this example, the VR device 400 may be configured to send the password to a host device (e.g., the controller 31), and receive, from the host device, unrestricted audio streams of the one or more audio streams, and restricted audio streams of the one or more audio streams. The VR device 400 may further receive data indicating restricted playback of the restricted audio streams based on privacy restrictions associated with the password. The VR device 400 would then restrict playback of the respective soundfields of the restricted audio streams based on the data indicating the restricted playback. The VR device 400 would also generate the respective soundfields of the unrestricted audio streams.

In one example, to restrict playback of the respective soundfields of the restricted audio streams based on the data indicating the restricted playback, the VR device 400 may mask, toggle, or null the restricted audio streams. In other examples, to restrict playback of the respective soundfields of the restricted audio streams based on the data indicating the restricted playback, the VR device 400 may be configured to apply an acoustic occluder to the restricted audio streams.

In still other examples, the VR device 400 does not provide the password to the controller 31. Rather, the controller 31 may transmit all audio streams, as well as a plurality of data (e.g., audio metadata) that indicates if particular streams are restricted based on particular types of passwords. That is, the audio metadata may include privacy restrictions instructions (e.g., mask, null, toggle, occlude, etc.) for each of a plurality of passwords. The VR device 400 may then associate the password stored at the VR device 400 with the audio metadata corresponding to the same type of password. VR device 400 may then restrict playback based on the streams that are restricted based on the association.

Accordingly, in this example, the VR device 400 may be configured to receive, from the host device (e.g. the controller 31), unrestricted audio streams of the one or more audio streams, and restricted audio streams of the one or more audio streams. The VR device 400 may further receive data indicating restricted playback of the restricted audio streams, and may associate the password with the data indicating the restricted playback. The VR device 400 may then restrict playback of the respective soundfields of the restricted audio streams based on the data indicating the restricted playback associated with the password. The VR device 400 would also generate the respective soundfields of the unrestricted audio streams.

Again, in this example, to restrict playback of the respective soundfields of the restricted audio streams based on the data indicating the restricted playback, the VR device 400 may mask, toggle, or null the restricted audio streams. In other examples, to restrict playback of the respective soundfields of the restricted audio streams based on the data indicating the restricted playback, the VR device 400 may be configured to apply an acoustic occluder to the restricted audio streams.

As described above, the privacy settings may include one or more of masking a zone, nulling a zone, or toggling a zone as restricted or unrestricted. In one example, toggling the zones indicates if one or more of the plurality of audio streams are restricted or unrestricted. In other examples, toggling the privacy restrictions only indicates audio streams that are restricted.

As generally described above, the controller 31 may generate the passwords at many different hierarchy levels with reference to the audio streams. The privacy restrictions associated with any one password may be based on individual audio elements, any combination of audio elements, clusters or zones of audio elements (e.g., associated with sub-acoustics spaces), cluster of or zones of audio elements within a particular region of a sub-acoustic space, and/or combinations of cluster or zones of audio elements. In addition, the privacy restrictions associated with the passwords may be associated with not just physical audio sources (e.g., the static and dynamic audio elements 402), but may be associated with synthetic audio sources. The synthetic audio sources may include so-called immersion effects (e.g., reflections, echo, reverb, etc.) that may be used to alter audio streams to create special effects and/or mimic certain acoustic environments. The privacy restrictions associated with a password may be used to turn on or off such immersion effects.

In other examples, the privacy passwords may be associated with a zone or cluster of audio elements, but only relate to specific audio elements within a cluster. For example, if password authentication fails for a particular zone, the privacy restrictions associated with the password may instruct the VR device to restrict playback on only a subset of audio elements within the zone or cluster. In still other examples, the privacy restrictions associated with a password may relate to scene graph. In this context, a scene graph is a hierarchical data structure that may be used to indicate the relationships between various audio streams of a plurality of audio streams. The password may be associated with privacy restrictions at various levels of an audio scene graph.

In one example of the disclosure, the password is a master password associated with unrestricted privacy restrictions. In this example, the controller 31 may be configured to generate each of the plurality of audio streams. The master password may be a password for a super user/administrator. The master password gives unrestricted access to all audio streams in their entirety.

In another example of the disclosure, the password is a permanent password associated with conditional privacy restrictions. In this example, the controller 31 may be configured to generate the one or more of the plurality of audio streams based on the conditional privacy restrictions, wherein the conditional privacy restrictions indicate if one or more of the plurality of audio streams are restricted or unrestricted. In one example, the controller 31 may be configured to generate audio metadata (such as the audio metadata described above) that further includes respective conditional privacy restrictions indicating if one or more of the plurality of audio streams are restricted or unrestricted based on the permanent password. As will be described below, the conditional privacy restrictions may include masking (e.g., as indicated by a gain value), nulling, and/or toggling. In one example, the permanent password remains valid until reset. The controller 31 may generate the permanent password for individual zones, groups of zones, individual audio elements, groups of audio elements, and/or synthetic sources.

In another example of the disclosure, the password is a temporary password associated with conditional privacy restrictions. In this example, the controller 31 may be configured to generate the one or more of the plurality of audio streams based on the conditional privacy restrictions, wherein the conditional privacy restrictions rights indicate if one or more of the plurality of audio streams are restricted or unrestricted. In one example, the controller 31 may be configured to generate audio metadata (such as the audio metadata described above) that further includes respective conditional privacy restrictions indicating if one or more of the plurality of audio streams are restricted or unrestricted based on the temporary password. As will be described below, the conditional privacy restrictions may include masking (e.g., as indicated by a gain value), nulling, and/or toggling. In one example, the permanent password remains valid until reset. In one example, the temporary password remains valid for a fixed duration and expires after the fixed duration. The controller 31 may automatically invalidate the temporary password after the duration expires.

In one example, the privacy restrictions include respective gain values associated with respective audio streams of the one or more of the plurality of audio streams. In another example, the privacy restrictions include respective nulling indications associated with respective audio streams of the one or more of the plurality of audio streams. In another example, the privacy restrictions include respective toggling indications associated with respective audio streams of the one or more of the plurality of audio streams.

Figure 4C:
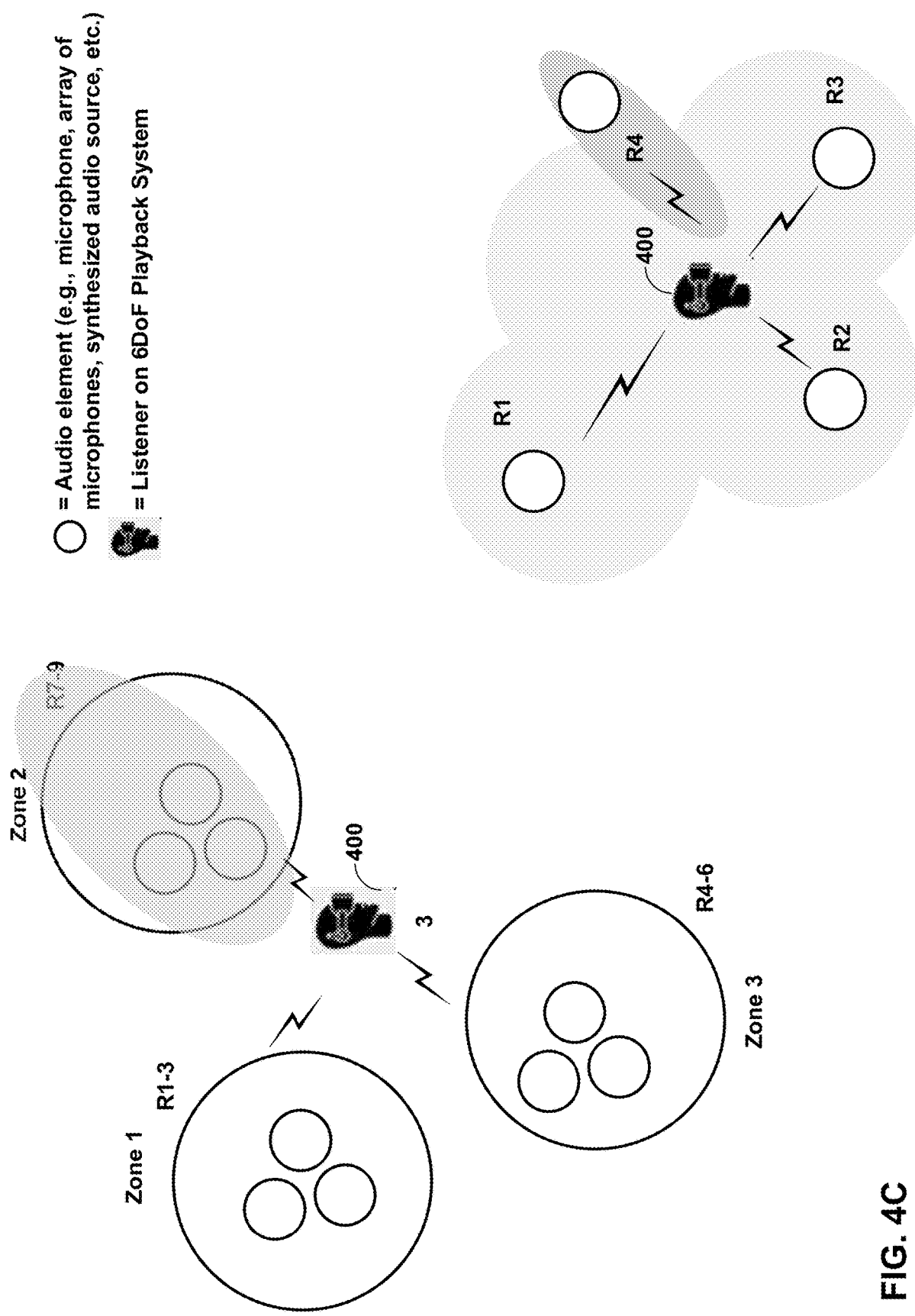

FIG. 4C is a diagram showing examples of masking and nulling zones and/or individual audio sources. In scenario 420, the VR device 400 was issued a password that is associated with the privacy restriction of masking zone 2 (audio elements R7-R9). In this example, the VR device 400 further receives gain values for zone 2 to apply when playing back audio streams from zone 2. In scenario 430, the VR device 400 was issued a password that is associated with the privacy restriction of nulling audio element R4. In this example, the VR device 400 may completely mute the audio stream from audio element R4 (e.g., through beamforming or applying a zero gain).

Figure 4D:
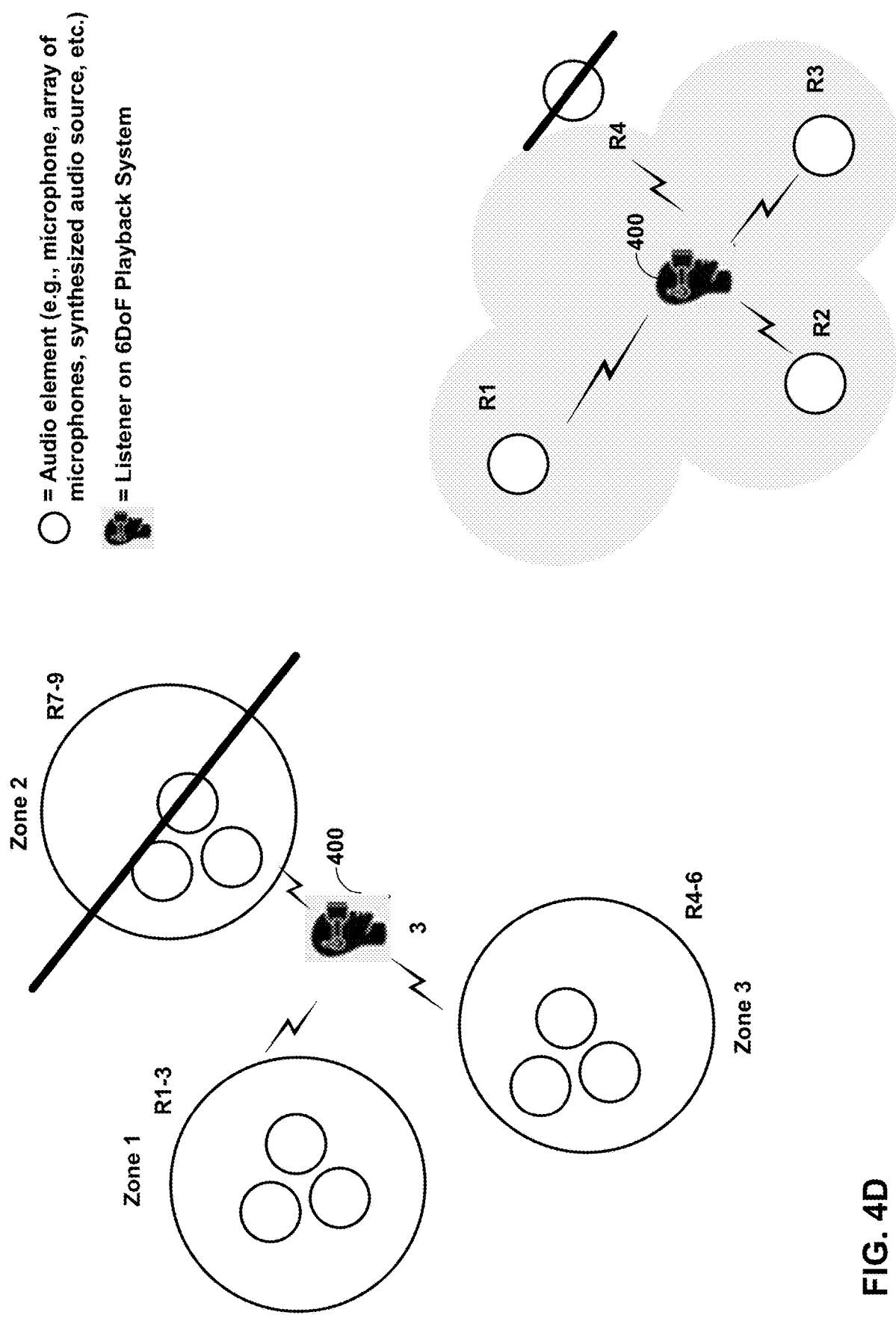

FIG. 4D is a diagram showing examples of toggling zones and/or individual audio sources. In scenario 440, the VR device 400 was issued a password that is associated with the privacy restriction of toggling zone 2 (audio elements R7-R9) to restricted. In this example, the VR device 400 refrains from decoding and/or playing back audio streams from zone 2. In scenario 450, the VR device 400 was issued a password that is associated with the privacy restriction of toggling audio element R4. In this example, the VR device 400 refrains from decoding and/or playing back audio streams from audio element R4.

As can be seen from the above description the techniques of this disclosure may provide rendering side (e.g., the VR device 400) privacy access for situations where audio streams cannot be restricted from the capture side. Such techniques provide privacy flexibility when serving dynamic sources of audio data and may add additional layers of security.

Figure 5:
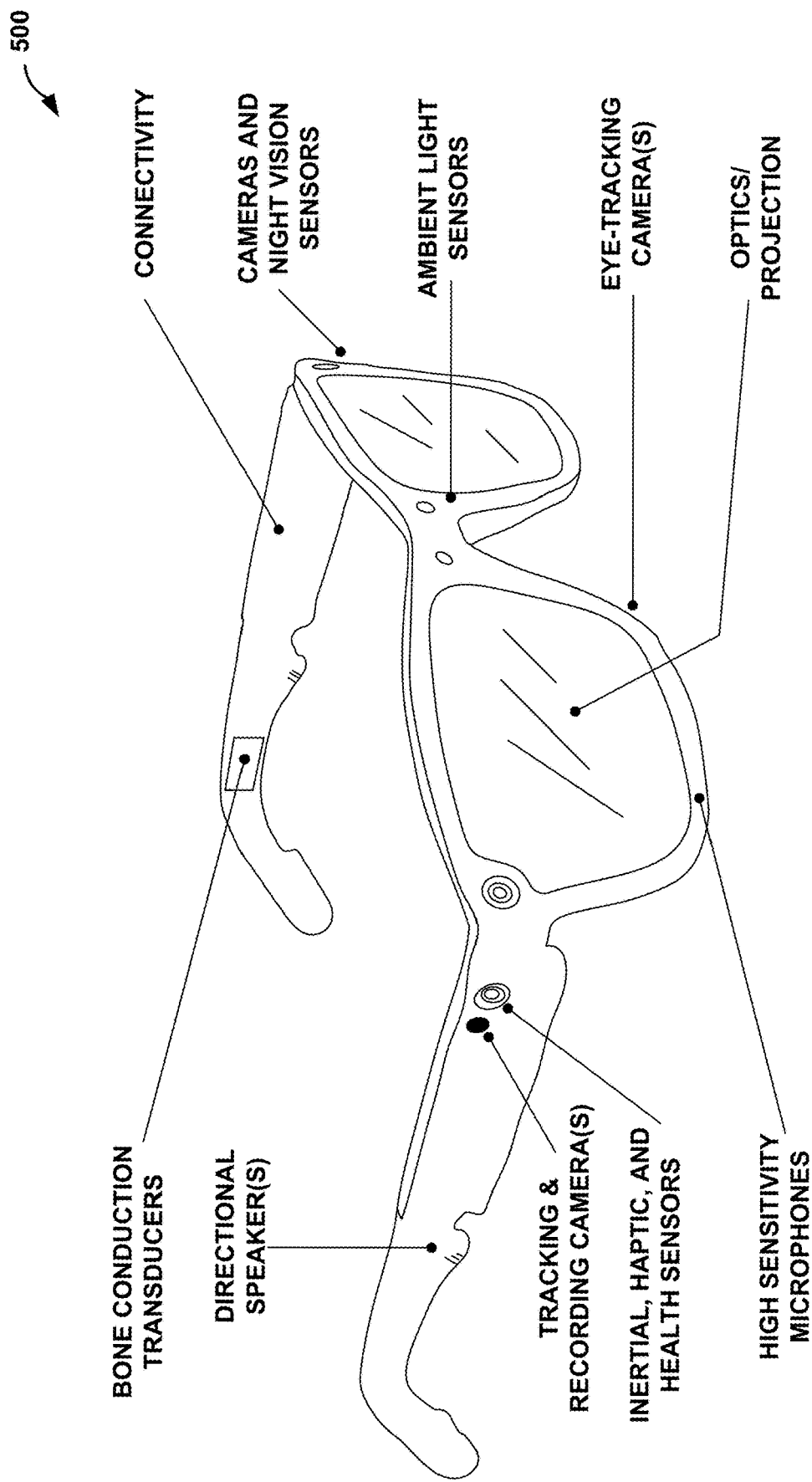
FIG. 5 is a diagram illustrating an example of a wearable device that may operate in accordance with various aspect of the techniques described in this disclosure.

FIG. 5 is a diagram illustrating an example of a wearable device 500 that may operate in accordance with various aspect of the techniques described in this disclosure. In various examples, the wearable device 500 may represent a VR headset (such as the VR headset 1100 described above), an AR headset, an MR headset, or any other type of extended reality (XR) headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may represent a catchall term for VR, AR, and MR. More information regarding terminology for XR can be found in a document by Jason Peterson, entitled "Virtual Reality, Augmented Reality, and Mixed Reality Definitions," and dated Jul. 7, 2017.

The wearable device 500 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 500 may communicate with the computing device supporting the wearable device 500 via a wired connection or a wireless connection.

In some instances, the computing device supporting the wearable device 500 may be integrated within the wearable device 500 and as such, the wearable device 500 may be considered as the same device as the computing device supporting the wearable device 500. In other instances, the wearable device 500 may communicate with a separate computing device that may support the wearable device 500. In this respect, the term "supporting" should not be understood to require a separate dedicated device but that one or more processors configured to perform various aspects of the techniques described in this disclosure may be integrated within the wearable device 500 or integrated within a computing device separate from the wearable device 500.

For example, when the wearable device 500 represents the VR device 500, a separate dedicated computing device (such as a personal computer including the one or more processors) may render the audio and visual content, while the wearable device 500 may determine the translational head movement upon which the dedicated computing device may render, based on the translational head movement, the audio content (as the speaker feeds) in accordance with various aspects of the techniques described in this disclosure. As another example, when the wearable device 500 represents smart glasses, the wearable device 500 may include the one or more processors that both determine the translational head movement (by interfacing within one or more sensors of the wearable device 500) and render, based on the determined translational head movement, the speaker feeds.

As shown, the wearable device 500 includes one or more directional speakers, and one or more tracking and/or recording cameras. In addition, the wearable device 500 includes one or more inertial, haptic, and/or health sensors, one or more eye-tracking cameras, one or more high sensitivity audio microphones, and optics/projection hardware. The optics/projection hardware of the wearable device 500 may include durable semi-transparent display technology and hardware.

The wearable device 500 also includes connectivity hardware, which may represent one or more network interfaces that support multimode connectivity, such as 4G communications, 5G communications, Bluetooth, etc. The wearable device 500 also includes one or more ambient light sensors, and bone conduction transducers. In some instances, the wearable device 500 may also include one or more passive and/or active cameras with fisheye lenses and/or telephoto lenses. Although not shown in FIG. 5, the wearable device 500 also may include one or more light emitting diode (LED) lights. In some examples, the LED light(s) may be referred to as "ultra bright" LED light(s). The wearable device 500 also may include one or more rear cameras in some implementations. It will be appreciated that the wearable device 500 may exhibit a variety of different form factors.

Furthermore, the tracking and recording cameras and other sensors may facilitate the determination of translational distance. Although not shown in the example of FIG. 5, wearable device 500 may include other types of sensors for detecting translational distance.

Although described with respect to particular examples of wearable devices, such as the VR device 500 discussed above with respect to the examples of FIG. 2 and other devices set forth in the examples of FIGS. 1A and 1B, a person of ordinary skill in the art would appreciate that descriptions related to FIGS. 1A, 1B, and 2 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 6A:
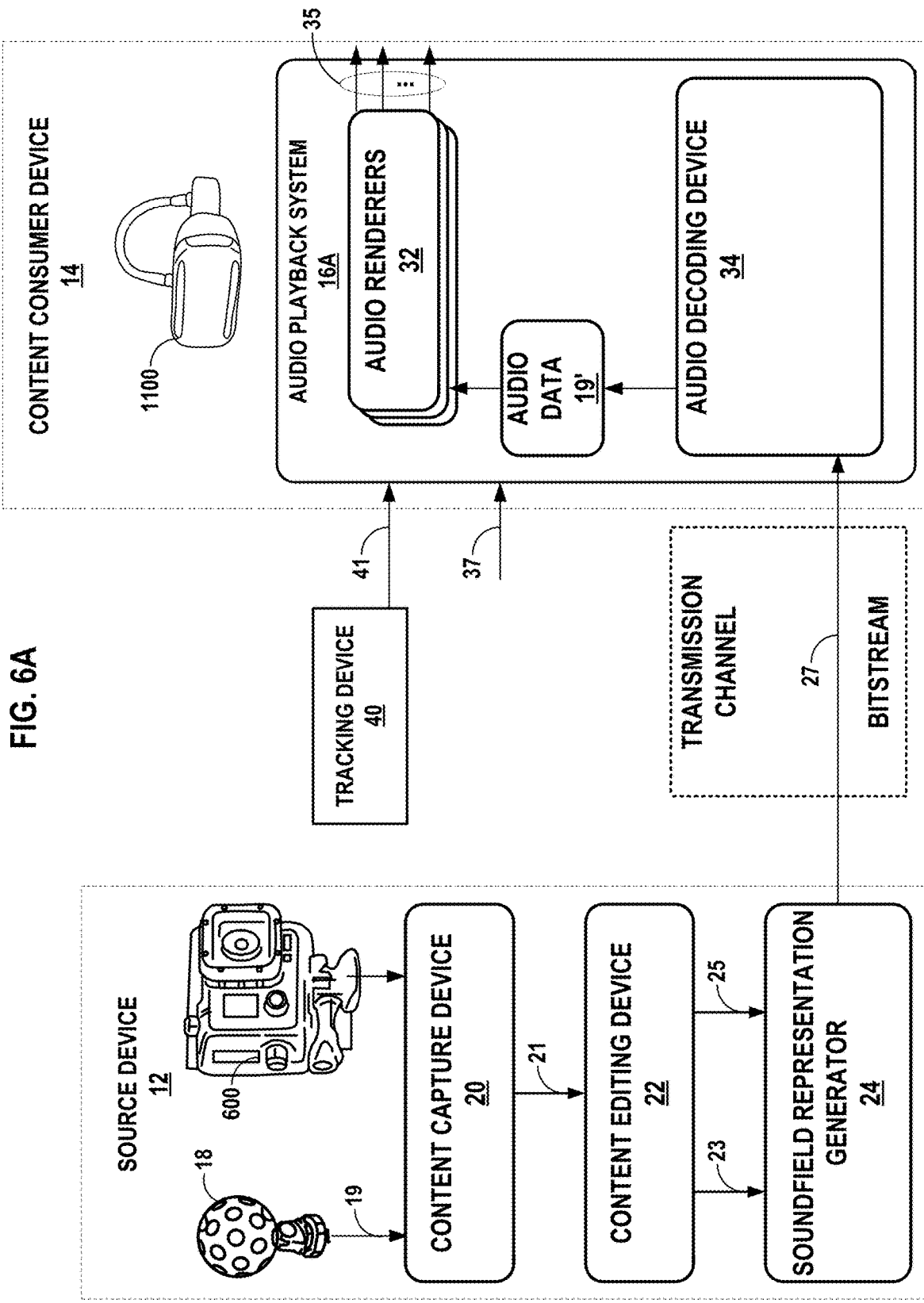
FIGS. 6A and 6B are diagrams illustrating other example systems that may perform various aspects of the techniques described in this disclosure.
Figure 6B:
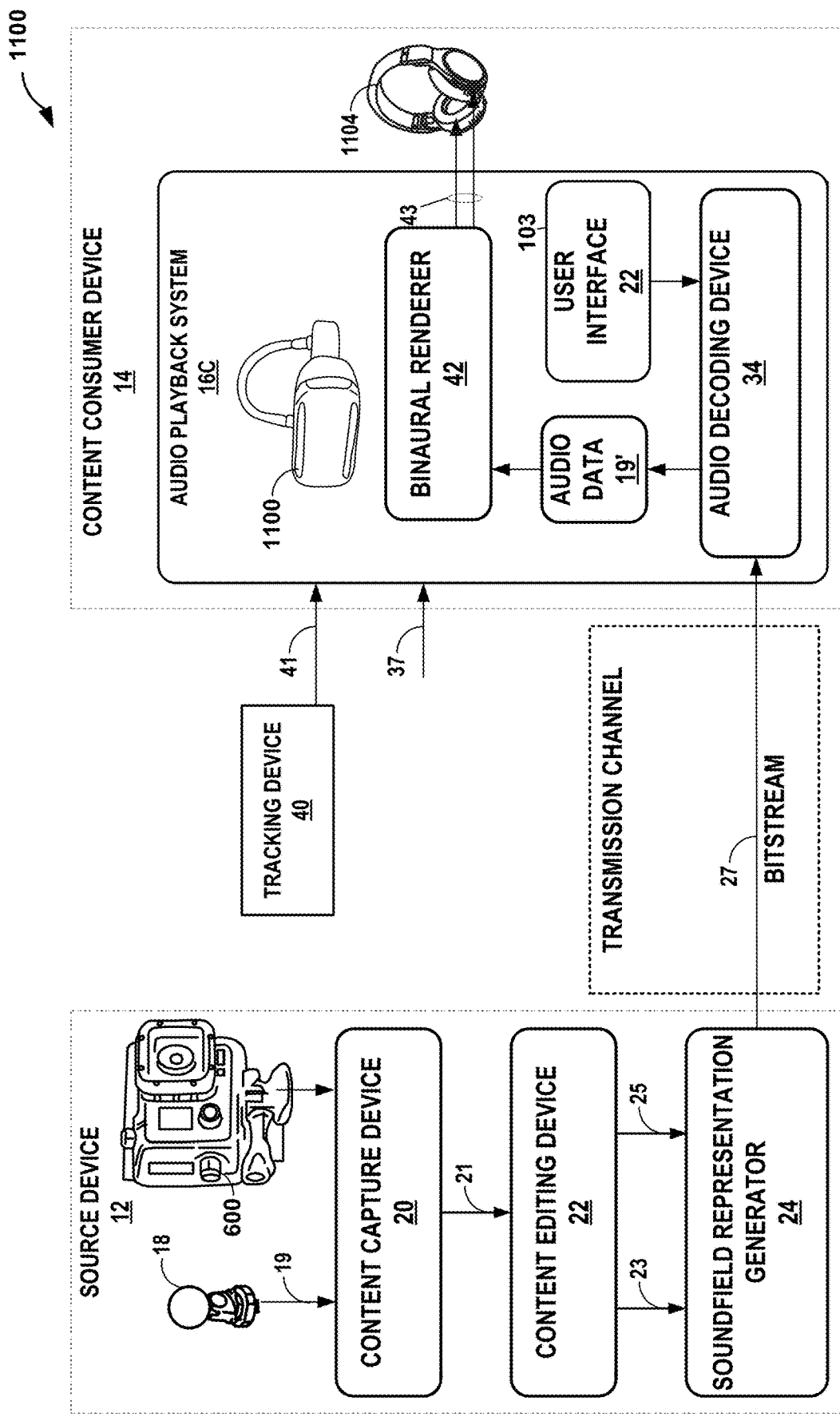

FIGS. 6A and 6B are diagrams illustrating example systems that may perform various aspects of the techniques described in this disclosure. FIG. 6A illustrates an example in which the source device 12 further includes a camera 600. The camera 600 may be configured to capture video data, and provide the captured raw video data to the content capture device 20. The content capture device 20 may provide the video data to another component of the source device 12, for further processing into viewport-divided portions.

In the example of FIG. 6A, the content consumer device 14 also includes the wearable device 1100. It will be understood that, in various implementations, the wearable device 1100 may be included in, or externally coupled to, the content consumer device 14. The wearable device 1100 includes display hardware and speaker hardware for outputting video data (e.g., as associated with various viewports) and for rendering audio data.

FIG. 6B illustrates an example in which the audio renderers 32 shown in FIG. 6A are replaced with a binaural renderer 42 capable of performing binaural rendering using one or more HRTFs or the other functions capable of rendering to left and right speaker feeds 43. The audio playback system 16C may output the left and right speaker feeds 43 to headphones 1104.

The headphones 1104 may couple to the audio playback system 16C via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 1104 may recreate, based on the left and right speaker feeds 43, the soundfield represented by the audio data 19'. The headphones 1104 may include a left headphone speaker and a right headphone speaker which are powered (or, in other words, driven) by the corresponding left and right speaker feeds 43.

Figure 7:
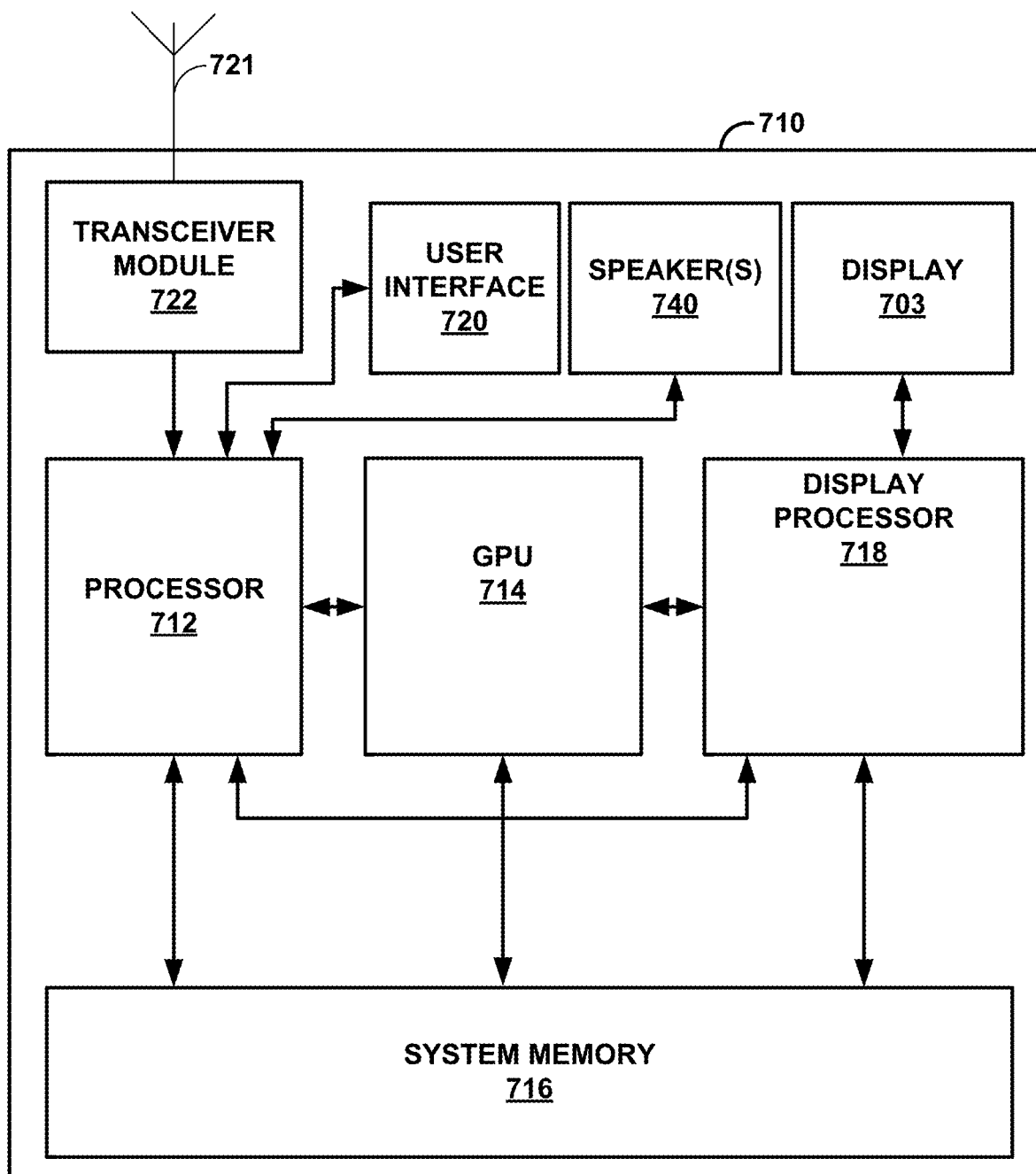
FIG. 7 is a block diagram illustrating example components of one or more of the source device and the content consumer device shown in the example of FIG. 1.

FIG. 7 is a block diagram illustrating example components of one or more of the source device and the content consumer device shown in the example of FIG. 1. In the example of FIG. 7, the device 710 includes a processor 712 (which may be referred to as "one or more processors" or "processor(s)"), a graphics processing unit (GPU) 714, system memory 716, a display processor 718, one or more integrated speakers 740, a display 703, a user interface 720, antenna 721, and a transceiver module 722. In examples where the device 710 is a mobile device, the display processor 718 is a mobile display processor (MDP). In some examples, such as examples where the source device 710 is a mobile device, the processor 712, the GPU 714, and the display processor 718 may be formed as an integrated circuit (IC).

For example, the IC may be considered as a processing chip within a chip package and may be a system-on-chip (SoC). In some examples, two of the processors 712, the GPU 714, and the display processor 718 may be housed together in the same IC and the other in a different integrated circuit (i.e., different chip packages) or all three may be housed in different ICs or on the same IC. However, it may be possible that the processor 712, the GPU 714, and the display processor 718 are all housed in different integrated circuits in examples where the device 710 is a mobile device.

Examples of the processor 712, the GPU 714, and the display processor 718 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 712 may be the central processing unit (CPU) of the source device 710. In some examples, the GPU 714 may be specialized hardware that includes integrated and/or discrete logic circuitry that provides the GPU 714 with massive parallel processing capabilities suitable for graphics processing. In some instances, GPU 714 may also include general purpose processing capabilities, and may be referred to as a general-purpose GPU (GPGPU) when implementing general purpose processing tasks (i.e., non-graphics related tasks). The display processor 718 may also be specialized integrated circuit hardware that is designed to retrieve image content from the system memory 716, compose the image content into an image frame, and output the image frame to the display 703.

The processor 712 may execute various types of the applications. Examples of the applications include web browsers, e-mail applications, spreadsheets, video games, other applications that generate viewable objects for display, or any of the application types listed in more detail above. The system memory 716 may store instructions for execution of the applications. The execution of one of the applications on the processor 712 causes the processor 712 to produce graphics data for image content that is to be displayed and the audio data 19 that is to be played (possibly via integrated speaker 740). The processor 712 may transmit graphics data of the image content to the GPU 714 for further processing based on and instructions or commands that the processor 712 transmits to the GPU 714.

The processor 712 may communicate with the GPU 714 in accordance with a particular application processing interface (API). Examples of such APIs include the DirectX® API by Microsoft®, the OpenGL® or OpenGL ES® by the Khronos group, and the OpenCL'; however, aspects of this disclosure are not limited to the DirectX, the OpenGL, or the OpenCL APIs, and may be extended to other types of APIs. Moreover, the techniques described in this disclosure are not required to function in accordance with an API, and the processor 712 and the GPU 714 may utilize any process for communication.

The system memory 716 may be the memory for the device 710. The system memory 716 may comprise one or more computer-readable storage media. Examples of the system memory 716 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 716 may include instructions that cause the processor 712, the GPU 714, and/or the display processor 718 to perform the functions ascribed in this disclosure to the processor 712, the GPU 714, and/or the display processor 718. Accordingly, the system memory 716 may be a computer-readable storage medium having instructions stored thereon that, when executed, cause one or more processors (e.g., the processor 712, the GPU 714, and/or the display processor 718) to perform various functions.

The system memory 716 may include a non-transitory storage medium. The term "non-transitory" indicates that the storage medium is not embodied in a carrier wave or a propagated signal. However, the term "non-transitory" should not be interpreted to mean that the system memory 716 is non-movable or that its contents are static. As one example, the system memory 716 may be removed from the source device 710 and moved to another device. As another example, memory, substantially similar to the system memory 716, may be inserted into the device 710. In certain examples, a non-transitory storage medium may store data that can, over time, change (e.g., in RAM).

The user interface 720 may represent one or more hardware or virtual (meaning a combination of hardware and software) user interfaces by which a user may interface with the device 710. The user interface 720 may include physical buttons, switches, toggles, lights or virtual versions thereof. The user interface 720 may also include physical or virtual keyboards, touch interfaces—such as a touchscreen, haptic feedback, and the like.

The processor 712 may include one or more hardware units (including so-called "processing cores") configured to perform all or some portion of the operations discussed above with respect to one or more of any of the modules, units or other functional components of the content creator device and/or the content consumer device. The antenna 721 and the transceiver module 722 may represent a unit configured to establish and maintain the connection between the content consumer device 14 and the content consumer device 14. The antenna 721 and the transceiver module 722 may represent one or more receivers and/or one or more transmitters capable of wireless communication in accordance with one or more wireless communication protocols, such as a fifth generation (5G) cellular standard, a person area network (PAN) protocol, such as Bluetooth™, or other open-source, proprietary, or other communication standard. That is, the transceiver module 722 may represent a separate transmitter, a separate receiver, both a separate transmitter and a separate receiver, or a combined transmitter and receiver. The antenna 721 and the transceiver 722 may be configured to receive encoded audio data. Likewise, the antenna 721 and the transceiver 722 may be configured to transmit encoded audio data. Transceiver 722 may also be configured as a modem.

Figure 8A:
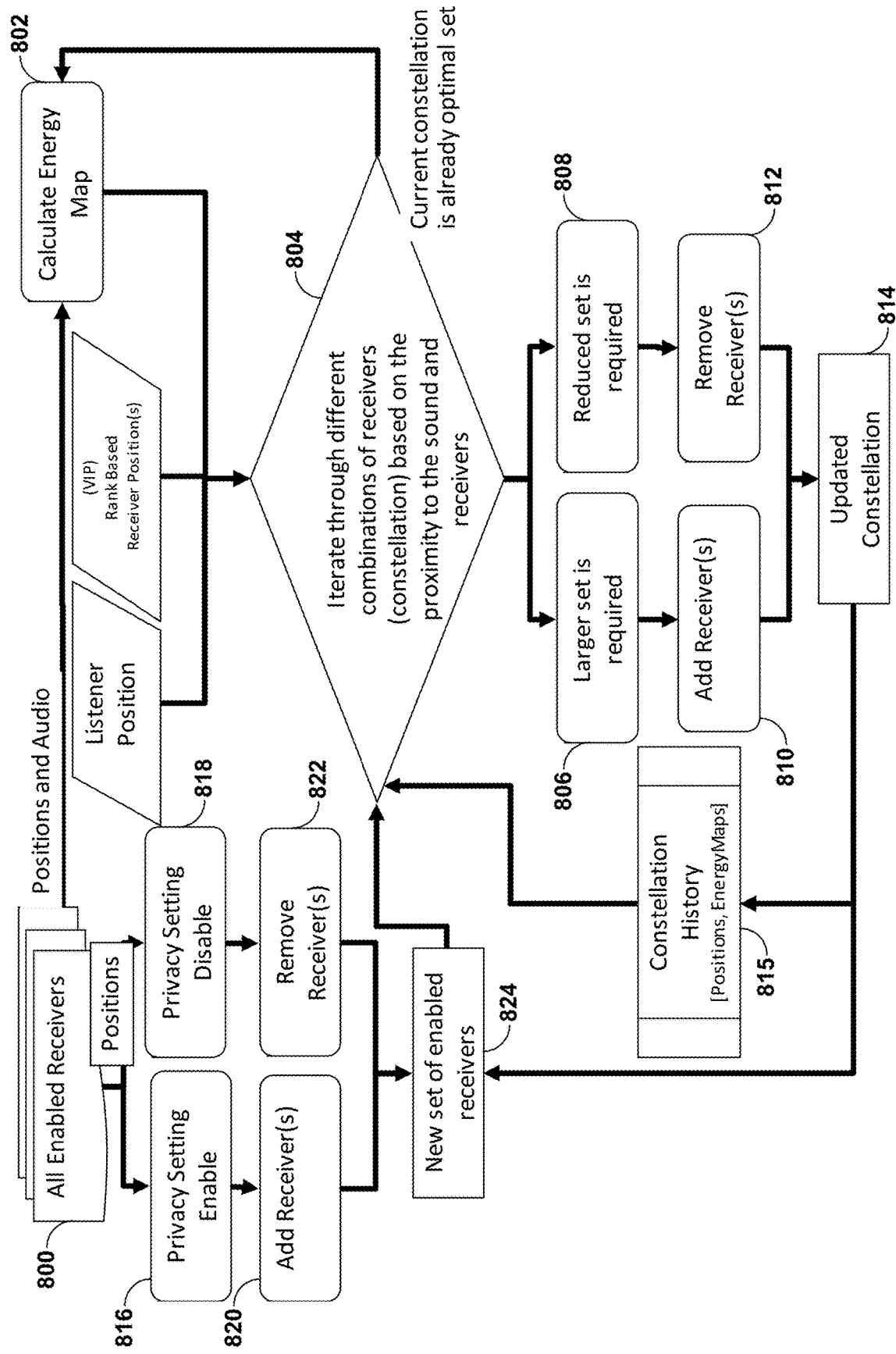
FIGS. 8A-8C are flowcharts illustrating example operation of the stream selection unit shown in the examples of FIGS. 1A and 1B in performing various aspects of the stream selection techniques.
Figure 8B:
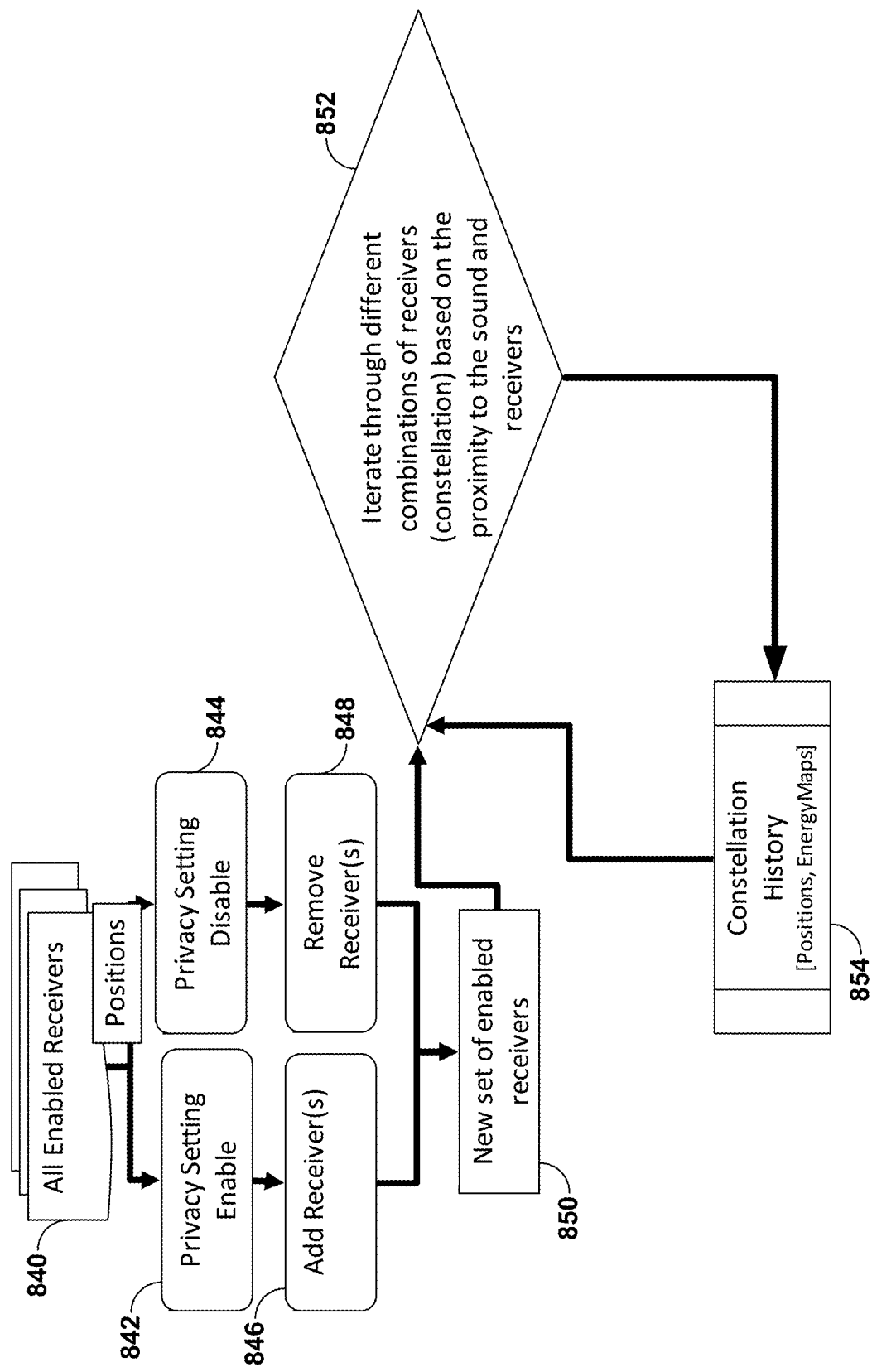
Figure 8C:
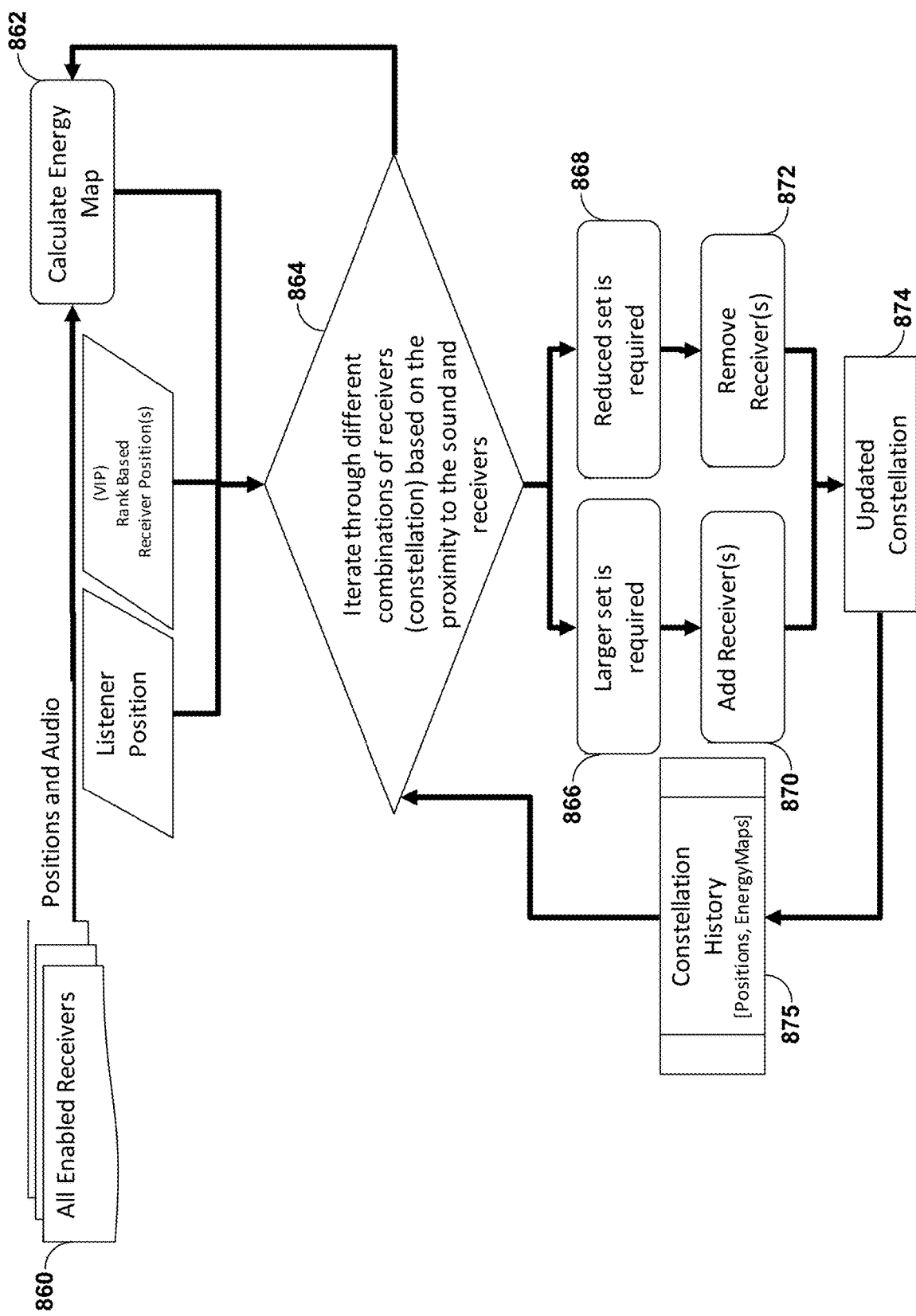

FIGS. 8A-8C are flowcharts illustrating example operation of the stream selection unit shown in the examples of FIGS. 1A and 1B in performing various aspects of the stream selection techniques. Referring first to the example of FIG. 8A, the stream selection unit 44 may obtain audio stream 27 from all enabled receivers (which is another way to refer to microphones, such as the microphone 18), where the audio streams 27 may include corresponding audio metadata, such as the CLI 45A (800). The stream selection unit 44 may perform the energy analysis with respect to each of the audio streams 27 to calculate a respective energy map (802).

The stream selection unit 44 may next iterate through difference combinations of the receivers (defined in the CM 47) based on proximity to the audio source 308 (as defined by audio source distance 306A and/or 306B) and the receivers (as defined by the proximity distances discussed above) (804). As shown in FIG. 8A, the receivers may be ranked or otherwise associated with different access rights. The stream selection unit 44 may iterate, based on the listener position (which is another way to refer to the "virtual location") represented by the VLI 45B, and the receiver positions represented by the CLI 45A, in the manner described above to identify whether a larger subset of the audio streams 27 or a reduced subset of the audio streams 27 is required (806, 808).

When a larger subset of the audio streams 27 is required, the stream selection unit 44 may add receivers, or in other words, additional audio streams to the audio streams 19' (such as when the user is closer to the audio source in the example of FIG. 3A) (810). When a reduced subset of the audio streams 27 is required, the stream selection unit 44 may remove receivers or in other words existing audio stream from the audio streams 19' (such as when the user is farther from the audio source in the example of FIG. 3A) (812).

In some examples, the stream selection unit 44 may determine that the current constellation of receivers is an optimal set (or, in other words, that the existing audio streams 19' is to remain the same as the selection process described herein results in the same audio streams 19') (804). However, when audio streams are added or removed from the audio streams 19', the stream selection unit 44 may update the CM 47 (814), generating a constellation history (815).

In addition, the stream selection unit 44 may determine whether privacy settings enable or disable addition of the receivers (where the privacy settings may refer to digital access rights that limit access to one or more of the audio streams 27, e.g., by way of a password, an authorization level or rank, a time, etc.) (816, 818). When privacy settings enable addition of a receiver, the stream selection unit 44 may add receivers to the updated CM 47 (which refers to addition of audio streams to the audio streams 19') (820). When privacy settings disable addition of a receiver, the stream selection unit 44 may remove receivers from the updated CM 47 (which refers to removal of audio streams from the audio streams 19') (822). In this manner, the stream selection unit 44 may identify a new set of enabled receivers (824).

The stream selection unit 44 may iterate in this fashion and update various inputs according to any given frequency. For example, the stream selection unit 44 may update privacy settings at a user interface rate (meaning, updates are driven by way of updates entered via the user interface). The stream selection unit 44, as another example, may update positions at sensor rate (meaning that as positions are changed through movement of the receiver). The stream selection unit 44 may further update the energy maps at an audio frame rate (meaning that the energy maps are updated each frame).

Referring next to the example of FIG. 8B, the stream selection unit 44 may operate in the manner described above with respect to FIG. 8A, except the stream selection unit 44 may not base the determination of the CM 47 on energy maps. As such, the stream selection unit 44 may obtain audio stream 27 from all enabled receivers (which is another way to refer to microphones, such as the microphone 18), where the audio streams 27 may include corresponding audio metadata, such as the CLI 45A (840). The stream selection unit 44 may determine whether privacy settings enable or disable addition of the receivers (where the privacy settings may refer to digital access rights that limit access to one or more of the audio streams 27, e.g., by way of a password, an authorization level or rank, a time, etc.) (842, 844).

When privacy settings enable addition of a receiver, the stream selection unit 44 may add receivers to the updated CM 47 (which refers to addition of audio streams to the audio streams 19') (846). When privacy settings disable addition of a receiver, the stream selection unit 44 may remove receivers from the updated CM 47 (which refers to removal of audio streams from the audio streams 19') (848). In this manner, the stream selection unit 44 may identify a new set of enabled receivers (850). The stream selection unit 44 may iterate through the different combinations of receivers in the CM 47 to determine the constellation map history (854), which is representative of the audio streams 19'.

The stream selection unit 44 may iterate in this fashion and update various inputs according to any given frequency. For example, the stream selection unit 44 may update privacy settings at a user interface rate (meaning, updates are driven by way of updates entered via the user interface). The stream selection unit 44, as another example, may update positions at sensor rate (meaning that as positions are changed through movement of the receiver).

Referring next to the example of FIG. 8C, the stream selection unit 44 may operate in the manner described above with respect to FIG. 8A, except the stream selection unit 44 may not base the determination of the CM 47 enabled receivers. As such, the stream selection unit 44 may obtain audio stream 27 from all enabled receivers (which is another way to refer to microphones, such as the microphone 18), where the audio streams 27 may include corresponding audio metadata, such as the CLI 45A (860). The stream selection unit 44 may perform the energy analysis with respect to each of the audio streams 27 to calculate a respective energy map (862).

The stream selection unit 44 may next iterate through difference combinations of the receivers (defined in the CM 47) based on proximity to the audio source 308 (as defined by audio source distance 306A and/or 306B) and the receivers (as defined by the proximity distances discussed above) (864). As shown in FIG. 8C, the receivers may be ranked or otherwise associated with different access rights. The stream selection unit 44 may iterate, based on the listener position (which again is another way to refer to the "virtual location" discussed above) represented by the VLI 45B, and the receiver positions represented by the CLI 45A, in the manner described above to identify whether a larger subset of the audio streams 27 or a reduced subset of the audio streams 27 is required (866, 868).

When a larger subset of the audio streams 27 is required, the stream selection unit 44 may add receivers, or in other words, additional audio streams to the audio streams 19' (such as when the user is closer to the audio source in the example of FIG. 3A) (870). When a reduced subset of the audio streams 27 is required, the stream selection unit 44 may remove receivers or in other words existing audio stream from the audio streams 19' (such as when the user is farther from the audio source in the example of FIG. 3A) (872).

In some examples, the stream selection unit 44 may determine that the current constellation of receivers is an optimal set (or, in other words, that the existing audio streams 19' is to remain the same as the selection process described herein results in the same audio streams 19') (864). However, when audio streams are added or removed from the audio streams 19', the stream selection unit 44 may update the CM 47 (874), generating a constellation history (875).

The stream selection unit 44 may iterate in this fashion and update various inputs according to any given frequency. For example, the stream selection unit 44, as another example, may update positions at sensor rate (meaning that as positions are changed through movement of the receiver). The stream selection unit 44 may further update the energy maps at an audio frame rate (meaning that the energy maps are updated each frame).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

FIGS. 9A-9D are flowcharts illustrating example techniques for processing one or more audio streams based on a password using the techniques of this disclosure. The techniques of FIGS. 9A-9D may be performed by one or more processors and/or circuits of a content consumer device, such as the content consumer device 14 of FIGS. 1A and 1B. As discussed above, in some examples, the content consumer device 14 of FIGS. 1A and 1B may be the VR device 400 (e.g., see FIG. 4B) or another XR device (e.g., an XR headset).

Figure 9A:
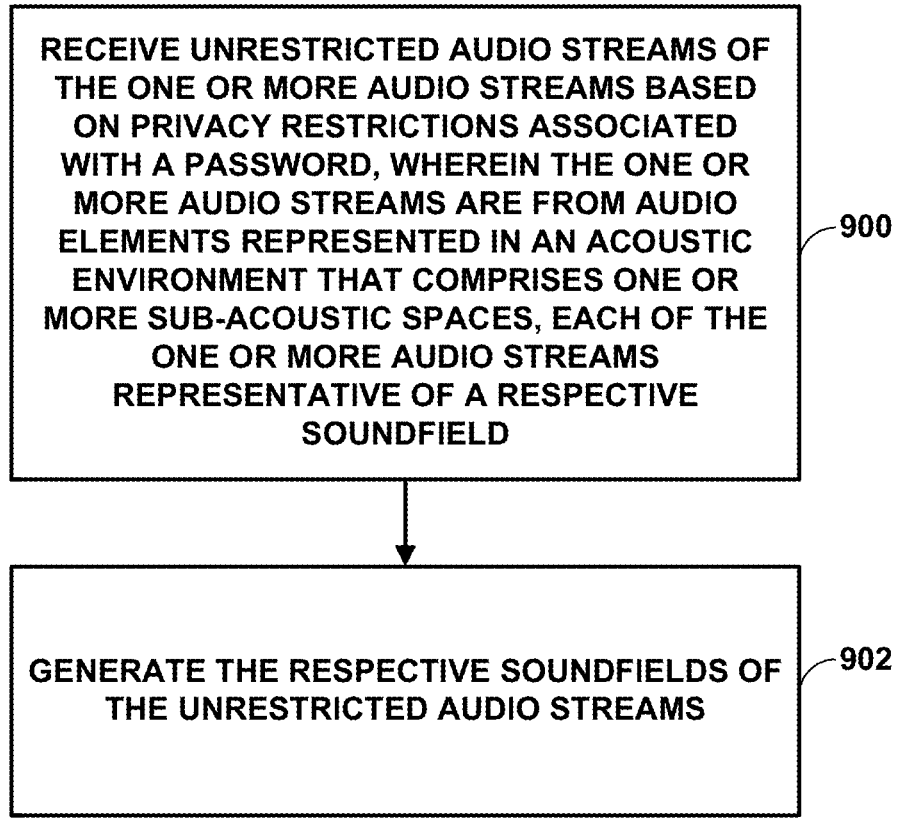
FIGS. 9A-9D are flowcharts illustrating example techniques for processing one or more audio streams based on a password using the techniques of this disclosure.

In the general example of FIG. 9A, the content consumer device 14 may be configured to receive unrestricted audio streams of the one or more audio streams based on privacy restrictions associated with a password, wherein the one or more audio streams are from audio elements represented in an acoustic environment that comprises one or more sub-acoustic spaces, each of the one or more audio streams representative of a respective soundfield (900), and generate the respective soundfields of the unrestricted audio streams (902).

Figure 9B:
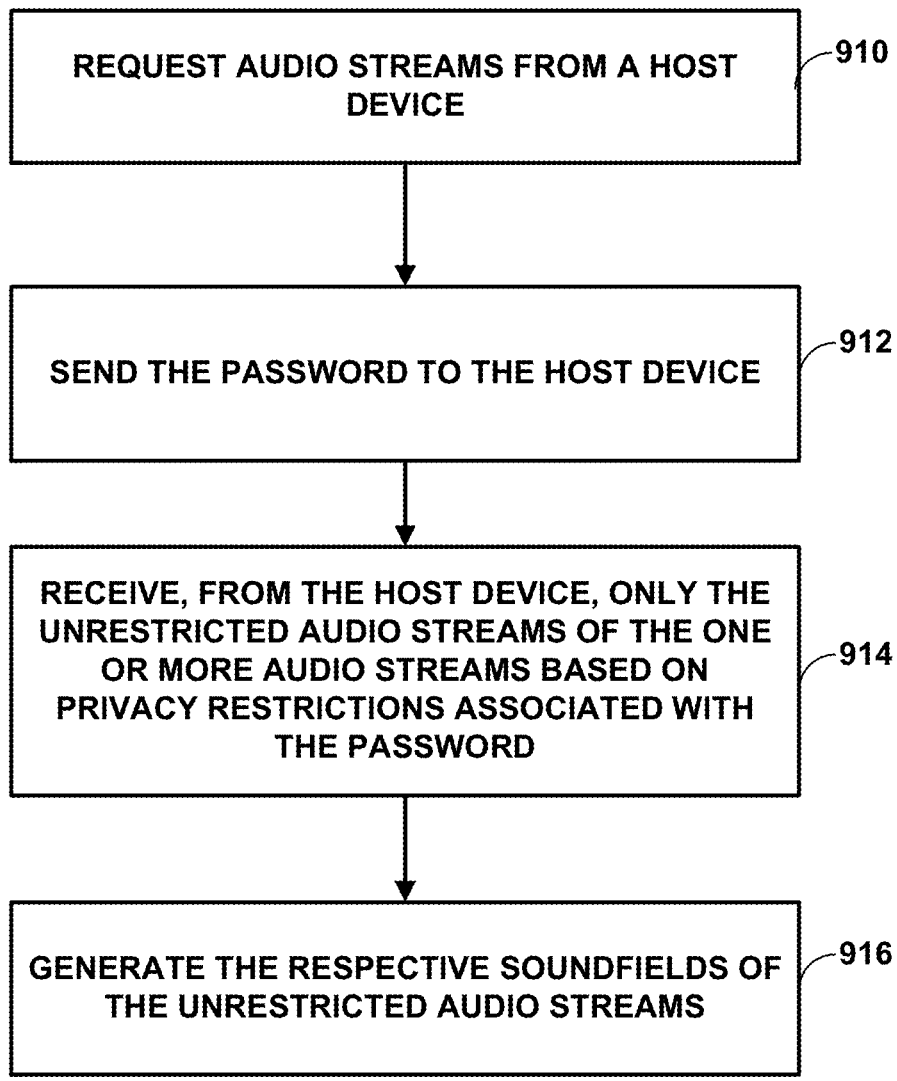

FIG. 9B illustrates one example of the technique of FIG. 9A in more detail. In the example of FIG. 9B, the content consumer device 14 may be configured to request audio streams from a host device (e.g., the source device 12) (910), and send the password to the host device (912). The content consumer device 14 may be further configured to receive, from the host device, only the unrestricted audio streams of the one or more audio streams based on privacy restrictions associated with the password (914), and generate the respective soundfields of the unrestricted audio streams (916).

Figure 9C:
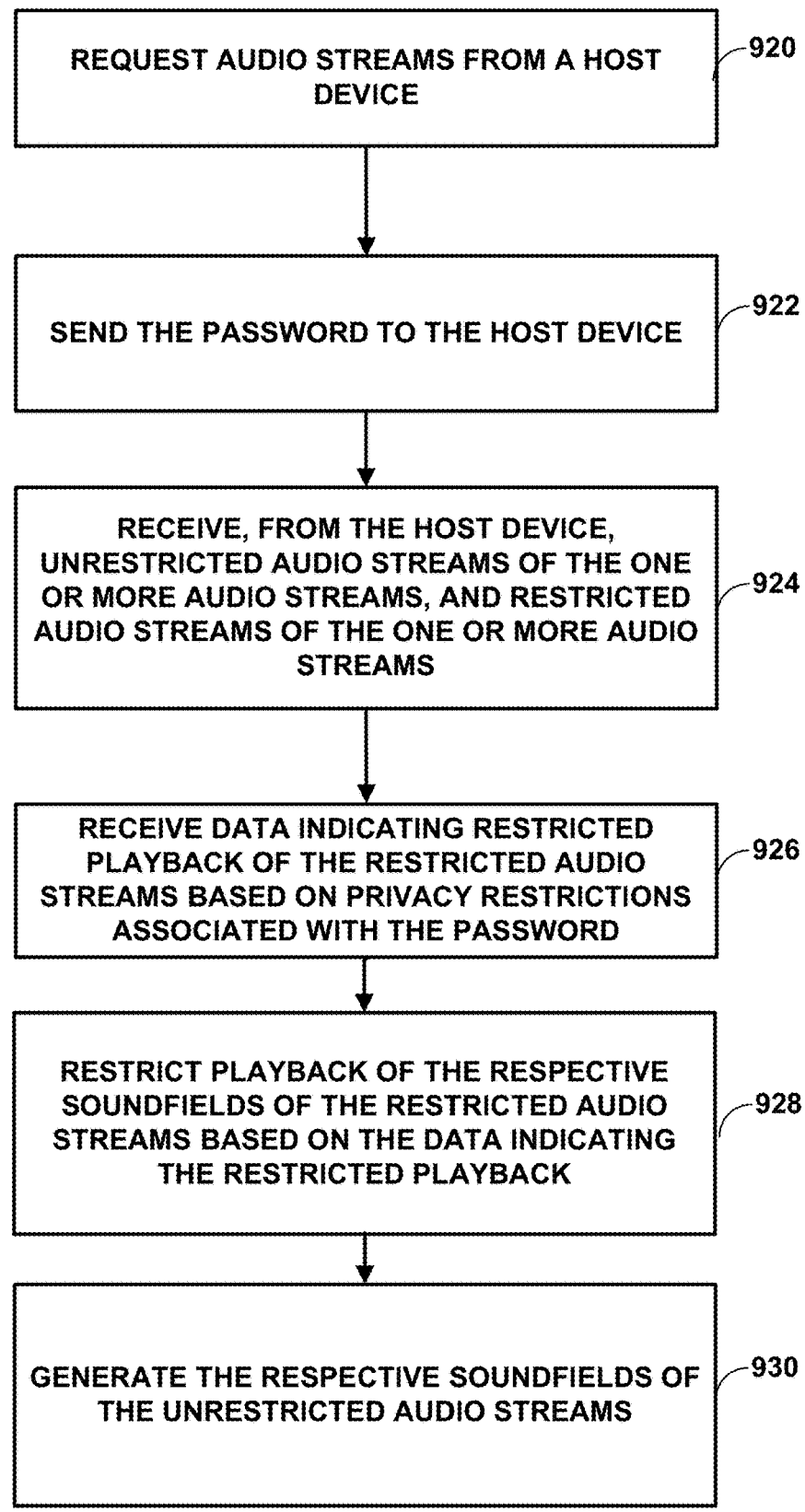

FIG. 9C illustrates another example of the technique of FIG. 9A in more detail. In the example of FIG. 9C, the content consumer device 14 may be configured to request audio streams from a host device (e.g., the source device 12) (920), and send the password to the host device (922). The content consumer device 14 may be further configured to receive, from the host device, unrestricted audio streams of the one or more audio streams, and restricted audio streams of the one or more audio streams (924). The content consumer device may be further configured to receive data indicating restricted playback of the restricted audio streams based on privacy restrictions associated with the password (926). The content consumer device 14 may restrict playback of the respective soundfields of the restricted audio streams based on the data indicating the restricted playback (928), and may generate the respective soundfields of the unrestricted audio streams (930).

Figure 9D:
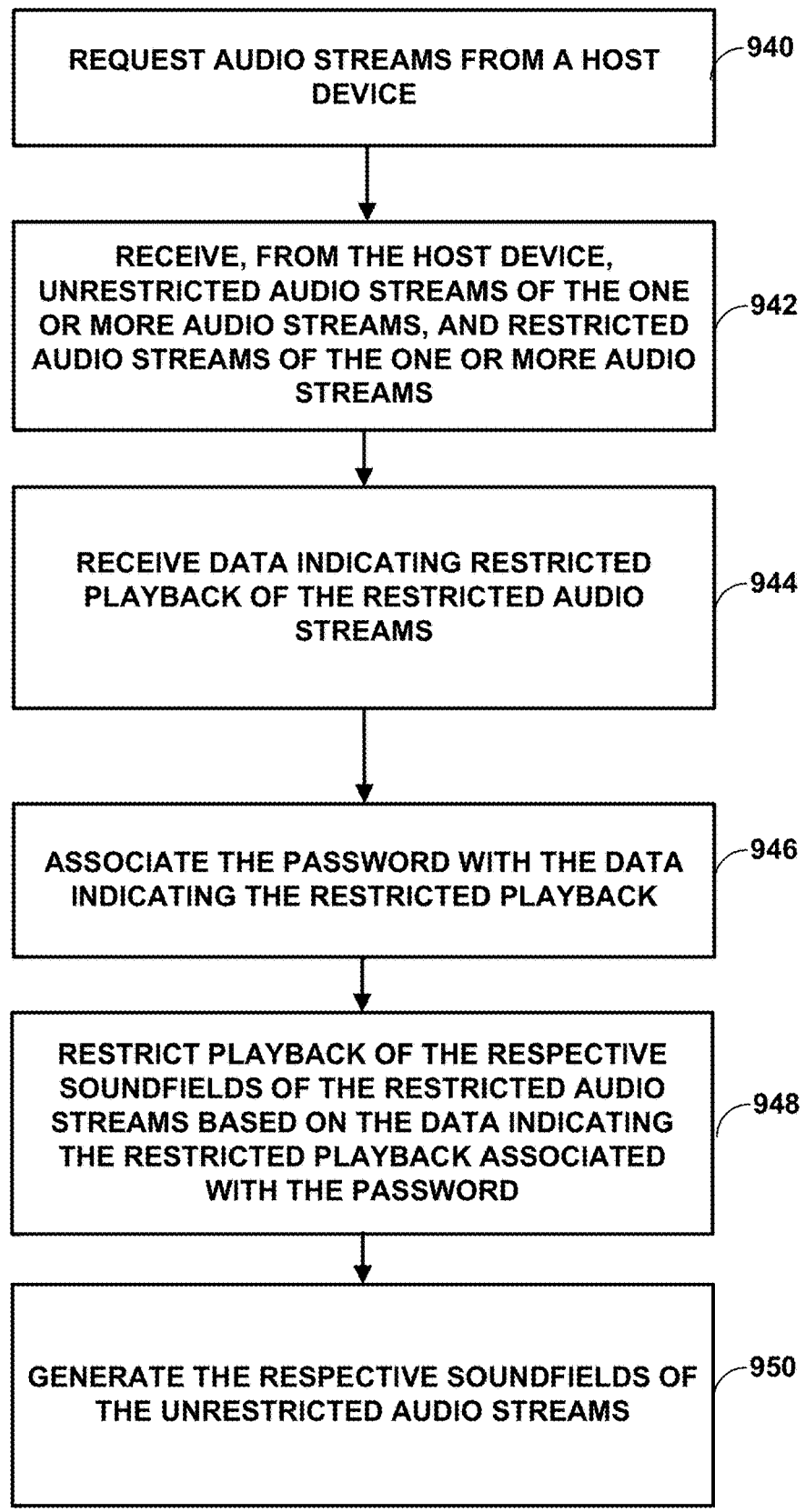

FIG. 9D illustrates another example of the technique of FIG. 9A in more detail. In the example of FIG. 9D, the content consumer device 14 may be configured to request audio streams from a host device (e.g., the source device 12) (940). The content consumer device 14 may be further configured to receive, from the host device, unrestricted audio streams of the one or more audio streams, and restricted audio streams of the one or more audio streams (942), and receive data indicating restricted playback of the restricted audio streams (944). The content consumer device 14 may associate the password with the data indicating the restricted playback (946), and restrict playback of the respective soundfields of the restricted audio streams based on the data indicating the restricted playback associated with the password (948). The content consumer device 14 may generate the respective soundfields of the unrestricted audio streams (950).

In each of the examples of FIG. 9C and FIG. 9D, to restrict playback of the respective soundfields of the restricted audio streams based on the data indicating the restricted playback, the content consumer device 14 may be configured to mask, toggle, or null the restricted audio streams. In another example, to restrict playback of the respective soundfields of the restricted audio streams based on the data indicating the restricted playback, the content consumer device 14 may be configured to apply an acoustic occluder to the restricted audio streams.

In one example of the disclosure, the password is a master password associated with unrestricted privacy restrictions. In this example, to receive the unrestricted audio streams of the one or more audio streams based on privacy restrictions associated with the password, the content consumer device 14 is further configured to: receive each of the one or more audio streams.

In another example of the disclosure, the password is a permanent password associated with conditional privacy restrictions. In this example, to receive the unrestricted audio streams of the one or more audio streams based on privacy restrictions associated with the password, the content consumer device 14 is further configured to receive the unrestricted audio streams of the one or more audio streams based on the conditional privacy restrictions associated with the permanent password, wherein the permanent password remains valid until a reset.

In another example of the disclosure, the password is a temporary password associated with conditional privacy restrictions. In this example, to receive the unrestricted audio streams of the one or more audio streams based on privacy restrictions associated with the password, the content consumer device 14 is further configured to receive the unrestricted audio streams of the one or more audio streams based on the conditional privacy restrictions associated with the temporary password, wherein the temporary password remains valid for a fixed duration and expires after the fixed duration.

Figure 10:
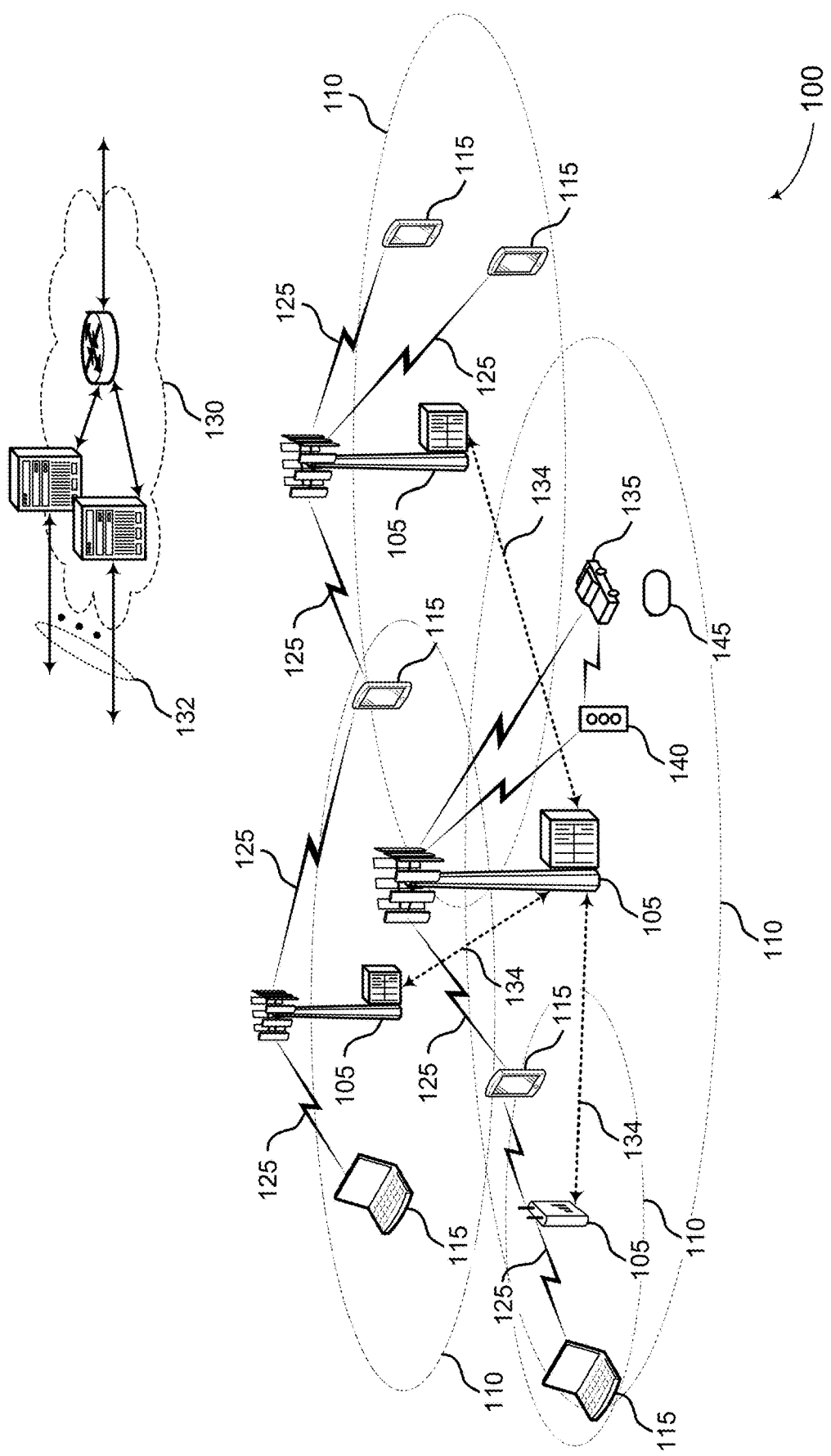
FIG. 10 illustrates an example of a wireless communications system that supports password-based privacy restrictions in accordance with aspects of the present disclosure.

FIG. 10 illustrates an example of a wireless communications system 100 that supports password-based privacy restrictions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In examples of this disclosure, a UE 115 may be any of the audio sources described in this disclosure, including a VR headset, an XR headset, an AR headset, a vehicle, a smartphone, a microphone, an array of microphones, or any other device including a microphone or is able to transmit a captured and/or synthesized audio stream. In some examples, a synthesized audio stream may be an audio stream that that was stored in memory or was previously created or synthesized. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that exchange and/or use password-based privacy data to toggle, mask, and/or null various audio streams and/or audio sources, as was described above.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

Other illustrative examples of the disclosure are described below.

Example 1A—A device configured to process one or more of a plurality of audio streams, the device comprising: a memory configured to store the plurality of audio streams, each of the audio streams representative of a soundfield; and one or more processors coupled to the memory, and configured to: receive one or more of the plurality of audio streams based on privacy restrictions associated with a password; and generate the corresponding soundfields based on the one or more of the plurality of audio streams.

Example 2A—The device of Example 1A, wherein the password is a master password associated with unrestricted privacy restrictions, and wherein to receive the one or more of the plurality of audio streams, the one or more processors are further configured to: receive each of the plurality of audio streams.

Example 3A—The device of Example 1A, wherein the password is a permanent password associated with conditional privacy restrictions, and wherein to receive the one or more of the plurality of audio streams, the one or more processors are further configured to: receive the one or more of the plurality of audio streams based on the conditional privacy restrictions, wherein the conditional privacy restrictions indicate if one or more of the plurality of audio streams are restricted or unrestricted.

Example 4A—The device of Example 3A, wherein the one or more processors are further configured to: receive audio metadata that further includes respective conditional privacy restrictions indicating if one or more of the plurality of audio streams are restricted or unrestricted based on the permanent password.

Example 5A—The device of Example 3A, wherein the permanent password remains valid until reset.

Example 6A—The device of Example 1A, wherein the password is a temporary password associated with conditional privacy restrictions, and wherein to receive the one or more of the plurality of audio streams, the one or more processors are further configured to: receive the one or more of the plurality of audio streams based on the conditional privacy restrictions, wherein the conditional privacy restrictions rights indicate if one or more of the plurality of audio streams are restricted or unrestricted.

Example 7A—The device of Example 6A, wherein the one or more processors are further configured to: receive audio metadata that further includes respective conditional privacy restrictions indicating if one or more of the plurality of audio streams are restricted or unrestricted based on the temporary password.

Example 8A—The device of Example 6A, wherein the temporary password remains valid for a fixed duration and expires after the fixed duration.

Example 9A—The device of Example 1A, wherein the privacy restrictions include respective gain values associated with respective audio streams of the one or more of the plurality of audio streams.

Example 10A—The device of Example 1A, wherein the privacy restrictions include respective nulling indications associated with respective audio streams of the one or more of the plurality of audio streams.

Example 11A—The device of Example 1A, wherein the privacy restrictions include respective toggling indications associated with respective audio streams of the one or more of the plurality of audio streams.

Example 12A—The device of Example 1A, wherein the one or more processors are further configured to: receive the password from a host.

Example 13A—The device of Example 1A, wherein the one or more processors are further configured to: receive the password from a source other than the host.

Example 14A—The device of Example 1A, wherein the plurality of audio streams include audio streams from one or more of an audio capture device or a cluster of audio capture devices.

Example 15A—The device of Example 14A, wherein the audio capture devices may include one or more of a single microphone, and an array of microphones.

Example 16A—The device of Example 14A, wherein the audio capture devices may include a mobile device.

Example 17A—The device of Example 1A, wherein the one or more processors are further configured to: receive the plurality of audio streams over a wireless link.

Example 18A—The device of Example 17A, wherein the wireless link is a 5G air interface.

Example 19A—The device of Example 17A, wherein the wireless link is a Bluetooth interface.

Example 20A—The device of any combination of Examples 1A-19A, wherein the device comprises an extended reality headset.

Example 21A—The device of any combination of Examples 1A-20A, further comprising a head-mounted display configured to present a displayed world.

Example 22A—The device of any combination of Examples 1A-19A, wherein the device comprises a mobile handset.

Example 23A—The device of Example 1A, wherein the one or more processors are configured to: receive audio metadata that includes capture location information representative of a capture location in a displayed world at which the corresponding one of the plurality of audio streams was captured; determine location information representative of a location of the device in the displayed world; select, based on the location information and the capture location information, a subset of the plurality of audio streams, the subset of the plurality of audio streams excluding at least one of the plurality of audio streams; and generate, based on the subset of the plurality of audio streams, the corresponding soundfields.

Example 1B—A method of processing one or more of a plurality of audio streams, the method comprising: storing, by the memory, the plurality of audio streams, each of the audio streams representative of a soundfield; receiving, by the one or more processors, one or more of the plurality of audio streams based on privacy restrictions associated with a password; and generating, by the one or more processors, corresponding soundfields based on the one or more of the plurality of audio streams.

Example 2B—The method of Example 1B, wherein the password is a master password associated with unrestricted privacy restrictions, and wherein receiving the one or more of the plurality of audio streams comprises: receiving each of the plurality of audio streams.

Example 3B—The method of Example 1B, wherein the password is a permanent password associated with conditional privacy restrictions, and wherein receiving the one or more of the plurality of audio streams comprises: receiving the one or more of the plurality of audio streams based on the conditional privacy restrictions, wherein the conditional privacy restrictions indicate if one or more of the plurality of audio streams are restricted or unrestricted.

Example 4B—The method of Example 3B, further comprising: receiving audio metadata that further includes respective conditional privacy restrictions indicating if one or more of the plurality of audio streams are restricted or unrestricted based on the permanent password.

Example 5B—The method of Example 3B, wherein the permanent password remains valid until reset.

Example 6B—The method of Example 1B, wherein the password is a temporary password associated with conditional privacy restrictions, and wherein receiving the one or more of the plurality of audio streams comprises: receiving the one or more of the plurality of audio streams based on the conditional privacy restrictions, wherein the conditional privacy restrictions rights indicate if one or more of the plurality of audio streams are restricted or unrestricted.

Example 7B—The method of Example 6B, further comprising: receiving audio metadata that further includes respective conditional privacy restrictions indicating if one or more of the plurality of audio streams are restricted or unrestricted based on the temporary password.

Example 8B—The method of Example 6B, wherein the temporary password remains valid for a fixed duration and expires after the fixed duration.

Example 9B—The method of Example 1B, wherein the privacy restrictions include respective gain values associated with respective audio streams of the one or more of the plurality of audio streams.

Example 10B—The method of Example 1B, wherein the privacy restrictions include respective nulling indications associated with respective audio streams of the one or more of the plurality of audio streams.

Example 11B—The method of Example 1B, wherein the privacy restrictions include respective toggling indications associated with respective audio streams of the one or more of the plurality of audio streams.

Example 12B—The method of Example 1B, further comprising: receiving the password from a host.

Example 13B—The method of Example 1B, further comprising: receiving the password from a source other than the host.

Example 14B—The method of Example 1B, wherein the plurality of audio streams include audio streams from one or more of an audio capture device or a cluster of audio capture devices.

Example 15B—The method of Example 14B, wherein the audio capture devices may include one or more of a single microphone, and an array of microphones.

Example 16B—The method of Example 14B, wherein the audio capture devices may include a mobile device.

Example 17B—The method of Example 1B, further comprising: receiving the plurality of audio streams over a wireless link.

Example 18B—The method of Example 17B, wherein the wireless link is a 5G air interface.

Example 19B—The method of Example 17B, wherein the wireless link is a Bluetooth interface.

Example 20B—The method of any combination of Examples 1B-19B, wherein the method is performed by an extended reality headset.

Example 21B—The method of any combination of Examples 1B-20B, further comprising: presenting, with a head-mounted display, a displayed world.

Example 22B—The method of any combination of Examples 1B-19B, wherein the method is performed by a mobile handset.

Example 23B—The method of Example 1B, further comprising: receiving audio metadata that includes capture location information representative of a capture location in a displayed world at which the corresponding one of the plurality of audio streams was captured; determining location information representative of a location of the device in the displayed world; selecting, based on the location information and the capture location information, a subset of the plurality of audio streams, the subset of the plurality of audio streams excluding at least one of the plurality of audio streams; and generating, based on the subset of the plurality of audio streams, the corresponding soundfields.

Example 1C—A device configured to process one or more of a plurality of audio streams, the device comprising: means for storing the plurality of audio streams, each of the audio streams representative of a soundfield; means for receiving one or more of the plurality of audio streams based on privacy restrictions associated with a password; and means for generating corresponding soundfields based on the one or more of the plurality of audio streams.

Example 2C—The device of Example 1C, wherein the password is a master password associated with unrestricted privacy restrictions, and wherein the means for receiving the one or more of the plurality of audio streams comprises: means for receiving each of the plurality of audio streams.

Example 3C—The device of Example 1C, wherein the password is a permanent password associated with conditional privacy restrictions, and wherein the means for receiving the one or more of the plurality of audio streams comprises: means for receiving the one or more of the plurality of audio streams based on the conditional privacy restrictions, wherein the conditional privacy restrictions indicate if one or more of the plurality of audio streams are restricted or unrestricted.

Example 4C—The device of Example 3C, further comprising: means for receiving audio metadata that further includes respective conditional privacy restrictions indicating if one or more of the plurality of audio streams are restricted or unrestricted based on the permanent password.

Example 5C—The device of Example 3C, wherein the permanent password remains valid until reset.

Example 6C—The device of Example 1C, wherein the password is a temporary password associated with conditional privacy restrictions, and wherein the means for receiving the one or more of the plurality of audio streams comprises: means for receiving the one or more of the plurality of audio streams based on the conditional privacy restrictions, wherein the conditional privacy restrictions rights indicate if one or more of the plurality of audio streams are restricted or unrestricted.

Example 7C—The device of Example 6C, further comprising: means for receiving audio metadata that further includes respective conditional privacy restrictions indicating if one or more of the plurality of audio streams are restricted or unrestricted based on the temporary password.

Example 8C—The device of Example 6C, wherein the temporary password remains valid for a fixed duration and expires after the fixed duration.

Example 9C—The device of Example 1C, wherein the privacy restrictions include respective gain values associated with respective audio streams of the one or more of the plurality of audio streams.

Example 10C—The device of Example 1C, wherein the privacy restrictions include respective nulling indications associated with respective audio streams of the one or more of the plurality of audio streams.

Example 11C—The device of Example 1C, wherein the privacy restrictions include respective toggling indications associated with respective audio streams of the one or more of the plurality of audio streams.

Example 12C—The device of Example 1C, further comprising: means for receiving the password from a host.

Example 13C—The device of Example 1C, further comprising: means for receiving the password from a source other than the host.

Example 14C—The device of Example 1C, wherein the plurality of audio streams include audio streams from one or more of an audio capture device or a cluster of audio capture devices.

Example 15C—The device of Example 14C, wherein the audio capture devices may include one or more of a single microphone, and an array of microphones.

Example 16C—The device of Example 14C, wherein the audio capture devices may include a mobile device.

Example 17C—The device of Example 1C, further comprising: means for receiving the plurality of audio streams over a wireless link.

Example 18C—The device of Example 17C, wherein the wireless link is a 5G air interface.

Example 19C—The device of Example 17C, wherein the wireless link is a Bluetooth interface.

Example 20C—The device of any combination of Examples 1C-19C, wherein the device is an extended reality headset.

Example 21C—The device of any combination of Examples 1C-20C, further comprising: means for presenting, with a head-mounted display, a displayed world.

Example 22C—The device of any combination of Examples 1C-19C, wherein the device is a mobile handset.

Example 23C—The device of Example 1C, further comprising: means for receiving audio metadata that includes capture location information representative of a capture location in a displayed world at which the corresponding one of the plurality of audio streams was captured; means for determining location information representative of a location of the device in the displayed world; means for selecting, based on the location information and the capture location information, a subset of the plurality of audio streams, the subset of the plurality of audio streams excluding at least one of the plurality of audio streams; and means for generating, based on the subset of the plurality of audio streams, the corresponding soundfields.

Example 1D—A non-transitory computer-readable storage medium having stored thereon instructions that, when executed, cause one or more processors to: store the plurality of audio streams, each of the audio streams representative of a soundfield; receive one or more of the plurality of audio streams based on privacy restrictions associated with a password; and generate the corresponding soundfields based on the one or more of the plurality of audio streams.

Example 2D—The non-transitory computer-readable storage medium of Example 1D, wherein the password is a master password associated with unrestricted privacy restrictions, and wherein to receive the one or more of the plurality of audio streams, the instructions further cause the one or more processors to: receive each of the plurality of audio streams.

Example 3D—The non-transitory computer-readable storage medium of Example 1D, wherein the password is a permanent password associated with conditional privacy restrictions, and wherein to receive the one or more of the plurality of audio streams, the instructions further cause the one or more processors to: receive the one or more of the plurality of audio streams based on the conditional privacy restrictions, wherein the conditional privacy restrictions indicate if one or more of the plurality of audio streams are restricted or unrestricted.

Example 4D—The non-transitory computer-readable storage medium of Example 3D, wherein the instructions further cause the one or more processors to: receive audio metadata that further includes respective conditional privacy restrictions indicating if one or more of the plurality of audio streams are restricted or unrestricted based on the permanent password.

Example 5D—The non-transitory computer-readable storage medium of Example 3D, wherein the permanent password remains valid until reset.

Example 6D—The non-transitory computer-readable storage medium of Example 1D, wherein the password is a temporary password associated with conditional privacy restrictions, and wherein to receive the one or more of the plurality of audio streams, the instructions further cause the one or more processors to: receive the one or more of the plurality of audio streams based on the conditional privacy restrictions, wherein the conditional privacy restrictions rights indicate if one or more of the plurality of audio streams are restricted or unrestricted.

Example 7D—The non-transitory computer-readable storage medium of Example 6D, wherein the instructions further cause the one or more processors to: receive audio metadata that further includes respective conditional privacy restrictions indicating if one or more of the plurality of audio streams are restricted or unrestricted based on the temporary password.

Example 8D—The non-transitory computer-readable storage medium of Example 6D, wherein the temporary password remains valid for a fixed duration and expires after the fixed duration.

Example 9D—The non-transitory computer-readable storage medium of Example 1D, wherein the privacy restrictions include respective gain values associated with respective audio streams of the one or more of the plurality of audio streams.

Example 10D—The non-transitory computer-readable storage medium of Example 1D, wherein the privacy restrictions include respective nulling indications associated with respective audio streams of the one or more of the plurality of audio streams.

Example 11D—The non-transitory computer-readable storage medium of Example 1D, wherein the privacy restrictions include respective toggling indications associated with respective audio streams of the one or more of the plurality of audio streams.

Example 12D—The non-transitory computer-readable storage medium of Example 1D, wherein the instructions further cause the one or more processors to: receive the password from a host.

Example 13D—The non-transitory computer-readable storage medium of Example 1D, wherein the instructions further cause the one or more processors to: receive the password from a source other than the host.

Example 14D—The non-transitory computer-readable storage medium of Example 1D, wherein the plurality of audio streams include audio streams from one or more of an audio capture device or a cluster of audio capture devices.

Example 15D—The non-transitory computer-readable storage medium of Example 14D, wherein the audio capture devices may include one or more of a single microphone, and an array of microphones.

Example 16D—The non-transitory computer-readable storage medium of Example 14D, wherein the audio capture devices may include a mobile device.

Example 17D—The non-transitory computer-readable storage medium of Example 1D, wherein the instructions further cause the one or more processors to: receive the plurality of audio streams over a wireless link.

Example 18D—The non-transitory computer-readable storage medium of Example 17D, wherein the wireless link is a 5G air interface.

Example 19D—The non-transitory computer-readable storage medium of Example 17D, wherein the wireless link is a Bluetooth interface.

Example 20D—The non-transitory computer-readable storage medium of any combination of Examples 1D-19D, wherein the one or more processors are part of an extended reality headset.

Example 21D—The non-transitory computer-readable storage medium of any combination of Examples 1D-20D, wherein the one or more processors are part of a head-mounted display configured to present a displayed world.

Example 22D—The non-transitory computer-readable storage medium of any combination of Examples 1D-19D, wherein the one or more processors are part of a mobile handset.

Example 23D—The non-transitory computer-readable storage medium of Example 1D, wherein the instructions further cause the one or more processors to: receive audio metadata that includes capture location information representative of a capture location in a displayed world at which the corresponding one of the plurality of audio streams was captured; determine location information representative of a location of the device in the displayed world; select, based on the location information and the capture location information, a subset of the plurality of audio streams, the subset of the plurality of audio streams excluding at least one of the plurality of audio streams; and generate, based on the subset of the plurality of audio streams, the corresponding soundfields.

Example 1E—A device configured to transmit of a plurality of audio streams, the device comprising: a memory configured to store the plurality of audio streams, each of the audio streams representative of a soundfield; and one or more processors coupled to the memory, and configured to: generate one or more of the plurality of audio streams based on privacy restrictions associated with a password.

Example 2E—The device of Example 1E, wherein the one or more processors are further configured to: transmit the one or more of the plurality of audio streams to a content consumer device.

Example 3E—The device of Example 1E, wherein the password is a master password associated with unrestricted privacy restrictions, and wherein to generate the one or more of the plurality of audio streams, the one or more processors are further configured to: generate each of the plurality of audio streams.

Example 4E—The device of Example 1E, wherein the password is a permanent password associated with conditional privacy restrictions, and wherein to generate the one or more of the plurality of audio streams, the one or more processors are further configured to: generate the one or more of the plurality of audio streams based on the conditional privacy restrictions, wherein the conditional privacy restrictions indicate if one or more of the plurality of audio streams are restricted or unrestricted.

Example 5E—The device of Example 4E, wherein the one or more processors are further configured to: generate audio metadata that further includes respective conditional privacy restrictions indicating if one or more of the plurality of audio streams are restricted or unrestricted based on the permanent password.

Example 6E—The device of Example 4E, wherein the permanent password remains valid until reset.

Example 7E—The device of Example 1E, wherein the password is a temporary password associated with conditional privacy restrictions, and wherein to generate the one or more of the plurality of audio streams, the one or more processors are further configured to: generate the one or more of the plurality of audio streams based on the conditional privacy restrictions, wherein the conditional privacy restrictions rights indicate if one or more of the plurality of audio streams are restricted or unrestricted.

Example 8E—The device of Example 7E, wherein the one or more processors are further configured to: generate audio metadata that further includes respective conditional privacy restrictions indicating if one or more of the plurality of audio streams are restricted or unrestricted based on the temporary password.

Example 9E—The device of Example 7E, wherein the temporary password remains valid for a fixed duration and expires after the fixed duration.

Example 10E—The device of Example 1E, wherein the privacy restrictions include respective gain values associated with respective audio streams of the one or more of the plurality of audio streams.

Example 11E—The device of Example 1E, wherein the privacy restrictions include respective nulling indications associated with respective audio streams of the one or more of the plurality of audio streams.

Example 12E—The device of Example 1E, wherein the privacy restrictions include respective toggling indications associated with respective audio streams of the one or more of the plurality of audio streams.

Example 13E—The device of Example 1E, wherein the one or more processors are further configured to: generate the password.

Example 14E—The device of Example 1E, wherein the one or more processors are further configured to: receive the password.

Example 15E—The device of Example 1E, wherein the plurality of audio streams include audio streams from one or more of an audio capture device or a cluster of audio capture devices.

Example 16E—The device of Example 15E, wherein the audio capture devices may include one or more of a single microphone, and an array of microphones.

Example 17E—The device of Example 15E, wherein the audio capture devices may include a mobile device.

Example 18E—The device of Example 1E, wherein the one or more processors are further configured to: transmit the plurality of audio streams over a wireless link.

Example 19E—The device of Example 18E, wherein the wireless link is a 5G air interface.

Example 20E—The device of Example 18E, wherein the wireless link is a Bluetooth interface.

Example 21E—The device of any combination of Examples 1E-20E, wherein the device comprises a content capture device.

Example 22E—The device of any combination of Examples 1E-21E, wherein the device comprises a mobile handset.

Example 1F—A method of processing one or more of a plurality of audio streams, the method comprising: storing, by a memory, the plurality of audio streams, each of the audio streams representative of a soundfield; and generating, by one or more processors, one or more of the plurality of audio streams based on privacy restrictions associated with a password.

Example 2F—The method of Example 1F, further comprising: transmitting the one or more of the plurality of audio streams to a content consumer device.

Example 3F—The method of Example 1F, wherein the password is a master password associated with unrestricted privacy restrictions, and wherein generating the one or more of the plurality of audio streams comprises: generating each of the plurality of audio streams.

Example 4F—The method of Example 1F, wherein the password is a permanent password associated with conditional privacy restrictions, and wherein generating the one or more of the plurality of audio streams comprises: generating the one or more of the plurality of audio streams based on the conditional privacy restrictions, wherein the conditional privacy restrictions indicate if one or more of the plurality of audio streams are restricted or unrestricted.

Example 5F—The method of Example 4F, further comprising: generating audio metadata that further includes respective conditional privacy restrictions indicating if one or more of the plurality of audio streams are restricted or unrestricted based on the permanent password.

Example 6F—The method of Example 4F, wherein the permanent password remains valid until reset.

Example 7F—The method of Example 1F, wherein the password is a temporary password associated with conditional privacy restrictions, and wherein generating the one or more of the plurality of audio streams comprises: generating the one or more of the plurality of audio streams based on the conditional privacy restrictions, wherein the conditional privacy restrictions rights indicate if one or more of the plurality of audio streams are restricted or unrestricted.

Example 8F—The method of Example 7F, further comprising: generating audio metadata that further includes respective conditional privacy restrictions indicating if one or more of the plurality of audio streams are restricted or unrestricted based on the temporary password.

Example 9F—The method of Example 7F, wherein the temporary password remains valid for a fixed duration and expires after the fixed duration.

Example 10F—The method of Example 1F, wherein the privacy restrictions include respective gain values associated with respective audio streams of the one or more of the plurality of audio streams.

Example 11F—The method of Example 1F, wherein the privacy restrictions include respective nulling indications associated with respective audio streams of the one or more of the plurality of audio streams.

Example 12F—The method of Example 1F, wherein the privacy restrictions include respective toggling indications associated with respective audio streams of the one or more of the plurality of audio streams.

Example 13F—The method of Example 1F, further comprising: generating the password.

Example 14F—The method of Example 1F, further comprising: receiving the password.

Example 15F—The method of Example 1F, wherein the plurality of audio streams include audio streams from one or more of an audio capture device or a cluster of audio capture devices.

Example 16F—The method of Example 15F, wherein the audio capture devices may include one or more of a single microphone, and an array of microphones.

Example 17F—The method of Example 15F, wherein the audio capture devices may include a mobile device.

Example 18F—The method of Example 1F, further comprising: transmitting the plurality of audio streams over a wireless link.

Example 19F—The method of Example 18F, wherein the wireless link is a 5G air interface.

Example 20F—The method of Example 18F, wherein the wireless link is a Bluetooth interface.

Example 21F—The method of any combination of Examples 1F-20F, wherein the method is performed by a content capture device.

Example 22F—The method of any combination of Examples 1F-21F, wherein the method is performed by a mobile handset.

Example 1G—A device configured to process one or more of a plurality of audio streams, the device comprising: means for storing the plurality of audio streams, each of the audio streams representative of a soundfield; and means for generating one or more of the plurality of audio streams based on privacy restrictions associated with a password.

Example 2G—The device of Example 1G, further comprising: means for transmitting the one or more of the plurality of audio streams to a content consumer device.

Example 3G—The device of Example 1G, wherein the password is a master password associated with unrestricted privacy restrictions, and wherein the means for generating the one or more of the plurality of audio streams comprises: means for generating each of the plurality of audio streams.

Example 4G—The device of Example 1G, wherein the password is a permanent password associated with conditional privacy restrictions, and wherein the means for generating the one or more of the plurality of audio streams comprises: means for generating the one or more of the plurality of audio streams based on the conditional privacy restrictions, wherein the conditional privacy restrictions indicate if one or more of the plurality of audio streams are restricted or unrestricted.

Example 5G—The device of Example 4G, further comprising: means for generating audio metadata that further includes respective conditional privacy restrictions indicating if one or more of the plurality of audio streams are restricted or unrestricted based on the permanent password.

Example 6G—The device of Example 4G, wherein the permanent password remains valid until reset.

Example 7G—The device of Example 1G, wherein the password is a temporary password associated with conditional privacy restrictions, and wherein the means for generating the one or more of the plurality of audio streams comprises: means for generating the one or more of the plurality of audio streams based on the conditional privacy restrictions, wherein the conditional privacy restrictions rights indicate if one or more of the plurality of audio streams are restricted or unrestricted.

Example 8G—The device of Example 7G, further comprising: means for generating audio metadata that further includes respective conditional privacy restrictions indicating if one or more of the plurality of audio streams are restricted or unrestricted based on the temporary password.

Example 9G—The device of Example 7G, wherein the temporary password remains valid for a fixed duration and expires after the fixed duration.

Example 10G—The device of Example 1G, wherein the privacy restrictions include respective gain values associated with respective audio streams of the one or more of the plurality of audio streams.

Example 11G—The device of Example 1G, wherein the privacy restrictions include respective nulling indications associated with respective audio streams of the one or more of the plurality of audio streams.

Example 12G—The device of Example 1G, wherein the privacy restrictions include respective toggling indications associated with respective audio streams of the one or more of the plurality of audio streams.

Example 13G—The device of Example 1G, further comprising: means for generating the password.

Example 14G—The device of Example 1G, further comprising: means for receiving the password.

Example 15G—The device of Example 1G, wherein the plurality of audio streams include audio streams from one or more of an audio capture device or a cluster of audio capture devices.

Example 16G—The device of Example 15G, wherein the audio capture devices may include one or more of a single microphone, and an array of microphones.

Example 17G—The device of Example 15G, wherein the audio capture devices may include a mobile device.

Example 18G—The device of Example 1G, further comprising: means for transmitting the plurality of audio streams over a wireless link.

Example 19G—The device of Example 18G, wherein the wireless link is a 5G air interface.

Example 20G—The device of Example 18G, wherein the wireless link is a Bluetooth interface.

Example 21G—The device of any combination of Examples 1G-20G, wherein the device is a content capture device.

Example 22G—The device of any combination of Examples 1G-21G, wherein the device is a mobile handset.

Example 1H—A non-transitory computer-readable storage medium having stored thereon instructions that, when executed, cause one or more processors to: store the plurality of audio streams, each of the audio streams representative of a soundfield; and generate one or more of the plurality of audio streams based on privacy restrictions associated with a password.

Example 2H—The non-transitory computer-readable storage medium of Example 1H, wherein the instructions further cause the one or more processors to: transmit the one or more of the plurality of audio streams to a content consumer device.

Example 3H—The non-transitory computer-readable storage medium of Example 1H, wherein the password is a master password associated with unrestricted privacy restrictions, and wherein to generate the one or more of the plurality of audio streams, the instructions further cause the one or more processors to: generate each of the plurality of audio streams.

Example 4H—The non-transitory computer-readable storage medium of Example 1H, wherein the password is a permanent password associated with conditional privacy restrictions, and wherein to generate the one or more of the plurality of audio streams, the instructions further cause the one or more processors to: generate the one or more of the plurality of audio streams based on the conditional privacy restrictions, wherein the conditional privacy restrictions indicate if one or more of the plurality of audio streams are restricted or unrestricted.

Example 5H—The non-transitory computer-readable storage medium of Example 4H, wherein the instructions further cause the one or more processors to: generate audio metadata that further includes respective conditional privacy restrictions indicating if one or more of the plurality of audio streams are restricted or unrestricted based on the permanent password.

Example 6H—The non-transitory computer-readable storage medium of Example 4H, wherein the permanent password remains valid until reset.

Example 7H—The non-transitory computer-readable storage medium of Example 1H, wherein the password is a temporary password associated with conditional privacy restrictions, and wherein to generate the one or more of the plurality of audio streams, the instructions further cause the one or more processors to: generate the one or more of the plurality of audio streams based on the conditional privacy restrictions, wherein the conditional privacy restrictions rights indicate if one or more of the plurality of audio streams are restricted or unrestricted.

Example 8H—The non-transitory computer-readable storage medium of Example 7H, wherein the instructions further cause the one or more processors to: generate audio metadata that further includes respective conditional privacy restrictions indicating if one or more of the plurality of audio streams are restricted or unrestricted based on the temporary password.

Example 9H—The non-transitory computer-readable storage medium of Example 7H, wherein the temporary password remains valid for a fixed duration and expires after the fixed duration.

Example 10H—The non-transitory computer-readable storage medium of Example 1H, wherein the privacy restrictions include respective gain values associated with respective audio streams of the one or more of the plurality of audio streams.

Example 11H—The non-transitory computer-readable storage medium of Example 1H, wherein the privacy restrictions include respective nulling indications associated with respective audio streams of the one or more of the plurality of audio streams.

Example 12H—The non-transitory computer-readable storage medium of Example 1H, wherein the privacy restrictions include respective toggling indications associated with respective audio streams of the one or more of the plurality of audio streams.

Example 13H—The non-transitory computer-readable storage medium of Example 1H, wherein the instructions further cause the one or more processors to: generate the password.

Example 14H—The non-transitory computer-readable storage medium of Example 1H, wherein the instructions further cause the one or more processors to: receive the password.

Example 15H—The non-transitory computer-readable storage medium of Example 1H, wherein the plurality of audio streams include audio streams from one or more of an audio capture device or a cluster of audio capture devices.

Example 16H—The non-transitory computer-readable storage medium of Example 15H, wherein the audio capture devices may include one or more of a single microphone, and an array of microphones.

Example 17H—The non-transitory computer-readable storage medium of Example 15H, wherein the audio capture devices may include a mobile device.

Example 18H—The non-transitory computer-readable storage medium of Example 1H, wherein the instructions further cause the one or more processors to: transmit the plurality of audio streams over a wireless link.

Example 19H—The non-transitory computer-readable storage medium of Example 18H, wherein the wireless link is a 5G air interface.

Example 20H—The non-transitory computer-readable storage medium of Example 18H, wherein the wireless link is a Bluetooth interface.

Example 21H—The non-transitory computer-readable storage medium of any combination of Examples 1H-20H, wherein the one or more processors are part of a content capture device.

Example 22H—The non-transitory computer-readable storage medium of any combination of Examples 1H-21H, wherein the one or more processors are part of a mobile handset.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device configured to process one or more audio streams, the device comprising:
    a memory configured to store the one or more audio streams; and
    one or more processors coupled to the memory, and configured to:
        receive unrestricted audio streams and restricted audio streams of the one or more audio streams based on privacy restrictions associated with a password, wherein the one or more audio streams are from audio elements represented in an acoustic environment that comprises one or more sub-acoustic spaces, each of the one or more audio streams representative of a respective soundfield;
        receive data indicating restricted playback of the restricted audio streams based on the privacy restrictions associated with the password;
        restrict playback of the respective soundfields of a first subset of the restricted audio streams based on the data indicating the restricted playback;
        generate the respective soundfields of the unrestricted audio streams; and
        generate the respective soundfields of a second subset of the restricted audio streams based on the data indicating that playback is not restricted.

2. The device of claim 1, further comprising a modem coupled to the one or more processors, wherein the one or more processors are further configured to:
    send the password to a host device via the modem; and
    obtain, from the host device via the modem, only the unrestricted audio streams of the one or more audio streams based on privacy restrictions associated with the password.

3. The device of claim 2, wherein the modem is configured to:
    transmit a data packet that includes a representation of the password over a wireless link; and
    receive a different data packet that includes a representation of only the unrestricted audio streams of the one or more audio streams based on privacy restrictions associated with the password.

4. The device of claim 1, further comprising a modem coupled to the one or more processors, wherein the one or more processors are further configured to:
    send the password to a host device via the modem; and
    receive data, from the host device and in response to sending the password, indicating the restricted playback of the restricted audio streams based on the privacy restrictions associated with the password.

5. The device of claim 4, wherein the modem is configured to:
    transmit a data packet that includes a representation of the password over a wireless link; and
    receive a different data packet that includes a representation of the unrestricted audio streams and the restricted audio streams.

6. The device of claim 4, wherein to restrict playback of the respective soundfields of the restricted audio streams based on the data indicating the restricted playback, the one or more processors are further configured to:
    mask, toggle, or null the restricted audio streams.

7. The device of claim 4, wherein to restrict playback of the respective soundfields of the restricted audio streams based on the data indicating the restricted playback, the one or more processors are further configured to:
    apply an acoustic occluder to the restricted audio streams.

8. The device of claim 1, further comprising a modem coupled to the one or more processors, wherein the one or more processors are further configured to:
    associate the password with the data indicating the restricted playback; and
    restrict playback of the respective soundfields of the restricted audio streams based on the data indicating the restricted playback associated with the password.

9. The device of claim 8, wherein the modem is configured to:
    receive one or more data packets that include a representation of the unrestricted audio streams of the one or more audio streams and the restricted audio streams of the one or more audio streams.

10. The device of claim 8, wherein to restrict playback of the respective soundfields of the restricted audio streams based on the data indicating the restricted playback associated with the password, the one or more processors are further configured to:
    mask, toggle, or null the restricted audio streams.

11. The device of claim 8, wherein to restrict playback of the respective soundfields of the restricted audio streams based on the data indicating the restricted playback associated with the password, the one or more processors are further configured to:
    apply an acoustic occluder to the restricted audio streams.

12. The device of claim 1, wherein the password is a master password associated with unrestricted privacy restrictions, and wherein to receive the unrestricted audio streams of the one or more audio streams based on privacy restrictions associated with the password, the one or more processors are further configured to:
receive each of the one or more audio streams.

13. The device of claim 1, wherein the password is a permanent password associated with conditional privacy restrictions, and wherein to receive the unrestricted audio streams of the one or more audio streams based on privacy restrictions associated with the password, the one or more processors are further configured to:
receive the unrestricted audio streams of the one or more audio streams based on the conditional privacy restrictions associated with the permanent password, wherein the permanent password remains valid until a reset.

14. The device of claim 13, wherein the conditional privacy restrictions are associated with one or more audio elements, with one or more clusters of audio elements, or with one or more respective sub-acoustic spaces of the one or more sub-acoustic spaces.

15. The device of claim 1, wherein the password is a temporary password associated with conditional privacy restrictions, and wherein to receive the unrestricted audio streams of the one or more audio streams based on privacy restrictions associated with the password, the one or more processors are further configured to:
receive the unrestricted audio streams of the one or more audio streams based on the conditional privacy restrictions associated with the temporary password, wherein the temporary password remains valid for a fixed duration and expires after the fixed duration.

16. The device of claim 15, wherein the conditional privacy restrictions are associated with one or more audio elements, with one or more clusters of audio elements, or with one or more respective sub-acoustic spaces of the one or more sub-acoustic spaces.

17. The device of claim 1, wherein the one or more processors are further configured to:
receive the password from a host.

18. A method for processing one or more audio streams, the method comprising:
receiving unrestricted audio streams and restricted audio streams of the one or more audio streams based on privacy restrictions associated with a password, wherein the one or more audio streams are from audio elements represented in an acoustic environment that comprises one or more sub-acoustic spaces, each of the one or more audio streams representative of a respective soundfield;
receiving data indicating restricted playback of the restricted audio streams based on the privacy restrictions associated with the password;
restricting playback of the respective soundfields of a first subset of the restricted audio streams based on the data indicating the restricted playback;
generating the respective soundfields of the unrestricted audio streams; and
generating the respective soundfields of a second subset of the restricted audio streams based on the data indicating that playback is not restricted.

19. The method of claim 18, further comprising:
sending the password to a host device; and
receiving, from the host device, only the unrestricted audio streams of the one or more audio streams based on privacy restrictions associated with the password.

20. The method of claim 18, further comprising:
sending the password to a host device; and
receiving data, from the host device and in response to sending the password, indicating the restricted playback of the restricted audio streams based on the privacy restrictions associated with the password.

21. The method of claim 20, wherein restricting playback of the respective soundfields of the restricted audio streams based on the data indicating the restricted playback comprises:
masking, toggling, or nulling the restricted audio streams.

22. The method of claim 20, wherein restricting playback of the respective soundfields of the restricted audio streams based on the data indicating the restricted playback comprises:
applying an acoustic occluder to the restricted audio streams.

23. The method of claim 18, further comprising:
associating the password with the data indicating the restricted playback; and
restricting playback of the respective soundfields of the restricted audio streams based on the data indicating the restricted playback associated with the password.

24. The method of claim 23, wherein restricting playback of the respective soundfields of the restricted audio streams based on the data indicating the restricted playback associated with the password comprises:
toggling the restricted audio streams.

25. The method of claim 23, wherein restricting playback of the respective soundfields of the restricted audio streams based on the data indicating the restricted playback associated with the password comprises:
applying an acoustic occluder to the restricted audio streams.

26. The method of claim 18, wherein the password is a permanent password associated with conditional privacy restrictions, and wherein receiving the unrestricted audio streams of the one or more audio streams based on privacy restrictions associated with the password comprises:
receiving the unrestricted audio streams of the one or more audio streams based on the conditional privacy restrictions associated with the permanent password, wherein the permanent password remains valid until a reset.

27. The method of claim 26, wherein the conditional privacy restrictions are associated with one or more audio elements, with one or more clusters of audio elements, or with one or more respective sub-acoustic spaces of the one or more sub-acoustic spaces.

28. The method of claim 18, wherein the password is a temporary password associated with conditional privacy restrictions, and wherein receiving the unrestricted audio streams of the one or more audio streams based on privacy restrictions associated with the password comprises:
receiving the unrestricted audio streams of the one or more audio streams based on the conditional privacy restrictions associated with the temporary password, wherein the temporary password remains valid for a fixed duration and expires after the fixed duration.

29. The method of claim 28, wherein the conditional privacy restrictions are associated with one or more audio elements, with one or more clusters of audio elements, or with one or more respective sub-acoustic spaces of the one or more sub-acoustic spaces.

30. The method of claim 28, further comprising:
receiving the password from a host.

* * * * *